US011449787B2

(12) United States Patent
Bunch et al.

(10) Patent No.: US 11,449,787 B2
(45) Date of Patent: Sep. 20, 2022

(54) DOUBLE BLIND MACHINE LEARNING INSIGHT INTERFACE APPARATUSES, METHODS AND SYSTEMS

(71) Applicant: Xaxis, Inc., New York, NY (US)

(72) Inventors: Karl Edward Bunch, New York, NY (US); Adam Branyan Cushner, Jersey City, NJ (US); Jacob Grabczewski, New York, NY (US); Sara Sue Robertson, Bronx, NY (US); Inga Silkworth, Aurora, IL (US)

(73) Assignee: XAXIS, INC., New York, NY (US)

( * ) Notice: Subject to any disclaimer, the term of this patent is extended or adjusted under 35 U.S.C. 154(b) by 1124 days.

(21) Appl. No.: 15/816,690

(22) Filed: Nov. 17, 2017

(65) Prior Publication Data

US 2018/0308010 A1 Oct. 25, 2018

Related U.S. Application Data

(60) Provisional application No. 62/489,942, filed on Apr. 25, 2017.

(51) Int. Cl.
*G06F 9/48* (2006.01)
*G06N 20/00* (2019.01)
(Continued)

(52) U.S. Cl.
CPC ............. *G06N 20/00* (2019.01); *G06F 8/315* (2013.01); *G06F 9/4881* (2013.01); *G06F 15/76* (2013.01);
(Continued)

(58) Field of Classification Search
None
See application file for complete search history.

(56) References Cited

U.S. PATENT DOCUMENTS

| | | | |
|---|---|---|---|
| 9,712,860 | B1 | 7/2017 | Waggoner |
| 2007/0112597 | A1 | 5/2007 | Heckerman |

(Continued)

FOREIGN PATENT DOCUMENTS

| | | |
|---|---|---|
| WO | 2015120243 | 8/2015 |

OTHER PUBLICATIONS

International Search Report and Written Opinion of the International Search Authority for PCT application No. PCT/US2018/028705, filed Apr. 20, 2018, dated Aug. 9, 2018.

(Continued)

*Primary Examiner* — Van H Nguyen
(74) *Attorney, Agent, or Firm* — Hanchukkheit Kheit LLP.; Walter G. Hanchuk

(57) ABSTRACT

The Double Blind Machine Learning Insight Interface Apparatuses, Methods and Systems ("DBMLII") transforms campaign configuration request, campaign optimization input inputs via DBMLII components into top features, machine learning configured user interface, translated commands, campaign configuration response outputs. A decoupled machine learning workflow generation request is obtained. A set of decoupled tasks specified via the decoupled machine learning workflow generation request is determined, wherein each decoupled task in the set of decoupled tasks is associated with a corresponding class. Dependencies among decoupled tasks in the set of decoupled tasks are determined. A decoupled machine learning workflow structure comprising the set of decoupled tasks and the determined dependencies is generated, wherein the decoupled machine learning workflow structure is executable via a decoupled machine learning workflow controller to produce machine learning results.

8 Claims, 48 Drawing Sheets

DBMLII ARCHITECTURE

(51) Int. Cl.

| | |
|---|---|
| ***G06Q 30/02*** | (2012.01) |
| ***G06F 16/2457*** | (2019.01) |
| ***G06F 16/9535*** | (2019.01) |
| ***G06F 15/76*** | (2006.01) |
| ***G06N 5/00*** | (2006.01) |
| ***G06N 20/20*** | (2019.01) |
| ***G06F 8/30*** | (2018.01) |
| ***G06N 7/00*** | (2006.01) |

(52) U.S. Cl.
CPC .... *G06F 16/24578* (2019.01); *G06F 16/9535* (2019.01); *G06N 5/003* (2013.01); *G06N 7/005* (2013.01); *G06N 20/20* (2019.01); *G06Q 30/0241* (2013.01); *G06Q 30/0246* (2013.01); *G06Q 30/0275* (2013.01)

(56) References Cited

U.S. PATENT DOCUMENTS

| | | | |
|---|---|---|---|
| 2008/0004878 | A1 | 1/2008 | Weng |
| 2014/0188768 | A1 | 7/2014 | Bonissone et al. |
| 2015/0066593 | A1 | 3/2015 | Huang |
| 2015/0269495 | A1 | 9/2015 | Dalessandro |
| 2015/0379429 | A1* | 12/2015 | Lee ........................ G06N 20/00 706/11 |
| 2016/0048766 | A1 | 2/2016 | McMahon et al. |
| 2016/0071168 | A1 | 3/2016 | Buchalter |
| 2016/0155069 | A1 | 6/2016 | Hoover et al. |
| 2016/0275570 | A1 | 9/2016 | Seljan |
| 2016/0364420 | A1 | 12/2016 | Cronin |
| 2016/0364608 | A1 | 12/2016 | Sengupta |
| 2017/0193392 | A1 | 7/2017 | Liu |
| 2017/0364700 | A1* | 12/2017 | Goldfarb ............. G06F 21/6218 |
| 2018/0012264 | A1 | 1/2018 | Yates |
| 2018/0108049 | A1 | 4/2018 | Kitts |
| 2018/0293517 | A1* | 10/2018 | Browne ................ G06F 3/0482 |
| 2018/0300333 | A1 | 10/2018 | Wang |

OTHER PUBLICATIONS

Laurent et al, "Boosting bonsai trees for efficeint features combination: application to speaker role identification", 2014, Interspeech, pp. 1-6. (Year: 2014).

Verma et al, "Feature Selection Technique Using Homogeneity based cluster", 2015, International Journal of Engineering Research and General Science, vol. 3, Iss. 1, pp. 1103-1108. (Year: 2015).

Wang etal, "Display Advertising with Real-Time Bidding (RTB) and Behavioral Targeting", 2016, Cornell University arXiv: 1610.03013, all pages. (Year: 2016).

Moffitt, "Guide to Encoding Categorical Values in Python", Feb. 2017, Practical Business Python, pp. 1-16. (Year: 2017).

Kaushik, "Introduction to Feature Selection methods with an example (or how to select the right variables?)", Dec. 2016. (Year: 2016).

* cited by examiner

FIGURE 1: DBMLII ARCHITECTURE
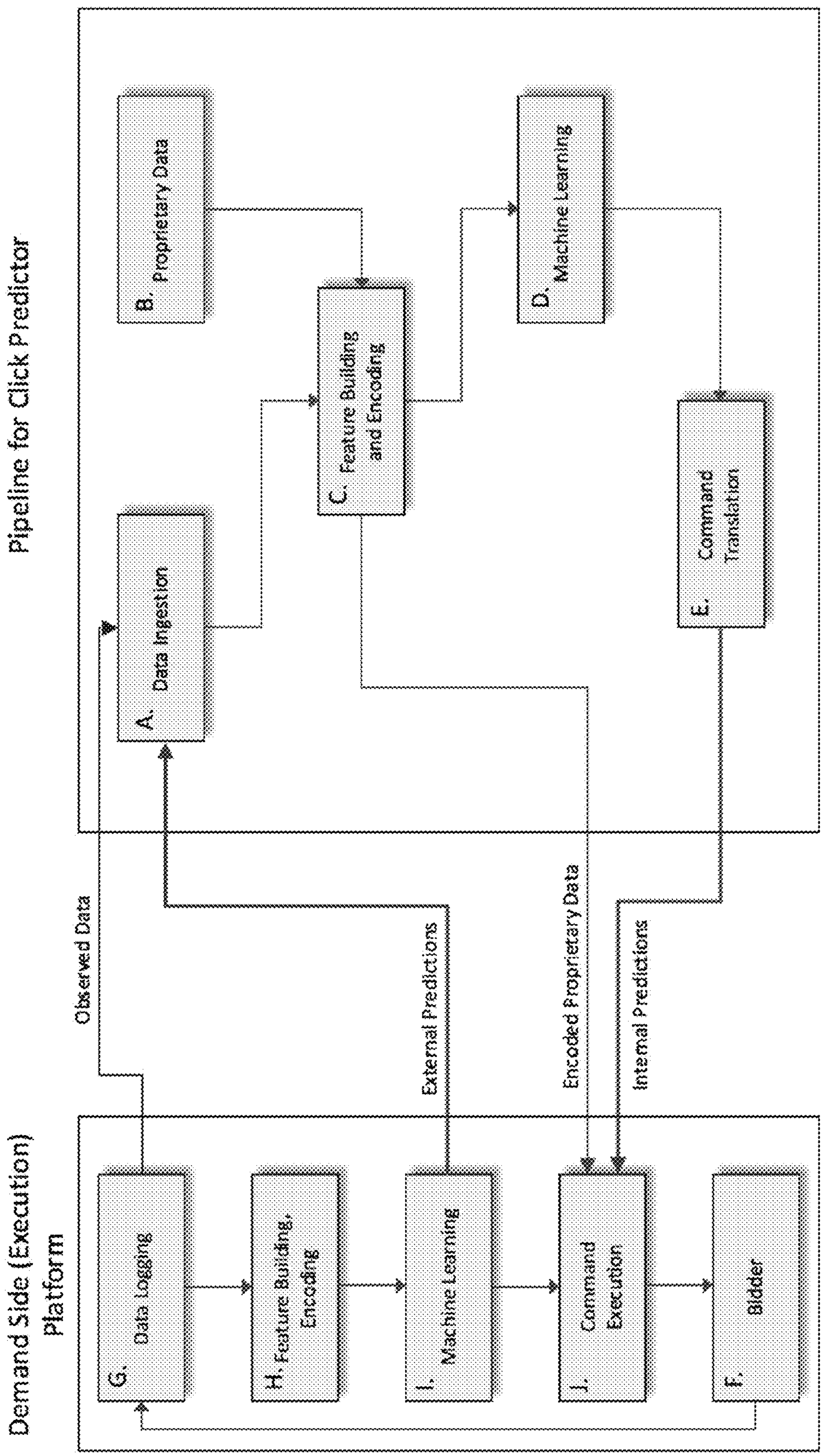

Figure 2:
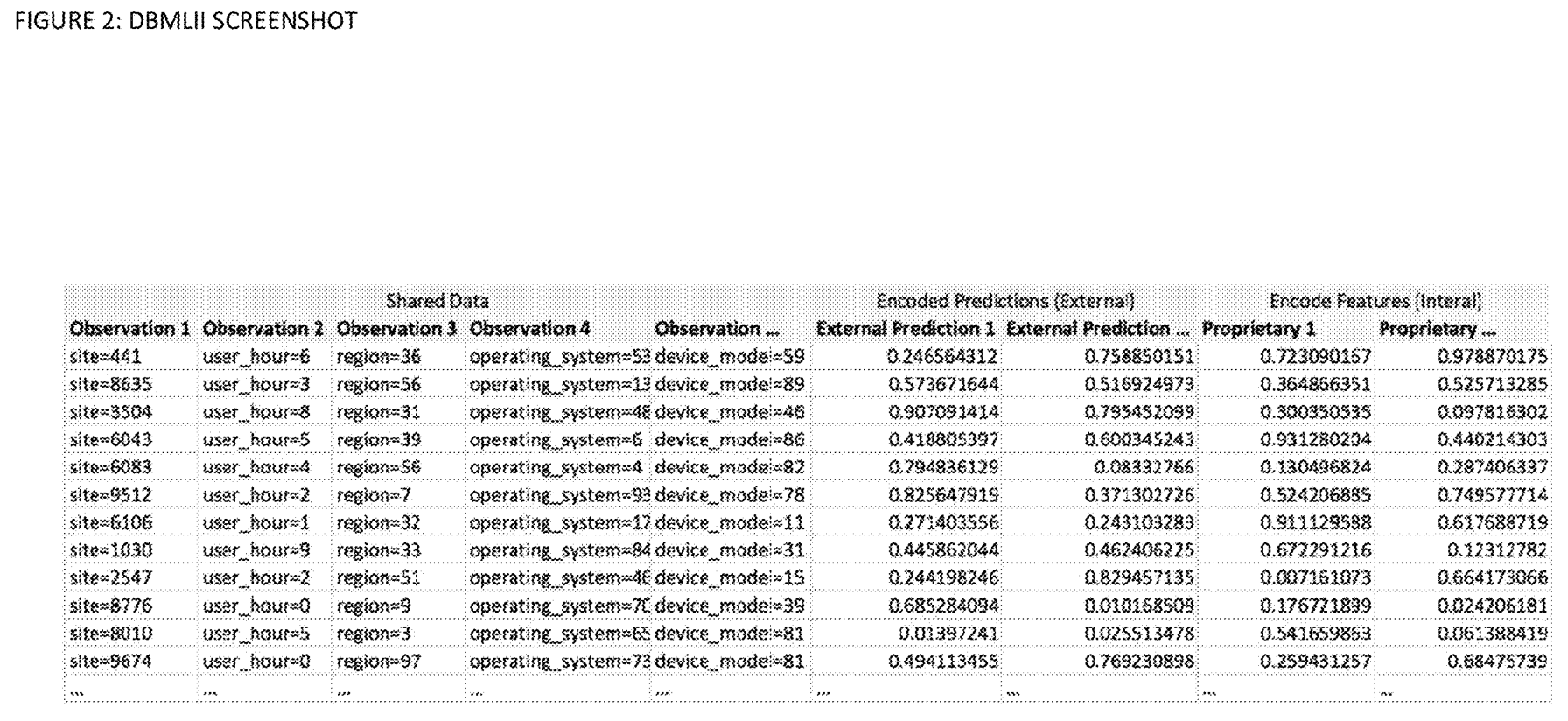

FIGURE 2: DBMLII SCREENSHOT

| Shared Data | | | | | Encoded Predictions (External) | | Encode Features (Interal) | |
|---|---|---|---|---|---|---|---|---|
| Observation 1 | Observation 2 | Observation 3 | Observation 4 | Observation ... | External Prediction 1 | External Prediction ... | Proprietary 1 | Proprietary ... |
| site=441 | user_hour=6 | region=36 | operating_system=53 | device_model=59 | 0.246584312 | 0.758850151 | 0.723090167 | 0.978870175 |
| site=8635 | user_hour=3 | region=56 | operating_system=13 | device_model=89 | 0.573671644 | 0.516924973 | 0.364866351 | 0.525713285 |
| site=3504 | user_hour=8 | region=31 | operating_system=48 | device_model=46 | 0.907091414 | 0.795452099 | 0.300350535 | 0.097816302 |
| site=6043 | user_hour=5 | region=39 | operating_system=6 | device_model=86 | 0.418805397 | 0.600345243 | 0.931280204 | 0.440214303 |
| site=6083 | user_hour=4 | region=56 | operating_system=4 | device_model=82 | 0.794836129 | 0.08332766 | 0.130496824 | 0.287406337 |
| site=9512 | user_hour=2 | region=7 | operating_system=93 | device_model=78 | 0.825647919 | 0.371302726 | 0.524206885 | 0.749577714 |
| site=6106 | user_hour=1 | region=32 | operating_system=17 | device_model=11 | 0.271403556 | 0.243103283 | 0.911129588 | 0.617688719 |
| site=1030 | user_hour=9 | region=33 | operating_system=84 | device_model=31 | 0.445862044 | 0.462406225 | 0.672291216 | 0.12312782 |
| site=2547 | user_hour=2 | region=51 | operating_system=46 | device_model=15 | 0.244198246 | 0.829457135 | 0.007161073 | 0.664173066 |
| site=8776 | user_hour=0 | region=9 | operating_system=70 | device_model=39 | 0.685284094 | 0.010168509 | 0.176721839 | 0.024206181 |
| site=8010 | user_hour=5 | region=3 | operating_system=65 | device_model=81 | 0.01397241 | 0.025513478 | 0.541659863 | 0.061388419 |
| site=9674 | user_hour=0 | region=97 | operating_system=73 | device_model=81 | 0.494113455 | 0.769230898 | 0.259431257 | 0.68475739 |
| ... | ... | ... | ... | ... | ... | ... | ... | ... |

FIGURE 3: DBMLII DATA FLOW
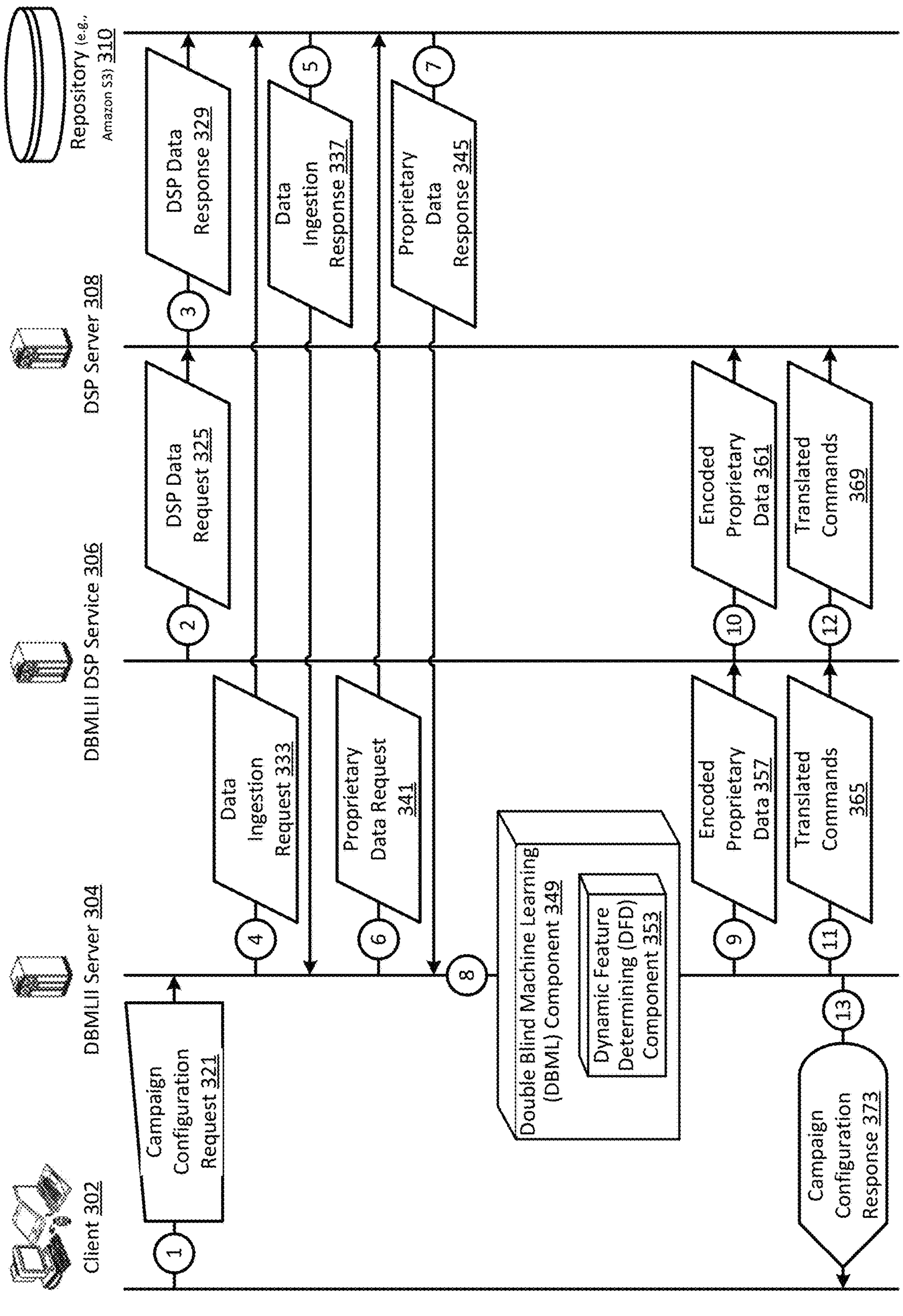

FIGURE 4: DBMLII DBML COMPONENT
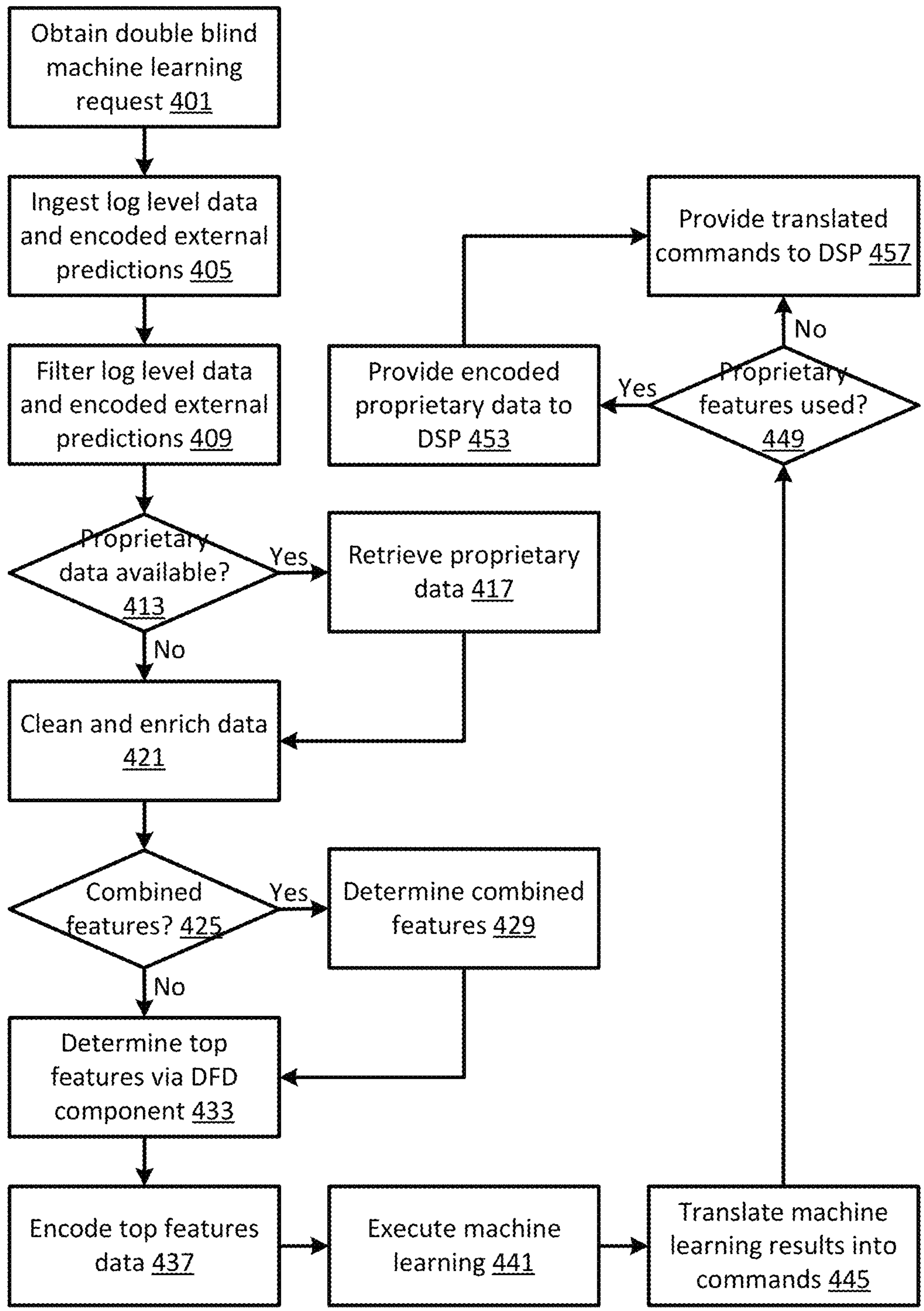

FIGURE 5: DBMLII DFD COMPONENT
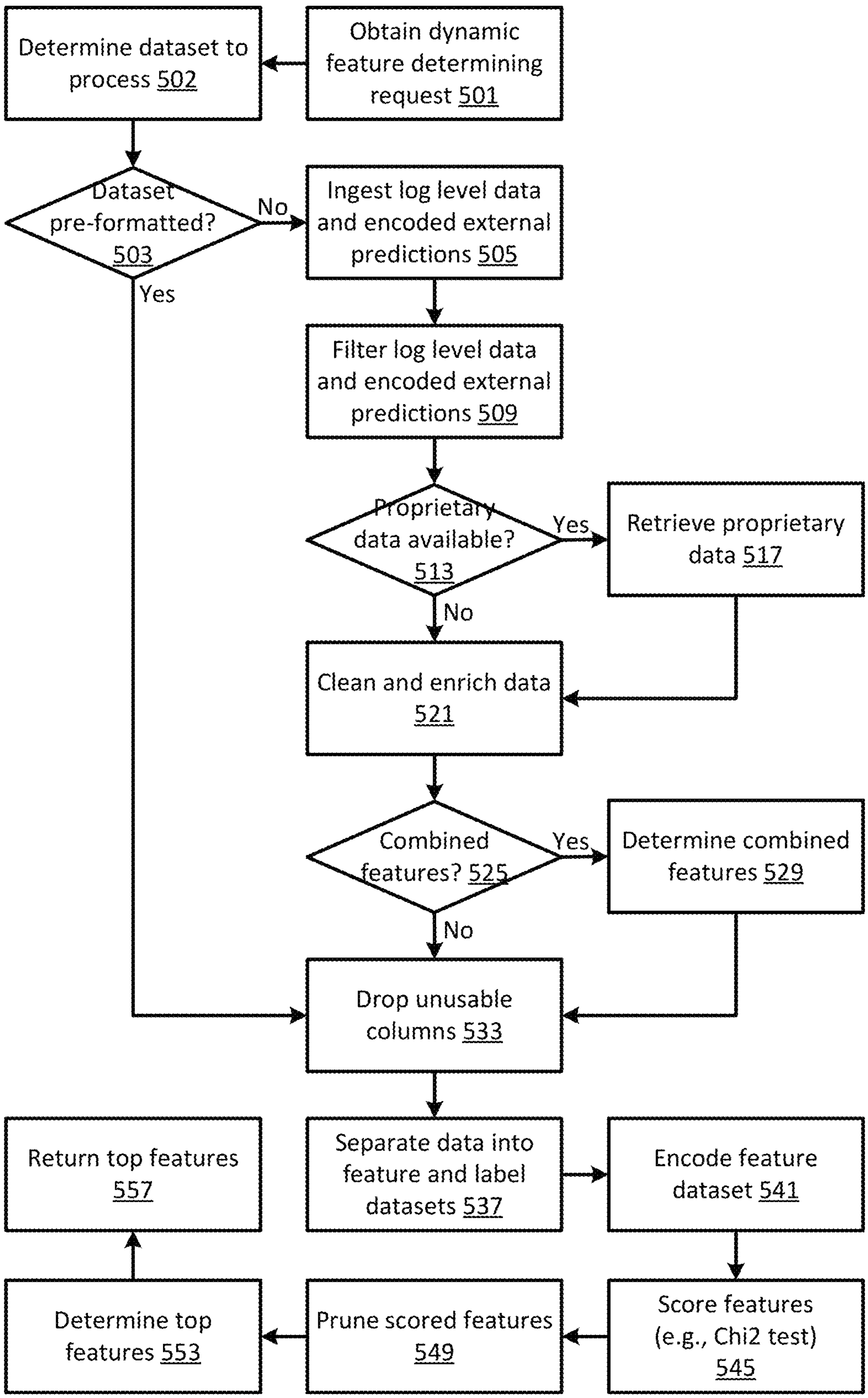

FIGURE 6: DBMLII SCREENSHOT

| auction_id_6 | datetime | user_tz_offs | width | height | media_type | fold_positior | event_type | imp_type | payment_ty | media_cost_ |
|---|---|---|---|---|---|---|---|---|---|---|
| 5.01E+18 | 7/9/17 8:47 | 8 | 160 | 600 | 1 | 2 | imp | 7 | 0 | 0.01 |
| 7.259E+18 | 7/9/17 8:28 | 8 | 160 | 600 | 1 | 2 | imp | 7 | 0 | 0.11 |
| 3.511E+17 | 7/9/17 8:31 | 8 | 160 | 600 | 1 | 2 | imp | 7 | 0 | 0.12 |
| 7.245E+18 | 7/9/17 8:31 | 8 | 160 | 600 | 1 | 2 | imp | 7 | 0 | 0.1 |
| 2.704E+18 | 7/9/17 8:31 | 8 | 300 | 600 | 1 | 2 | imp | 7 | 0 | 0.08 |
| 5.428E+18 | 7/9/17 8:37 | 8 | 160 | 600 | 1 | 2 | imp | 7 | 0 | 0.02 |
| 6.359E+18 | 7/9/17 8:37 | 8 | 160 | 600 | 1 | 2 | imp | 7 | 0 | 0.01 |
| 9.132E+18 | 7/9/17 8:29 | 8 | 300 | 600 | 1 | 2 | imp | 7 | 0 | 0.13 |
| 3.735E+18 | 7/9/17 8:49 | 8 | 300 | 600 | 1 | 2 | imp | 7 | 0 | 0.19 |
| 7.668E+18 | 7/9/17 8:20 | 8 | 160 | 600 | 1 | 2 | imp | 7 | 0 | 0.14 |

| revenue_typ | buyer_spenc | buyer-bid | ecp | eap | is_imp | is_learn | predict_type | user_id_64 | ... |
|---|---|---|---|---|---|---|---|---|---|
| 0 | 0.01 | 0.2085 | 0.52 | 0.02 | 1 | 1 | 1 | 2.696E+16 | |
| 0 | 0.11 | 0.2085 | 0.84 | 0.58 | 1 | 1 | 1 | 5.131E+17 | |
| 0 | 0.12 | 0.2085 | 0.29 | 0.03 | 1 | 1 | 1 | 5.363E+17 | |
| 0 | 0.1 | 0.2085 | 0.29 | 0.03 | 1 | 1 | 1 | 5.363E+17 | |
| 0 | 0.08 | 0.2085 | 0.29 | 0.03 | 1 | 1 | 1 | 5.363E+17 | |
| 0 | 0.02 | 0.2085 | 3.91 | 0.43 | 1 | 1 | 1 | 5.566E+17 | |
| 0 | 0.01 | 0.2085 | 3.91 | 0.43 | 1 | 1 | 1 | 5.566E+17 | |
| 0 | 0.13 | 0.2085 | 4.29 | 0.64 | 1 | 1 | 1 | 6.134E+17 | |
| 0 | 0.19 | 0.2085 | 1.21 | 0.98 | 1 | 1 | 1 | 7.068E+17 | |
| 0 | 0.14 | 0.160778 | 1.15 | 0.26 | 1 | 1 | 1 | 7.294E+17 | |

Log Level Data

Figure 7:
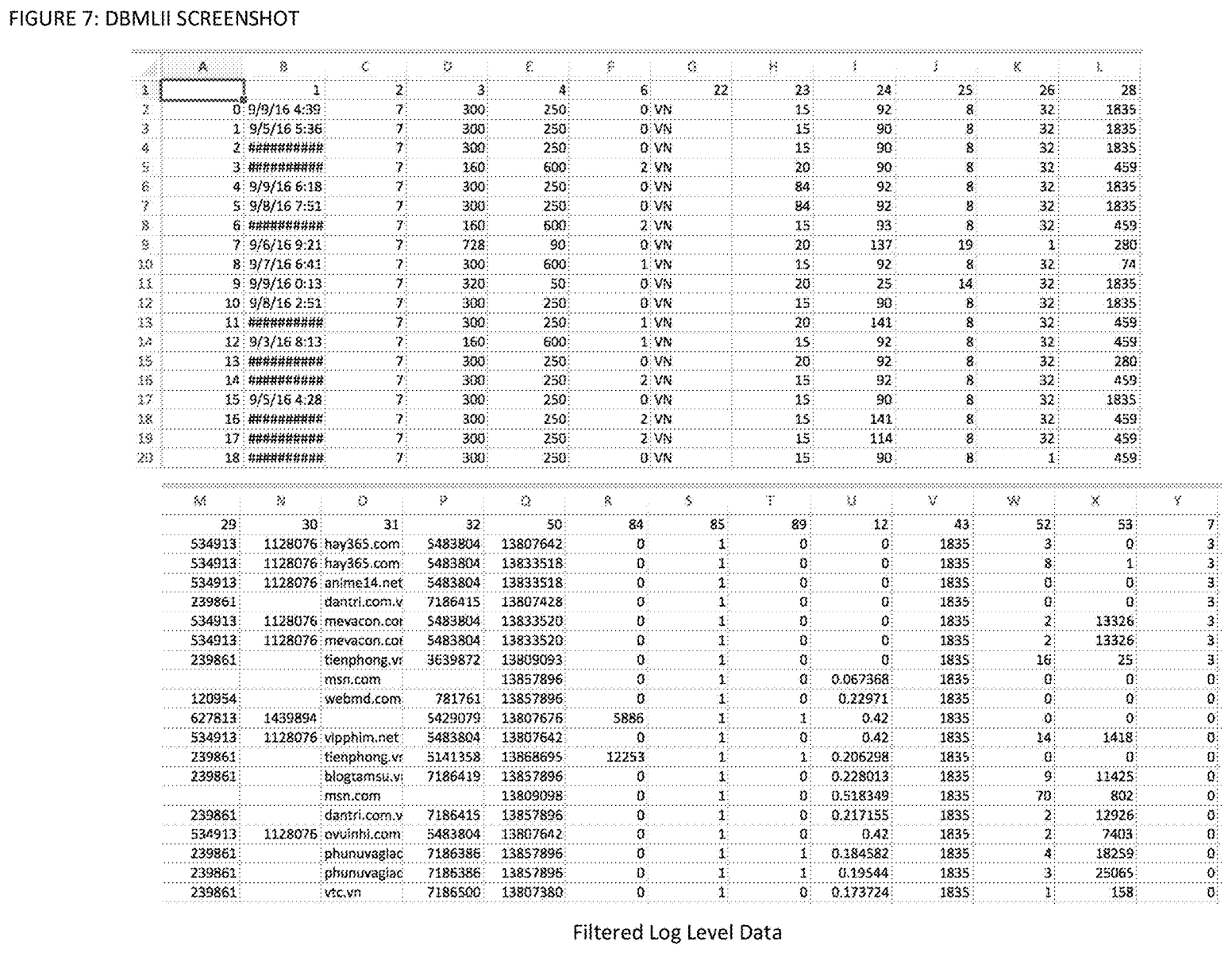

FIGURE 7: DBMLII SCREENSHOT

| | A | B | C | D | E | F | G | H | I | J | K | L |
|---|---|---|---|---|---|---|---|---|---|---|---|---|
| 1 | | 1 | 2 | 3 | 4 | 6 | 22 | 23 | 24 | 25 | 26 | 28 |
| 2 | 0 | 9/9/16 4:39 | 7 | 300 | 250 | 0 | VN | 15 | 92 | 8 | 32 | 1835 |
| 3 | 1 | 9/5/16 5:36 | 7 | 300 | 250 | 0 | VN | 15 | 90 | 8 | 32 | 1835 |
| 4 | 2 | ########## | 7 | 300 | 250 | 0 | VN | 15 | 90 | 8 | 32 | 1835 |
| 5 | 3 | ########## | 7 | 160 | 600 | 2 | VN | 20 | 90 | 8 | 32 | 459 |
| 6 | 4 | 9/9/16 6:18 | 7 | 300 | 250 | 0 | VN | 84 | 92 | 8 | 32 | 1835 |
| 7 | 5 | 9/8/16 7:51 | 7 | 300 | 250 | 0 | VN | 84 | 92 | 8 | 32 | 1835 |
| 8 | 6 | ########## | 7 | 160 | 600 | 2 | VN | 15 | 93 | 8 | 32 | 459 |
| 9 | 7 | 9/6/16 9:21 | 7 | 728 | 90 | 0 | VN | 20 | 137 | 19 | 1 | 280 |
| 10 | 8 | 9/7/16 6:41 | 7 | 300 | 600 | 1 | VN | 15 | 92 | 8 | 32 | 74 |
| 11 | 9 | 9/9/16 0:13 | 7 | 320 | 50 | 0 | VN | 20 | 25 | 14 | 32 | 1835 |
| 12 | 10 | 9/8/16 2:51 | 7 | 300 | 250 | 0 | VN | 15 | 90 | 8 | 32 | 1835 |
| 13 | 11 | ########## | 7 | 300 | 250 | 1 | VN | 20 | 141 | 8 | 32 | 459 |
| 14 | 12 | 9/3/16 8:13 | 7 | 160 | 600 | 1 | VN | 15 | 92 | 8 | 32 | 459 |
| 15 | 13 | ########## | 7 | 300 | 250 | 0 | VN | 20 | 92 | 8 | 32 | 280 |
| 16 | 14 | ########## | 7 | 300 | 250 | 2 | VN | 15 | 92 | 8 | 32 | 459 |
| 17 | 15 | 9/5/16 4:28 | 7 | 300 | 250 | 0 | VN | 15 | 90 | 8 | 32 | 1835 |
| 18 | 16 | ########## | 7 | 300 | 250 | 2 | VN | 15 | 141 | 8 | 32 | 459 |
| 19 | 17 | ########## | 7 | 300 | 250 | 2 | VN | 15 | 114 | 8 | 32 | 459 |
| 20 | 18 | ########## | 7 | 300 | 250 | 0 | VN | 15 | 90 | 8 | 1 | 459 |

| M | N | O | P | Q | R | S | T | U | V | W | X | Y |
|---|---|---|---|---|---|---|---|---|---|---|---|---|
| 29 | 30 | 31 | 32 | 50 | 84 | 85 | 89 | 12 | 43 | 52 | 53 | 7 |
| 534913 | 1128076 | hay365.com | 5483804 | 13807642 | 0 | 1 | 0 | 0 | 1835 | 3 | 0 | 3 |
| 534913 | 1128076 | hay365.com | 5483804 | 13833518 | 0 | 1 | 0 | 0 | 1835 | 8 | 1 | 3 |
| 534913 | 1128076 | anime14.net | 5483804 | 13833518 | 0 | 1 | 0 | 0 | 1835 | 0 | 0 | 3 |
| 239861 | | dantri.com.v | 7186415 | 13807428 | 0 | 1 | 0 | 0 | 1835 | 0 | 0 | 3 |
| 534913 | 1128076 | mevacon.co | 5483804 | 13833520 | 0 | 1 | 0 | 0 | 1835 | 2 | 13326 | 3 |
| 534913 | 1128076 | mevacon.co | 5483804 | 13833520 | 0 | 1 | 0 | 0 | 1835 | 2 | 13326 | 3 |
| 239861 | | tienphong.v | 3639872 | 13809093 | 0 | 1 | 0 | 0 | 1835 | 16 | 25 | 3 |
| | | msn.com | | 13857896 | 0 | 1 | 0 | 0.067368 | 1835 | 0 | 0 | 0 |
| 120954 | | webmd.com | 781761 | 13857896 | 0 | 1 | 0 | 0.22971 | 1835 | 0 | 0 | 0 |
| 627813 | 1439894 | | 5429079 | 13807676 | 5886 | 1 | 1 | 0.42 | 1835 | 0 | 0 | 0 |
| 534913 | 1128076 | vipphim.net | 5483804 | 13807642 | 0 | 1 | 0 | 0.42 | 1835 | 14 | 1418 | 0 |
| 239861 | | tienphong.v | 5141358 | 13868695 | 12253 | 1 | 1 | 0.206298 | 1835 | 0 | 0 | 0 |
| 239861 | | blogtamsu.v | 7186419 | 13857896 | 0 | 1 | 0 | 0.228013 | 1835 | 9 | 11425 | 0 |
| | | msn.com | | 13809098 | 0 | 1 | 0 | 0.518349 | 1835 | 70 | 802 | 0 |
| 239861 | | dantri.com.v | 7186415 | 13857896 | 0 | 1 | 0 | 0.217155 | 1835 | 2 | 12926 | 0 |
| 534913 | 1128076 | ovuinhi.com | 5483804 | 13807642 | 0 | 1 | 0 | 0.42 | 1835 | 2 | 7403 | 0 |
| 239861 | | phunuvagiac | 7186386 | 13857896 | 0 | 1 | 1 | 0.184582 | 1835 | 4 | 18259 | 0 |
| 239861 | | phunuvagiac | 7186386 | 13857896 | 0 | 1 | 1 | 0.19544 | 1835 | 3 | 25065 | 0 |
| 239861 | | vtc.vn | 7186500 | 13807380 | 0 | 1 | 0 | 0.173724 | 1835 | 1 | 158 | 0 |

Filtered Log Level Data

FIGURE 8: DBMLII SCREENSHOT

| segment= 653725 | segment= 792462 | segment= 642782 |
|---|---|---|
| 0 | 1 | 0 |
| 0 | 0 | 0 |
| 0 | 0 | 0 |
| 1 | 0 | 0 |
| 0 | 0 | 0 |
| 0 | 1 | 0 |
| 1 | 0 | 0 |
| 1 | 0 | 1 |
| 0 | 1 | 0 |
| 0 | 1 | 0 |
| 0 | 1 | 0 |
| ... | ... | ... |

Proprietary Data

| placement | position | browser | carrier | domain | placement_g | supply_type | campaign_id | pixel_id | creative_freq | language | event_type | seller_member | region | os_extended | buyer_spend | device_mode | publisher | ... |
|---|---|---|---|---|---|---|---|---|---|---|---|---|---|---|---|---|---|---|
| 10373710 | 1 | 8 | 1 | gianlucadima | 999999 | 0 | 15305533 | 736910 | 0 | 11 | 3 | 181 | IT:82 | 92 | 0 | 0 | 913992 | |
| 7208066 | 2 | 8 | 1 | ebay.it | 999999 | 0 | 13573654 | 736910 | 1 | 11 | 2 | 181 | IT:82 | 137 | 0 | 0 | 760654 | |
| 7471254 | 0 | 8 | 1 | repubblica.it | 2076715 | 0 | 13848896 | 736910 | 1 | 11 | 3 | 3141 | IT:D4 | 162 | 0 | 0 | 790787 | |
| 999999 | 0 | 8 | 1 | gossip.it | 999999 | 0 | 16370575 | 736910 | 2 | 11 | 3 | 956 | IT:H6 | 92 | 0 | 0 | 561226 | |
| 8970155 | 2 | 8 | 1 | ansa.it | 999999 | 0 | 15305533 | 736910 | 5 | 11 | 3 | 181 | IT:G9 | 92 | 0 | 0 | 820146 | |
| 8970155 | 2 | 8 | 1 | ansa.it | 999999 | 0 | 15305533 | 736910 | 5 | 11 | 3 | 181 | IT:G9 | 92 | 0 | 0 | 820146 | |
| 9656845 | 1 | 8 | 1 | jetcost.it | 999999 | 0 | 13573654 | 736910 | 0 | 11 | 3 | 181 | IT:D4 | 99 | 0 | 0 | 761157 | |
| 9656845 | 1 | 8 | 1 | jetcost.it | 999999 | 0 | 13573654 | 736910 | 0 | 11 | 3 | 181 | IT:D4 | 99 | 0 | 0 | 761157 | |
| 9656845 | 1 | 8 | 1 | jetcost.it | 999999 | 0 | 13573654 | 736910 | 0 | 11 | 3 | 181 | IT:D4 | 99 | 0 | 0 | 761157 | |
| 7205079 | 1 | 8 | 121 | jobrapido.co | 999999 | 0 | 16370575 | 736910 | 0 | 11 | 3 | 181 | IT:82 | 92 | 0 | 0 | 761196 | |
| 7208066 | 0 | 8 | 1 | ebay.it | 999999 | 0 | 13573654 | 736910 | 150 | 11 | 3 | 181 | IT:D4 | 137 | 0 | 0 | 760654 | |
| 7208066 | 0 | 8 | 1 | ebay.it | 999999 | 0 | 13573654 | 736910 | 150 | 11 | 3 | 181 | IT:D4 | 137 | 0 | 0 | 760654 | |
| 1958743 | 0 | 8 | 1 | outlook.com | 999999 | 0 | 15305533 | 736910 | 0 | 11 | 3 | 280 | IT:D5 | 92 | 0 | 0 | 281403 | |
| 1958743 | 0 | 8 | 1 | outlook.com | 999999 | 0 | 15305533 | 736910 | 0 | 11 | 3 | 280 | IT:D5 | 92 | 0 | 0 | 281403 | |
| 999999 | 0 | 8 | 139 | subito.it | 999999 | 0 | 15305533 | 736910 | 0 | 11 | 3 | 2331 | IT:D1 | 92 | 0 | 0 | 485424 | |
| 7471254 | 0 | 8 | 1 | business.it | 2076715 | 0 | 13718645 | 736910 | 5 | 11 | 3 | 3141 | IT:53 | 92 | 0 | 0 | 790787 | |
| 1958743 | 0 | 8 | 80 | outlook.com | 999999 | 0 | 13573654 | 736910 | 35 | 11 | 3 | 280 | IT:B2 | 92 | 0 | 0 | 281403 | |
| 8951404 | 2 | 8 | 1 | volagratis.co | 999999 | 0 | 16370575 | 736910 | 1 | 11 | 3 | 181 | IT:61 | 125 | 0 | 0 | 763884 | |
| 7332195 | 2 | 7 | 1 | casa.it | 999999 | 0 | 16370575 | 736910 | 22 | 11 | 3 | 181 | IT:91 | 137 | 0 | 0 | 760947 | |
| 7471254 | 0 | 8 | 1 | laprovinciadi | 7471254 | 0 | 13718645 | 0 | 11 | 11 | 0 | 3141 | IT:AC | 92 | 0 | 0 | 790787 | |

Cleaned and Enriched Data

FIG. 9

| placement | position | browser | carrier | domain | placement_g | supply_type | campaign_id | pixel_id | language | event_type | seller_member | os_extended | buyer_spend | device_mode | publisher | ... | user_hour<>device_type |
|---|---|---|---|---|---|---|---|---|---|---|---|---|---|---|---|---|---|
| 10373710 | 1 | 8 | 1 | gianlucadima | 999999 | 0 | 15305533 | 736910 | 11 | 3 | 181 | 92 | 0 | 0 | 913992 | | 3<>pc & other devices |
| 7208066 | 2 | 8 | 1 | ebay.it | 999999 | 0 | 13573654 | 736910 | 11 | 2 | 181 | 137 | 0 | 0 | 760654 | | 4<>pc & other devices |
| 7471254 | 0 | 8 | 1 | repubblica.it | 2076715 | 0 | 13848896 | 736910 | 11 | 3 | 3141 | 162 | 0 | 0 | 790787 | | 6<>pc & other devices |
| 999999 | 0 | 8 | 1 | gossip.it | 999999 | 0 | 16370575 | 736910 | 11 | 3 | 956 | 92 | 0 | 0 | 561226 | | 2<>pc & other devices |
| 8970155 | 2 | 8 | 1 | ansa.it | 999999 | 0 | 15305533 | 736910 | 11 | 3 | 181 | 92 | 0 | 0 | 820146 | | 4<>pc & other devices |
| 8970155 | 2 | 8 | 1 | ansa.it | 999999 | 0 | 15305533 | 736910 | 11 | 3 | 181 | 92 | 0 | 0 | 820146 | | 4<>pc & other devices |
| 9656845 | 1 | 8 | 1 | jetcost.it | 999999 | 0 | 13573654 | 736910 | 11 | 3 | 181 | 99 | 0 | 0 | 761157 | | 5<>pc & other devices |
| 9656845 | 1 | 8 | 1 | jetcost.it | 999999 | 0 | 13573654 | 736910 | 11 | 3 | 181 | 99 | 0 | 0 | 761157 | | 5<>pc & other devices |
| 9656845 | 1 | 8 | 1 | jetcost.it | 999999 | 0 | 13573654 | 736910 | 11 | 3 | 181 | 99 | 0 | 0 | 761157 | | 5<>pc & other devices |
| 7205079 | 1 | 8 | 121 | jobrapido.co | 999999 | 0 | 16370575 | 736910 | 11 | 3 | 181 | 92 | 0 | 0 | 761196 | | 0<>pc & other devices |
| 7208066 | 0 | 8 | 1 | ebay.it | 999999 | 0 | 13573654 | 736910 | 11 | 3 | 181 | 137 | 0 | 0 | 760654 | | 7<>pc & other devices |
| 7208066 | 0 | 8 | 1 | ebay.it | 999999 | 0 | 13573654 | 736910 | 11 | 3 | 181 | 137 | 0 | 0 | 760654 | | 7<>pc & other devices |
| 1958743 | 0 | 8 | 1 | outlook.com | 999999 | 0 | 15305533 | 736910 | 11 | 3 | 280 | 92 | 0 | 0 | 281403 | | 7<>pc & other devices |
| 1958743 | 0 | 8 | 1 | outlook.com | 999999 | 0 | 15305533 | 736910 | 11 | 3 | 280 | 92 | 0 | 0 | 281403 | | 7<>pc & other devices |
| 999999 | 0 | 8 | 139 | subito.it | 999999 | 0 | 15305533 | 736910 | 11 | 3 | 2331 | 92 | 0 | 0 | 485424 | | 6<>pc & other devices |
| 7471254 | 0 | 8 | 1 | business.it | 2076715 | 0 | 13718645 | 736910 | 11 | 3 | 3141 | 92 | 0 | 0 | 790787 | | 5<>pc & other devices |
| 1958743 | 0 | 8 | 80 | outlook.com | 999999 | 0 | 13573654 | 736910 | 11 | 3 | 280 | 92 | 0 | 0 | 281403 | | 3<>pc & other devices |
| 8951404 | 2 | 8 | 1 | volagratis.co | 999999 | 0 | 16370575 | 736910 | 11 | 3 | 181 | 125 | 0 | 0 | 763884 | | 7<>pc & other devices |
| 7332195 | 2 | 7 | 1 | casa.it | 999999 | 0 | 16370575 | 736910 | 11 | 3 | 181 | 137 | 0 | 0 | 760947 | | 6<>pc & other devices |

Enriched Data with Combined Features

FIG. 10

FIGURE 11: DBMLII SCREENSHOT

| placement | position | domain | publisher | device_type | size | user_hour<>device_type | supply_type |
|---|---|---|---|---|---|---|---|
| 10373710 | 1 | gianlucadima | 913992 | pc & other d | 300x250 | 3<>pc & other devices | 0 |
| 7208066 | 2 | ebay.it | 760654 | pc & other d | 160x600 | 4<>pc & other devices | 0 |
| 7471254 | 0 | repubblica.it | 790787 | pc & other d | 728x90 | 6<>pc & other devices | 0 |
| 999999 | 0 | gossip.it | 561226 | pc & other d | 300x250 | 2<>pc & other devices | 0 |
| 8970155 | 2 | ansa.it | 820146 | pc & other d | 300x250 | 4<>pc & other devices | 0 |
| 8970155 | 2 | ansa.it | 820146 | pc & other d | 300x250 | 4<>pc & other devices | 0 |
| 777777 | 1 | 777777 | 777777 | pc & other d | 728x90 | 5<>pc & other devices | 0 |
| 777777 | 1 | 777777 | 777777 | pc & other d | 728x90 | 5<>pc & other devices | 0 |
| 777777 | 1 | 777777 | 777777 | pc & other d | 728x90 | 5<>pc & other devices | 0 |
| 7205079 | 1 | jobrapido.co | 761196 | pc & other d | 728x90 | 0<>pc & other devices | 0 |
| 7208066 | 0 | ebay.it | 760654 | pc & other d | 300x250 | 7<>pc & other devices | 0 |
| 7208066 | 0 | ebay.it | 760654 | pc & other d | 300x250 | 7<>pc & other devices | 0 |
| 777777 | 0 | outlook.com | 281403 | pc & other d | 160x600 | 7<>pc & other devices | 0 |
| 777777 | 0 | outlook.com | 281403 | pc & other d | 160x600 | 7<>pc & other devices | 0 |
| 999999 | 0 | subito.it | 485424 | pc & other d | 728x90 | 6<>pc & other devices | 0 |
| 7471254 | 0 | business.it | 790787 | pc & other d | 728x90 | 5<>pc & other devices | 0 |
| 777777 | 0 | outlook.com | 281403 | pc & other d | 160x600 | 3<>pc & other devices | 0 |
| 8951404 | 2 | volagratis.co | 763884 | pc & other d | 160x600 | 7<>pc & other devices | 0 |
| 7332195 | 2 | casa.it | 760947 | pc & other d | 300x250 | 6<>pc & other devices | 0 |

Features Dataframe

| event_type |
|---|
| 0 |
| 1 |
| 0 |
| 0 |
| 0 |
| 1 |
| 0 |
| 0 |
| 1 |
| 1 |
| 0 |
| 0 |
| 0 |
| 0 |
| 0 |
| 0 |
| 0 |
| 0 |
| 0 |

Labels Dataframe

FIGURE 12: DBMLII SCREENSHOT

| placement | position | domain | publisher | device_type | size | user_hour<> | supply_type |
|---|---|---|---|---|---|---|---|
| 8 | 1 | 150 | 200 | 1 | 2 | 3 | 0 |
| 234 | 2 | 108 | 101 | 1 | 1 | 4 | 0 |
| 300 | 0 | 318 | 174 | 1 | 3 | 6 | 0 |
| 429 | 0 | 163 | 59 | 1 | 2 | 2 | 0 |
| 397 | 2 | 23 | 183 | 1 | 2 | 4 | 0 |
| 397 | 2 | 23 | 183 | 1 | 2 | 4 | 0 |
| 365 | 1 | 3 | 170 | 1 | 3 | 5 | 0 |
| 365 | 1 | 3 | 170 | 1 | 3 | 5 | 0 |
| 365 | 1 | 3 | 170 | 1 | 3 | 5 | 0 |
| 227 | 1 | 205 | 111 | 1 | 3 | 0 | 0 |
| 234 | 0 | 108 | 101 | 1 | 2 | 8 | 0 |
| 234 | 0 | 108 | 101 | 1 | 2 | 8 | 0 |
| 365 | 0 | 291 | 26 | 1 | 1 | 8 | 0 |
| 365 | 0 | 291 | 26 | 1 | 1 | 8 | 0 |
| 429 | 0 | 355 | 42 | 1 | 3 | 6 | 0 |
| 300 | 0 | 49 | 174 | 1 | 3 | 5 | 0 |
| 365 | 0 | 291 | 26 | 1 | 1 | 3 | 0 |
| 395 | 2 | 410 | 145 | 1 | 1 | 8 | 0 |
| 280 | 2 | 63 | 105 | 1 | 2 | 6 | 0 |

Label Encoded Features Dataframe

FIGURE 13: DBMLII SCREENSHOT

```
[-0.17700890028783356, 1.9287566479212974, 2.9377838936659177, 3.1769131366744543,
-0.15059613906750008, -0.4032629702719981, -0.10164942771597448,
-0.08697390697992927, -1.7999933043288194, 4.619905656249692, -0.22680652484375505,
-0.2560729621381 51, -0.525696268864059, -0.34153644912096803, -0.1300621587461167,
-0.15730029077253274, -0.11600820657315139, -0.15730029077253274, ... ]
```

Logistic Regression Weights List

```
if position = 0:
        if every user_hour in (1, 0, 2), device_type = "gameconsole":
                if placement = 10005344:
                        value: 0.8260
                elif placement in (10005346, 6937061):
                        value: 0.4381
                elif placement = 10033062:
                        value: 0.4870
                elif placement = 10033071:
                        value: 0.9333
                . . .
```

Bonsai Tree

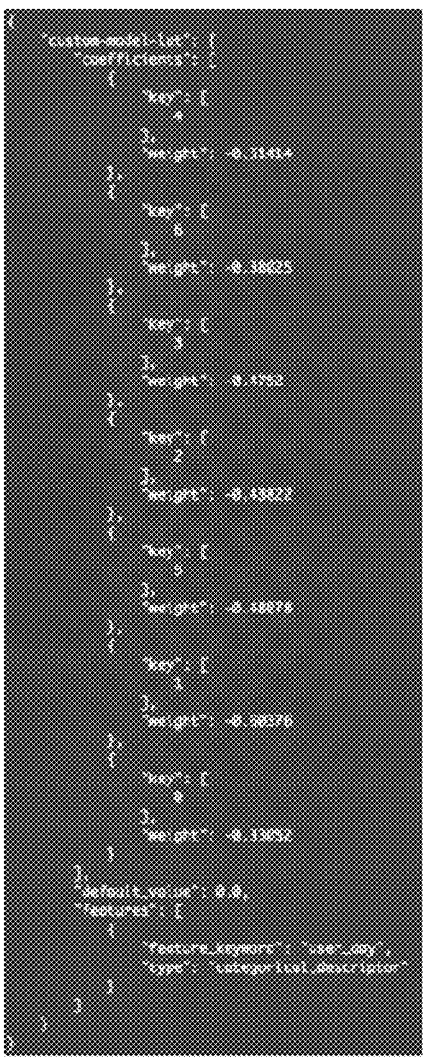

Look Up Table

```
{
    "custom-model-logit": {
        "beta0": -12.0833,
        "max": 1.0,
        "member_id": 3719,
        "min": 0.1,
        "name": "firstGenieTest",
        "offset": 0.0,
        "predictors": [
            {
                "lut_id": 553,
                "type": "lookup"
            },
            {
                "lut_id": 92,
                "type": "lookup"
            },
            {
                "lut_id": 744,
                "type": "lookup"
            }
        ],
        "scale": 1.0
    }
}
```

Logit JSON

FIGURE 14: DBMLII SCREENSHOT

```
{ ⊟
   "total_volume":25971,
   "feature_weights_and_counts":{ ⊟
      "supply_type":{ ⊟
         "1":{ ⊟
            "count":4115,
            "weight":-0.1160157894
         },
         "0":{ ⊟
            "count":18570,
            "weight":-0.9918028388
         },
         "2":{ ⊟
            "count":3286,
            "weight":0.5585212582
         }
      },
      "placement_group":{ ⊟
         "1210641":{ ⊟
            "count":184,
            "weight":-1.0796570583
         },
         "1272082":{ ⊟
            "count":319,
            "weight":0.0286382217
```

Feature Weights and Counts

FIGURE 15: DBMLII SCREENSHOT

```
class GetFeaturesFromChi2:
    """
    Select top N features using chi squared test. Features most independent of class (click/nonclick)
    and thus irrelevant for classification are weeded out.
    NOTE: this test is used slightly incorrectly because the dataframe should be one hot encoded (OHE), but it still
    picks out the variables with which logistic regression performs well. We don't do OHE, because we need to
    pick top features such as domain, not domain=msn.com.
    Inputs: dataframe returned by filtering
    Outputs: a list of N features deemed most dependant on the labels
    """
    COLUMNS_TO_DROP =  'buyer_spend', 'serving_fees_revshare', 'creative_id', 'creative_freq', 'campaign_id',
                       'pixel_id', 'pixel_type'
    CORRELATED_FEATURES =   'os_extended', 'browser', 'device_type', 'supply_type', 'carrier', 'device_model' ,
                            'country', 'region' ,
                            'placement', 'placement_group', 'publisher', 'seller_member_id', 'domain'

    def __init__(self, df: pd.DataFrame, top_n: int, features_to_exclude: Set str  = None)
        self.df = df
        self.top_n = top_n
        self.features_to_exclude = features_to_exclude or set()

    def run(self) -> FeatureSelectResult:
        x = self.df
        # Gather all of the columns to be deleted from the dataframe
        cols_to_drop = set(self.COLUMNS_TO_DROP)
        cols_to_drop |= self.features_to_exclude
        cols_to_drop |= self.get_columns_with_only_one_value(x)

        x = x.drop(cols_to_drop, axis=1)  # type: pd.DataFrame

        x 'not_imp'  = (x.event_type != 0).astype(int)
        y = x.not_imp
        x.drop( 'event_type', 'not_imp' , axis=1, inplace=True)

        # Do label encoding
        orig_cols = x.columns
        for c in orig_cols:
            le = LabelEncoder()
            vi = x c .first_valid_index()
            if isinstance(x c .iloc vi , str):
                try:
                    x c  = le.fit_transform(x c )
                except TypeError as e:
                    raise Exception(
                        'Cannot proceed; Check that all values are actually strings for column {}'.format(c)) from e

        ch2 = SelectKBest(chi2, k=1)
        x_new = ch2.fit_transform(x, y)
        scores =  c: ch2.scores_ n  for n, c in enumerate(orig_cols)
        sorted_features = sorted(scores, key=scores.get, reverse=True)

        # Remove correlated features from the list with smaller chi2 values
        reduced_sorted_features = GetFeaturesFromChi2.remove_correlated_features(sorted_features)

        top_features = reduced_sorted_features :self.top_n
```

FIGURE 18: DBMLII SCREENSHOT

1801

FIGURE 19: DBMLII SCREENSHOT

FIGURE 20: DBMLII SCREENSHOT

FIGURE 22: DBMLII SCREENSHOT

FIGURE 23: DBMLII SCREENSHOT

FIGURE 25A: DBMLII DATA FLOW
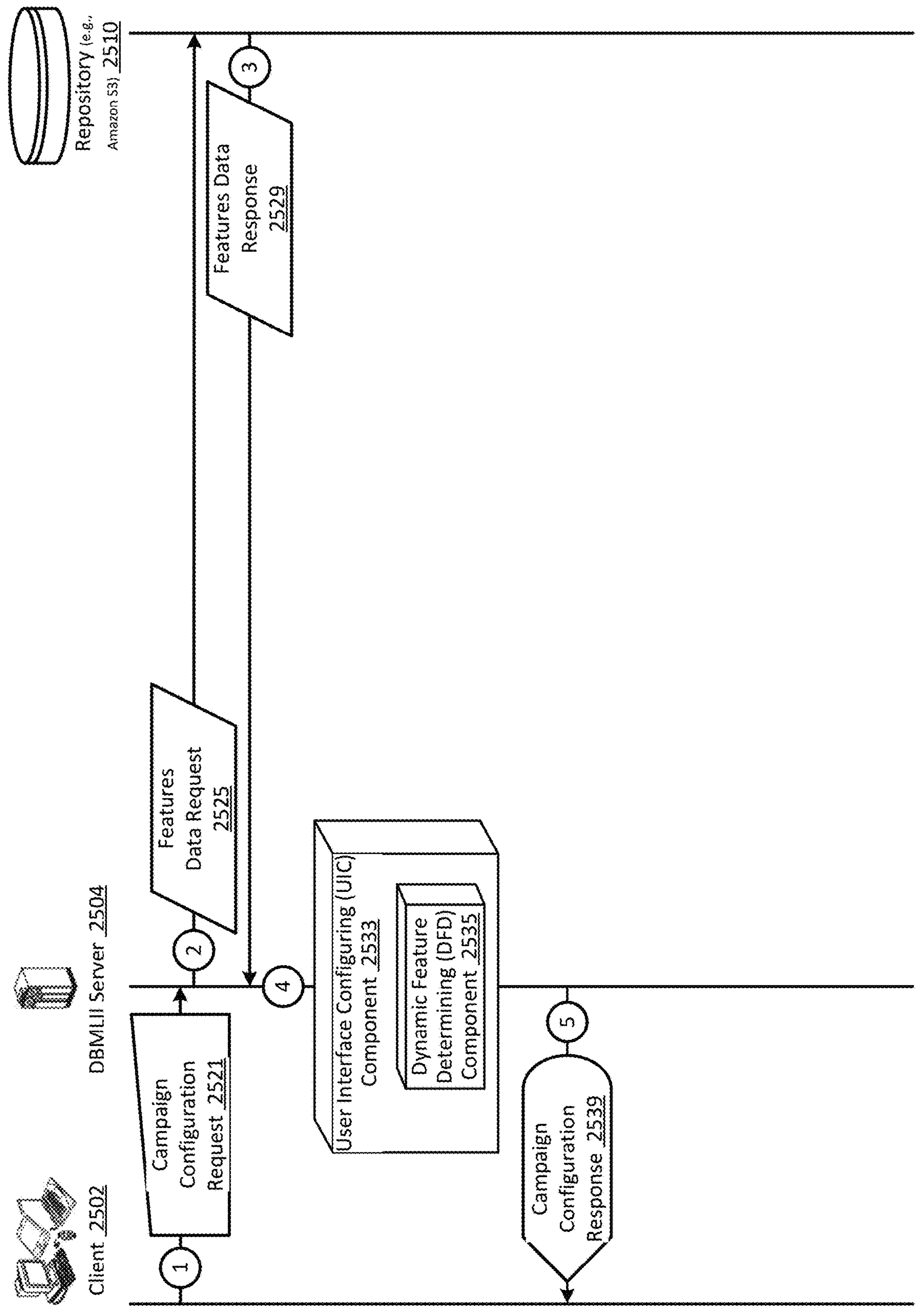

FIGURE 25B: DBMLII DATA FLOW
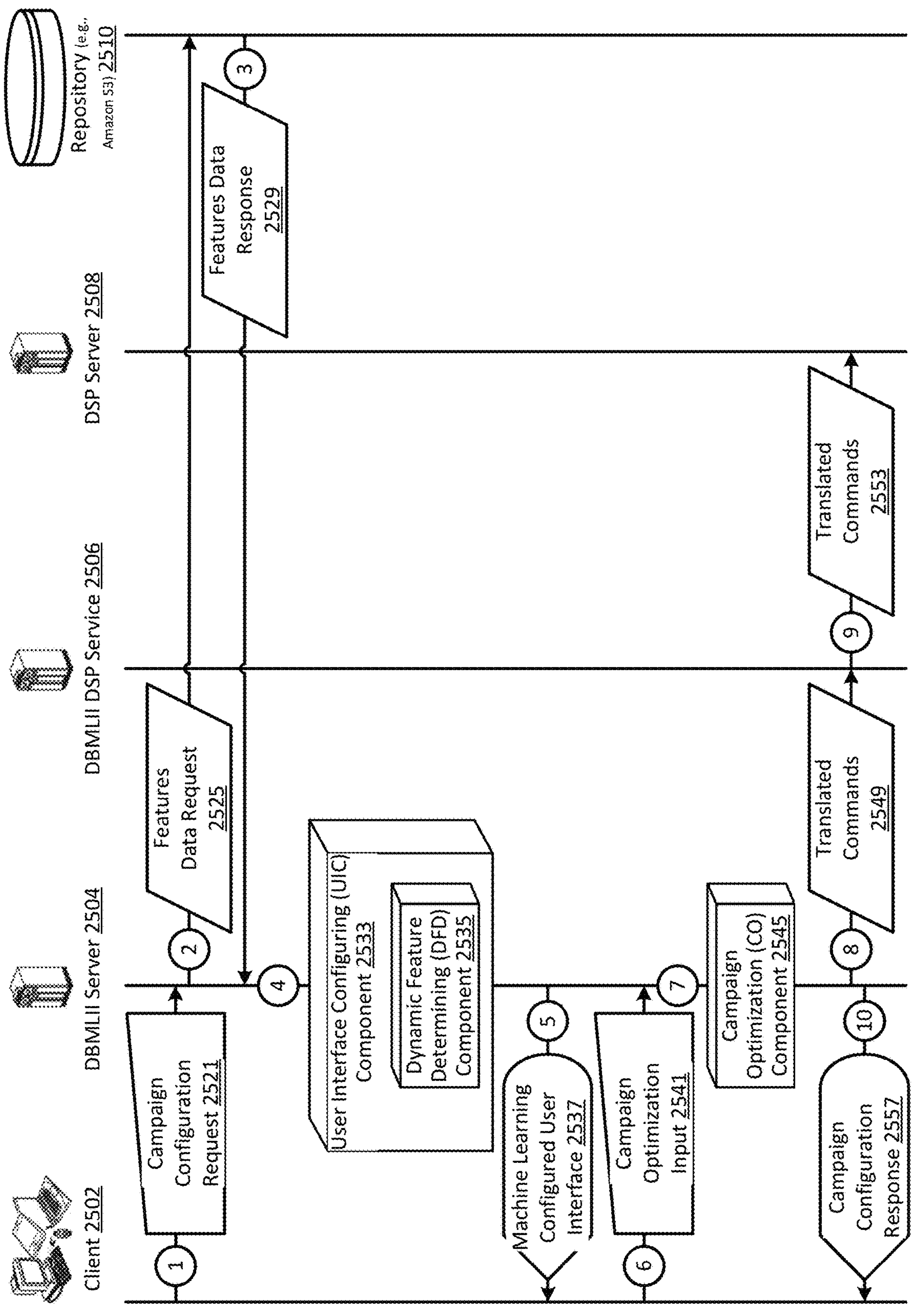

FIGURE 26A: DBMLII UIC COMPONENT
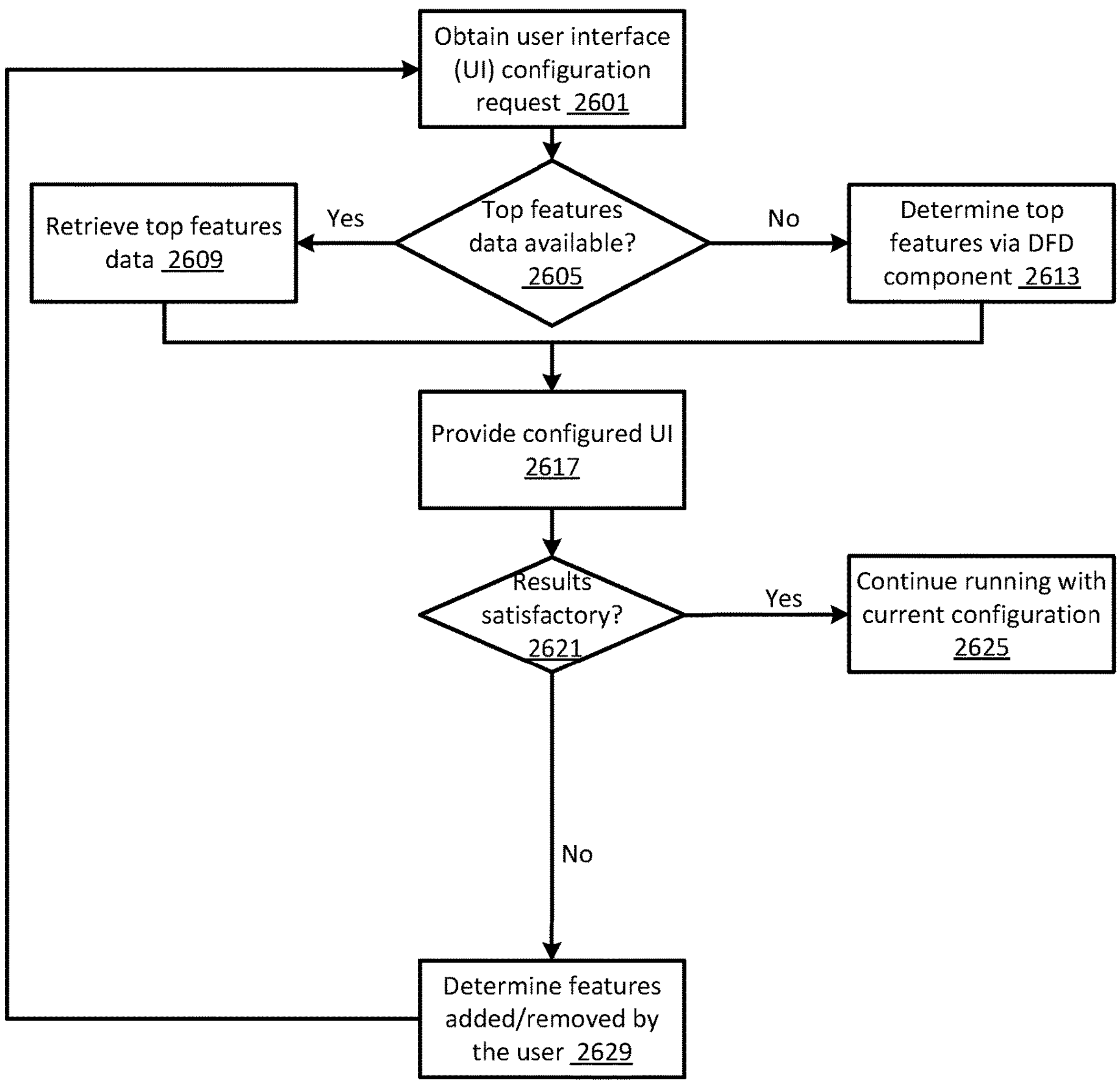

FIGURE 26B: DBMLII UIC COMPONENT
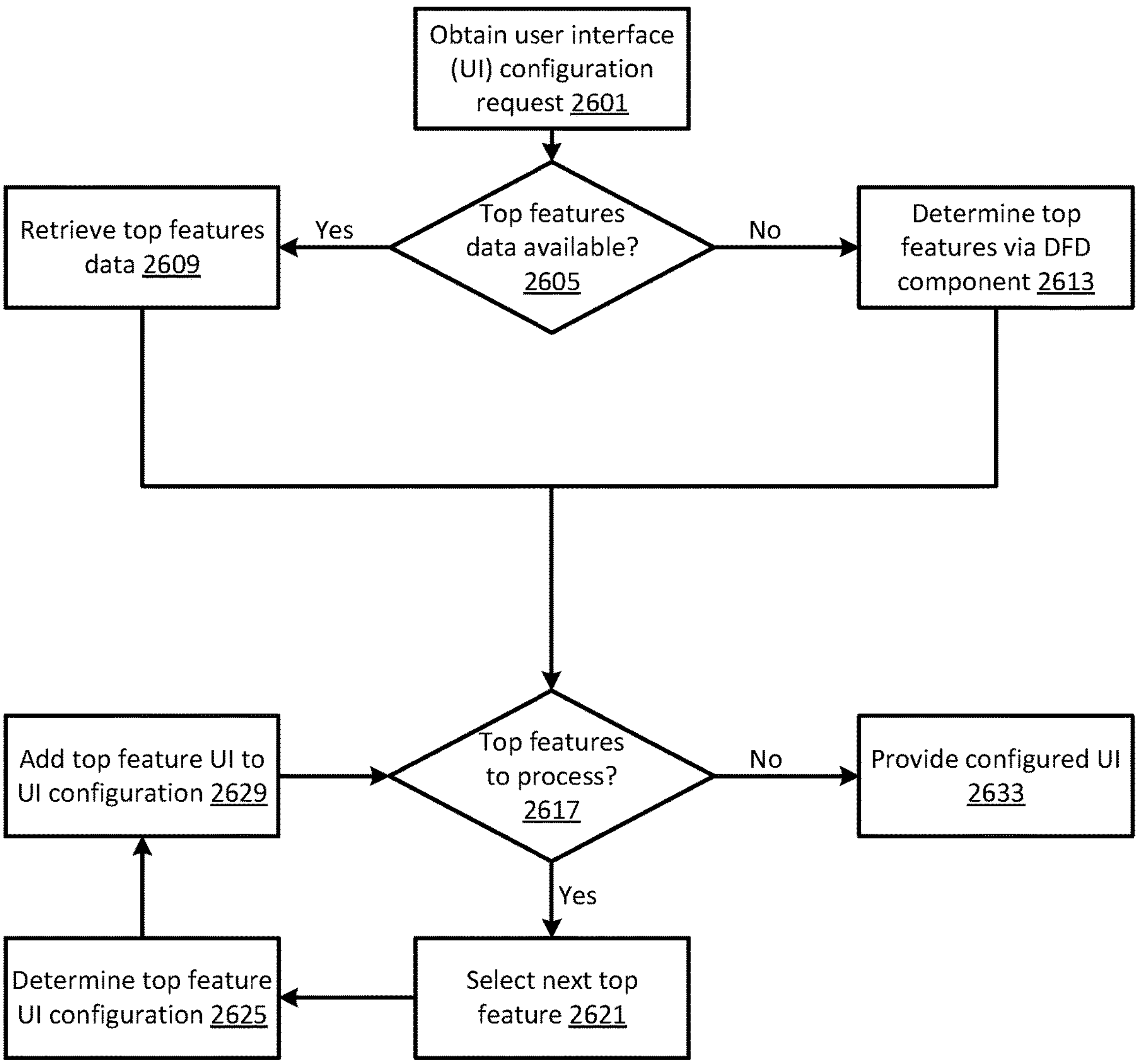

FIGURE 27: DBMLII CO COMPONENT
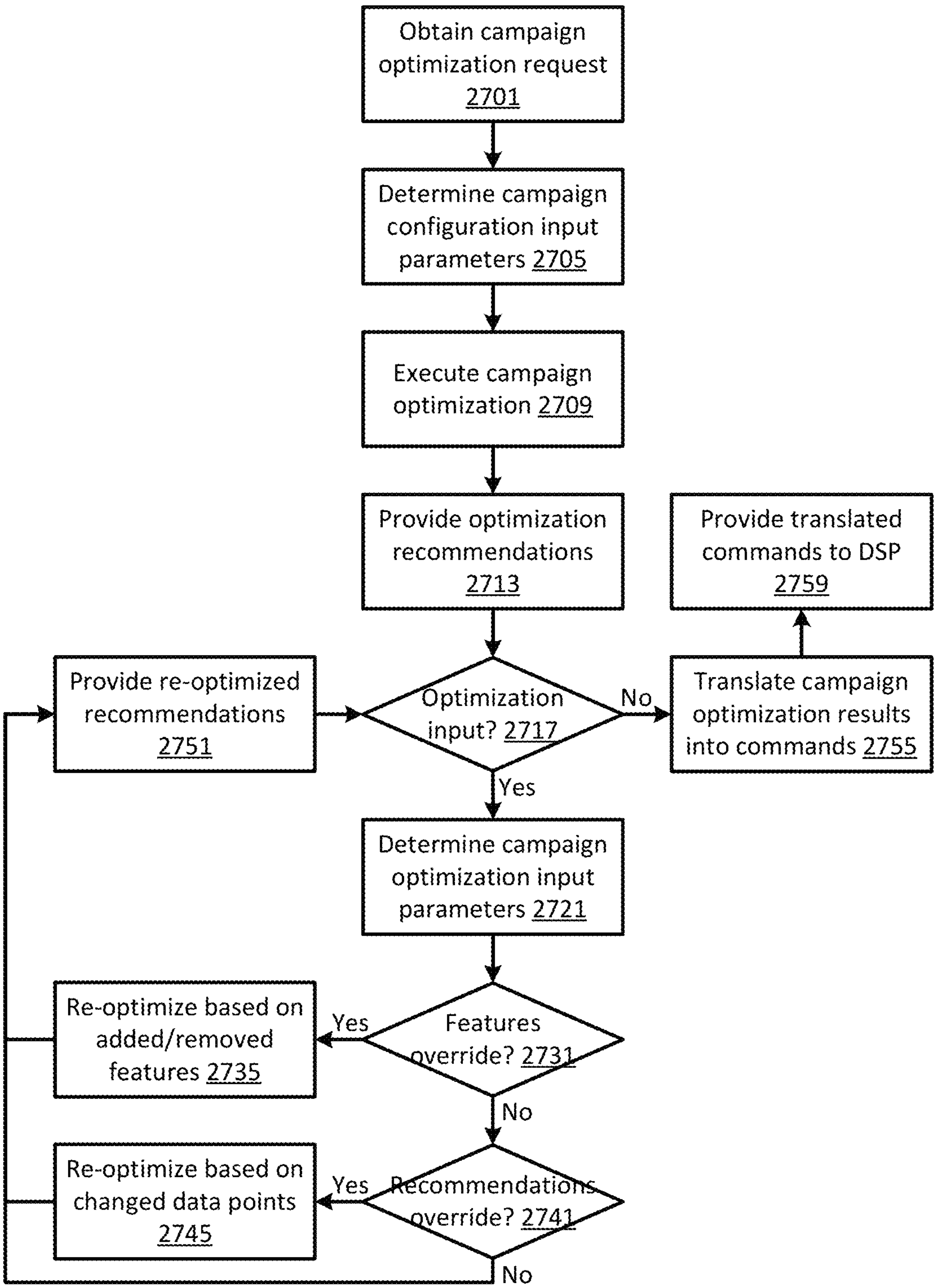

Figure 28:
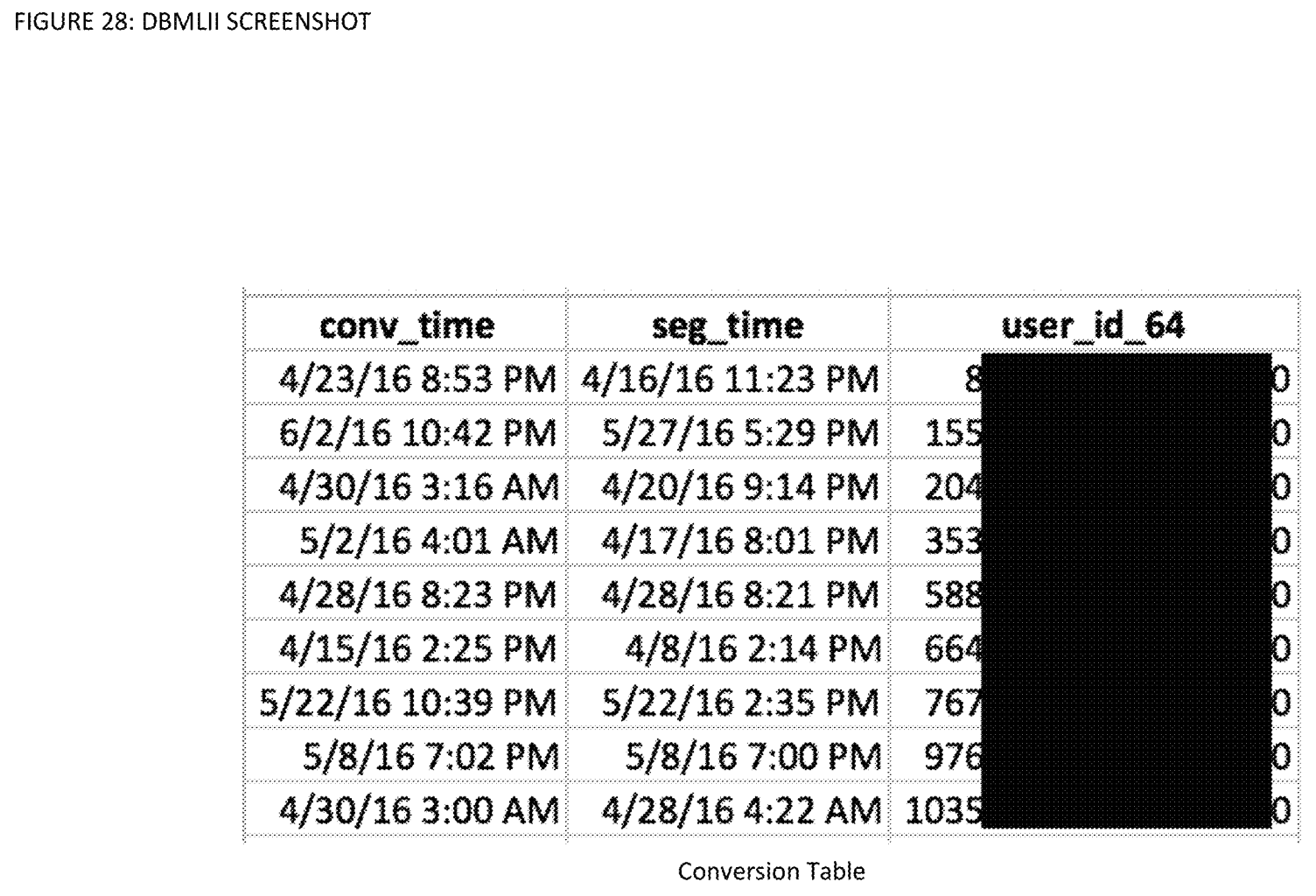

FIGURE 28: DBMLII SCREENSHOT

| conv_time | seg_time | user_id_64 |
|---|---|---|
| 4/23/16 8:53 PM | 4/16/16 11:23 PM | 8[redacted]0 |
| 6/2/16 10:42 PM | 5/27/16 5:29 PM | 155[redacted]0 |
| 4/30/16 3:16 AM | 4/20/16 9:14 PM | 204[redacted]0 |
| 5/2/16 4:01 AM | 4/17/16 8:01 PM | 353[redacted]0 |
| 4/28/16 8:23 PM | 4/28/16 8:21 PM | 588[redacted]0 |
| 4/15/16 2:25 PM | 4/8/16 2:14 PM | 664[redacted]0 |
| 5/22/16 10:39 PM | 5/22/16 2:35 PM | 767[redacted]0 |
| 5/8/16 7:02 PM | 5/8/16 7:00 PM | 976[redacted]0 |
| 4/30/16 3:00 AM | 4/28/16 4:22 AM | 1035[redacted]0 |

Conversion Table

FIGURE 29: DBMLII SCREENSHOT

| Bucket Number | Start (inclusive) | End (not inclusive) |
|---|---|---|
| 1 | 0 minutes | 4 minutes |
| 2 | 4 | 8 |
| 3 | 8 | 16 |
| 4 | 16 | 24 |
| 5 | 24 | 40 |
| 6 | 40 | 56 |
| 7 | 56 | 88 |
| 8 | 88 | 120 |
| 9 | 120 | 184 |
| 10 | 184 | 248 |
| 11 | 248 | 376 |
| 12 | 376 | 504 |
| 13 | 504 | 760 |
| 14 | 760 | 1016 |
| 15 | 1016 | 1528 |
| 16 | 1528 | 2040 |
| 17 | 2040 | 3064 |
| 18 | 3064 | 4088 |
| 19 | 4088 | 6136 |
| 20 | 6136 | 8148 |
| 21 | 8148 | 12280 |
| 22 | 12280 | 16376 |
| 23 | 16376 | 24568 |
| 24 | 24568 | 32760 |
| 25 | 32760 | 49144 |
| 26 | 49144 | 65528 |

Bucket Sizes

FIGURE 30: DBMLII SCREENSHOT

| A | B | C | D | E | F |
|---|---|---|---|---|---|
| Bucket | Conversions | Impressions | Conversion Rate | CR Forward (3-day MAV) | Normalized CR Forward |
| 4 | 2799 | 147 | 1904.082% | 909.297% | 1904.08% |
| 8 | 580 | 107 | 542.056% | 313.165% | 655.77% |
| 16 | 386 | 137 | 281.752% | 163.766% | 342.93% |
| 24 | 118 | 102 | 115.686% | 85.360% | 178.75% |
| 40 | 107 | 114 | 93.860% | 56.751% | 118.84% |
| 56 | 47 | 101 | 46.535% | 37.480% | 78.48% |
| 88 | 63 | 211 | 29.858% | 32.936% | 68.97% |
| 120 | 31 | 86 | 36.047% | 24.959% | 52.26% |
| 184 | 51 | 155 | 32.903% | 30.360% | 63.58% |
| 248 | 8 | 135 | 5.926% | 37.824% | 79.20% |
| 376 | 58 | 111 | 52.252% | 41.490% | 86.88% |
| 504 | 47 | 85 | 55.294% | 27.682% | 57.97% |
| 760 | 22 | 130 | 16.923% | 13.445% | 28.15% |
| 1016 | 17 | 157 | 10.828% | 11.924% | 24.97% |
| 1528 | 130 | 1033 | 12.585% | 13.307% | 27.87% |
| 2040 | 33 | 267 | 12.360% | 12.782% | 26.77% |
| 3064 | 102 | 681 | 14.978% | 13.013% | 27.25% |
| 4088 | 36 | 327 | 11.009% | 12.503% | 26.18% |
| 6136 | 148 | 1134 | 13.051% | 11.552% | 24.19% |
| 8184 | 133 | 989 | 13.448% | 11.569% | 24.22% |
| 12280 | 225 | 2758 | 8.158% | 9.912% | 20.76% |
| 16376 | 262 | 2000 | 13.100% | 10.405% | 21.79% |
| 24568 | 372 | 4388 | 8.478% | 9.347% | 19.57% |
| 32760 | 372 | 3860 | 9.637% | 8.914% | 18.67% |
| 49144 | 643 | 6477 | 9.927% | 8.553% | 17.91% |
| 65528 | 534 | 7439 | 7.178% | 7.178% | 15.03% |

Transformations Table

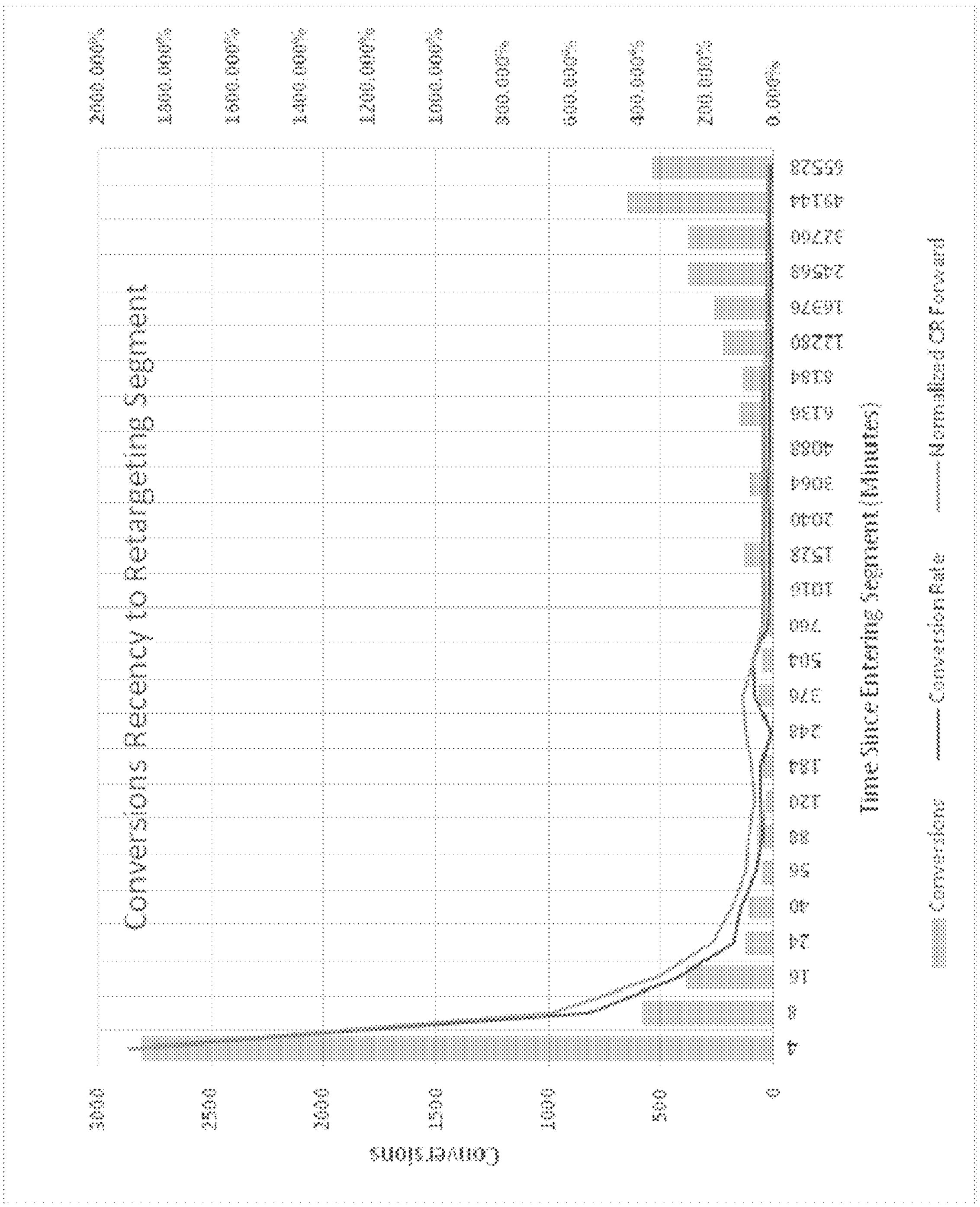
FIGURE 31: DBMLII SCREENSHOT

Figure 32:
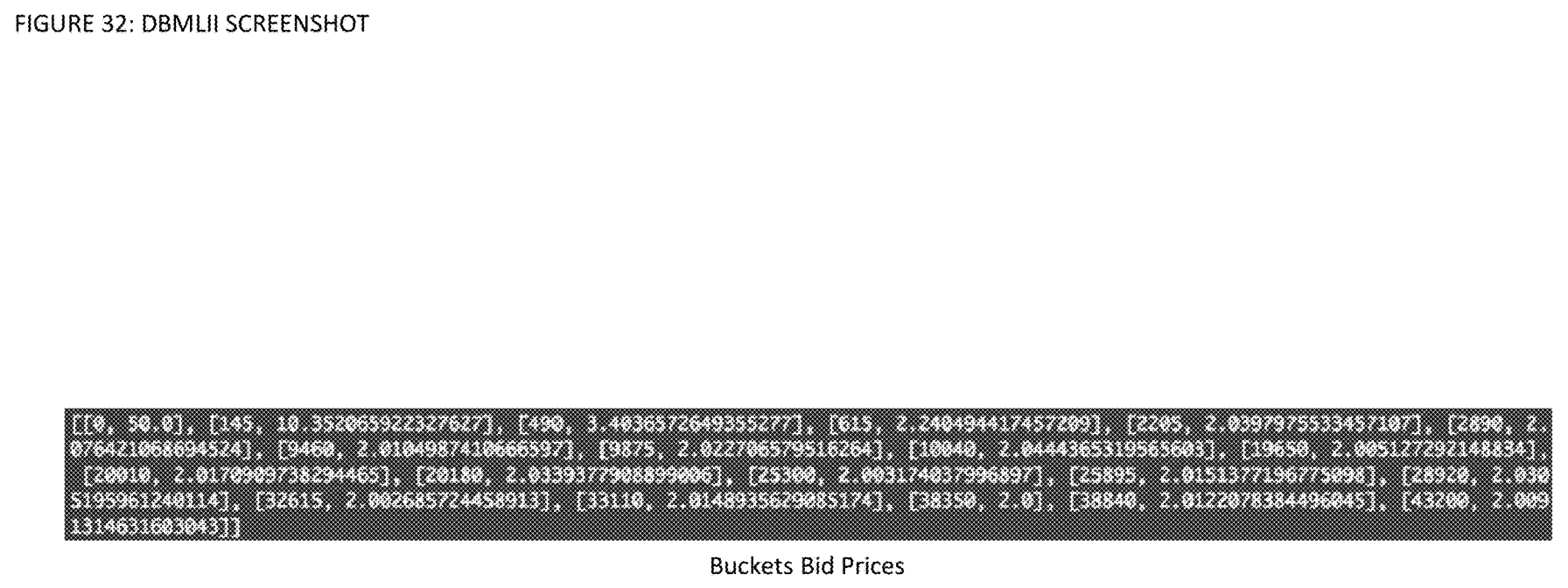

FIGURE 32: DBMLII SCREENSHOT

[[0, 50.0], [145, 10.352065922327627], [490, 3.4036572649355277], [615, 2.240494417457209], [2205, 2.0397975533457107], [2890, 2.076421068694524], [9460, 2.010498741066597], [9875, 2.022706579516264], [10840, 2.0444365319565603], [19650, 2.0051272929148834], [20010, 2.017090973829465], [20180, 2.0339377908899006], [25300, 2.0031740379906897], [25895, 2.0151377196775098], [28920, 2.0305195961240114], [32615, 2.002685724458913], [33110, 2.0148935629085174], [38350, 2.0], [38840, 2.012207838449604 5], [43200, 2.0091314631603043]]

Buckets Bid Prices

FIGURE 33: DBMLII SCREENSHOT
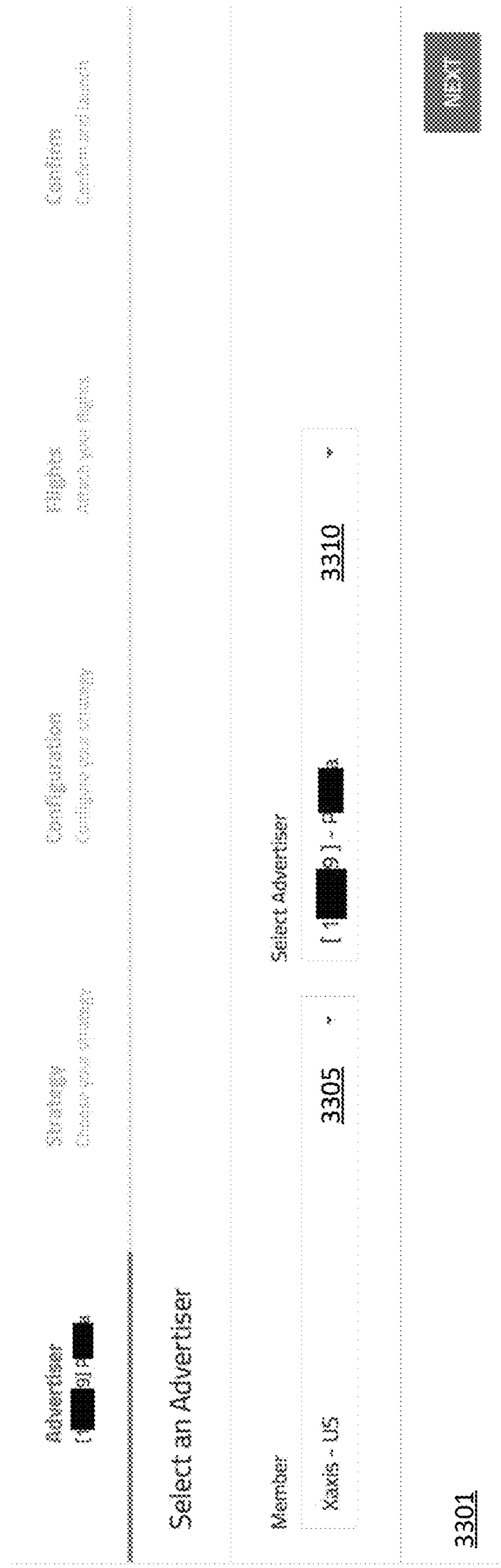

FIGURE 34: DBMLII SCREENSHOT
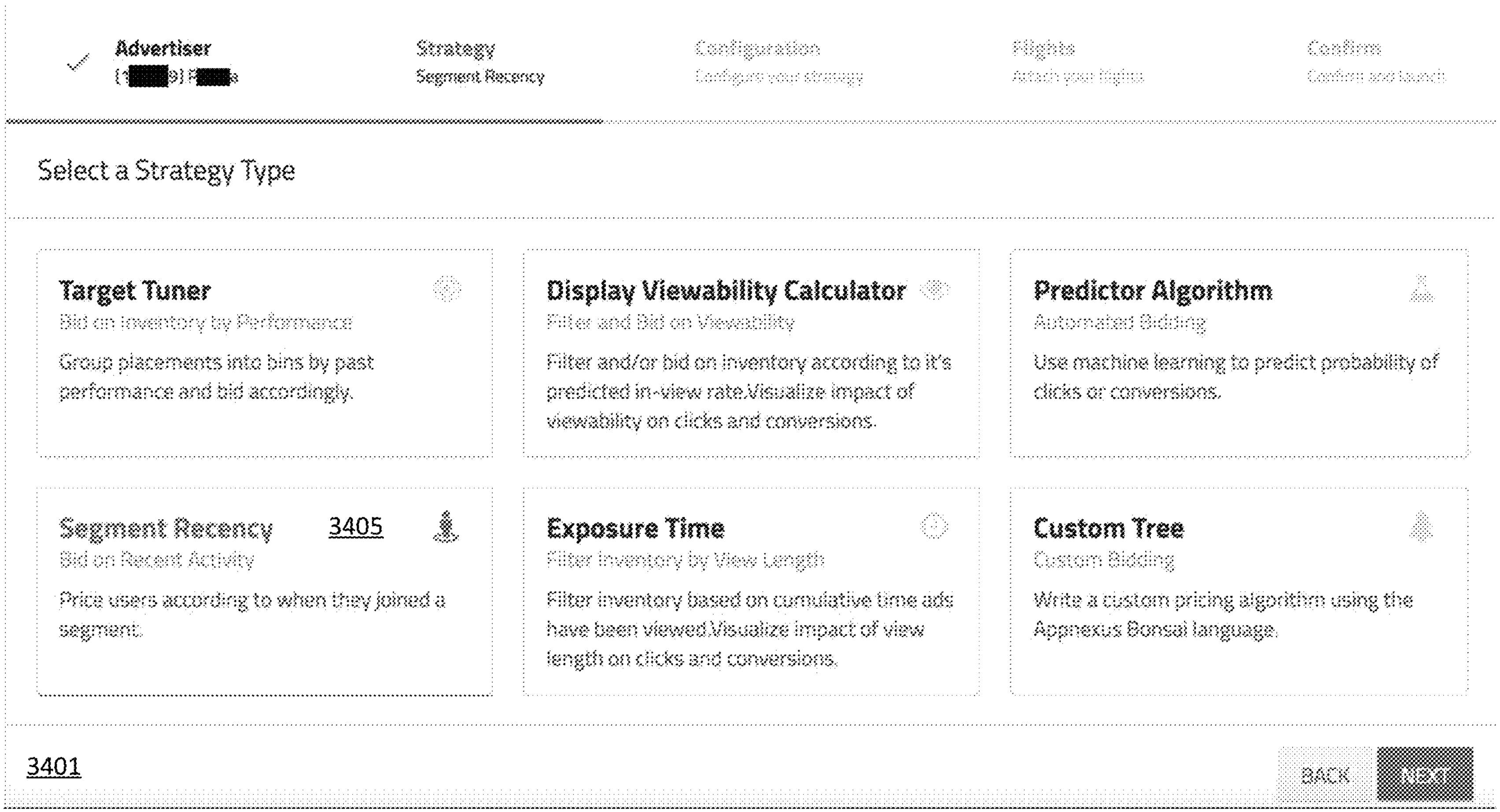

FIGURE 35: DBMLII SCREENSHOT
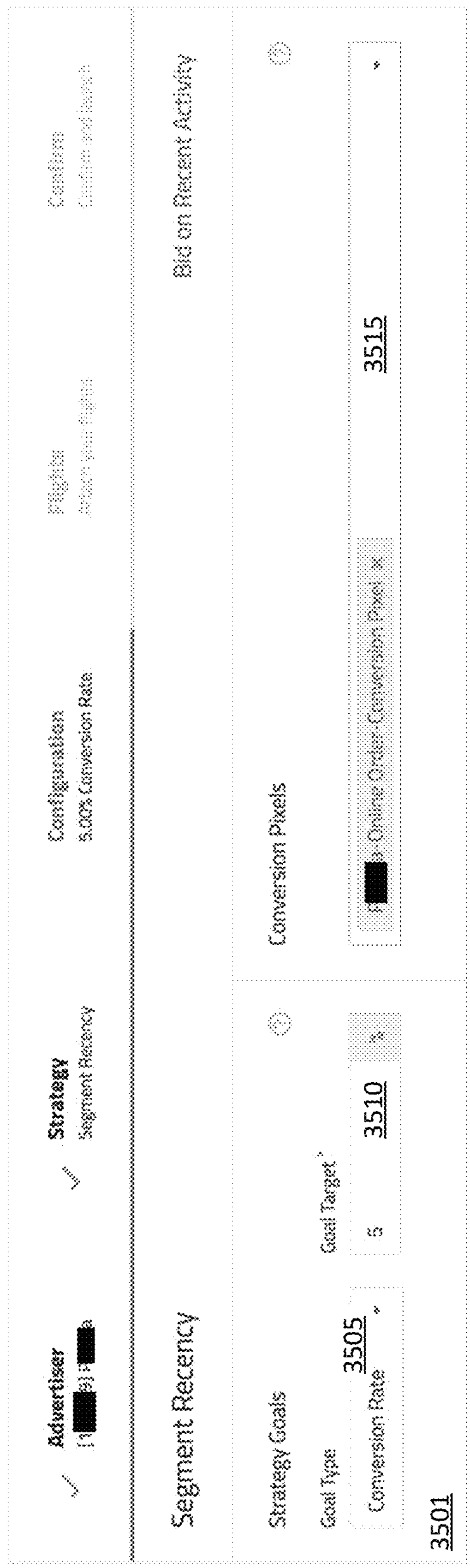

FIGURE 36: DBMLII SCREENSHOT
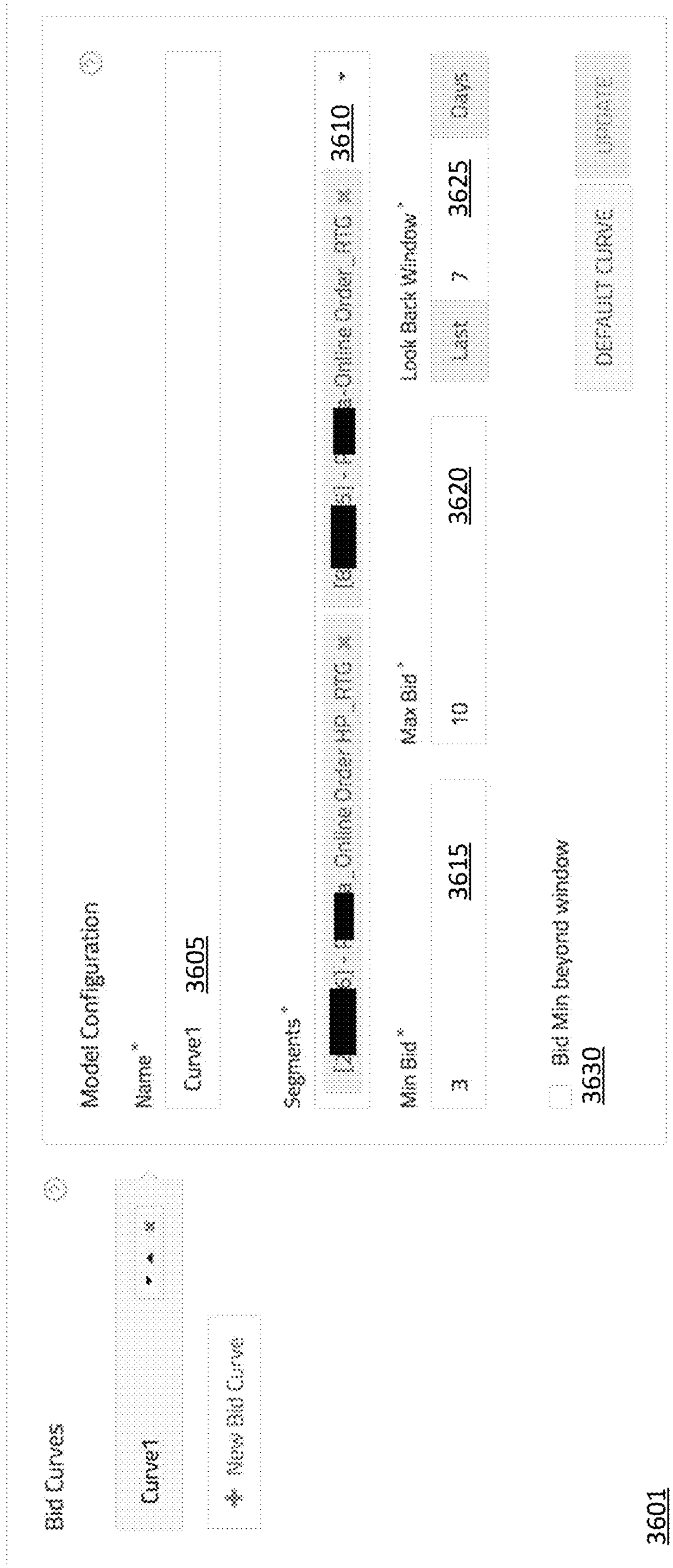

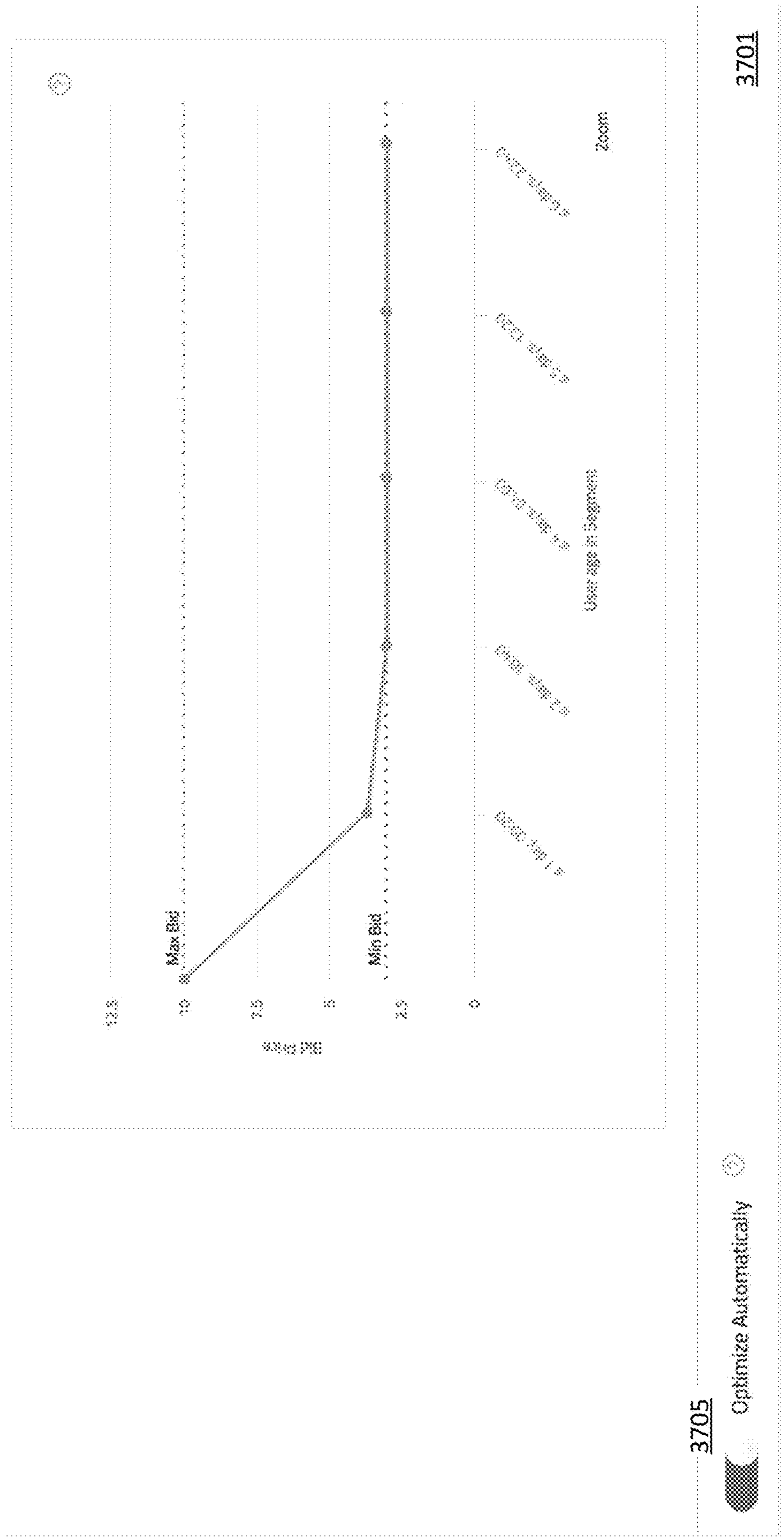
FIGURE 37: DBMLII SCREENSHOT

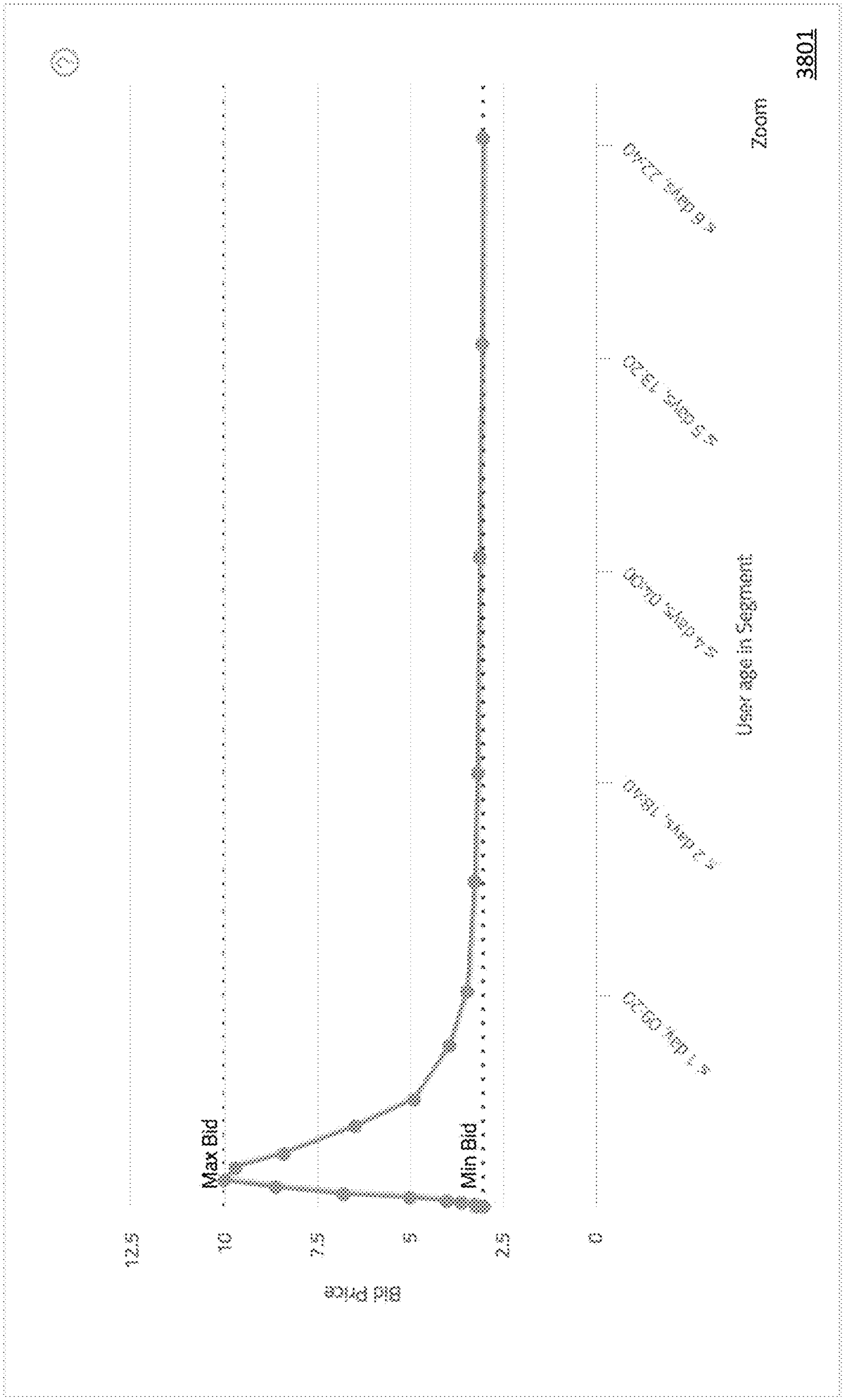
FIGURE 38: DBMLII SCREENSHOT

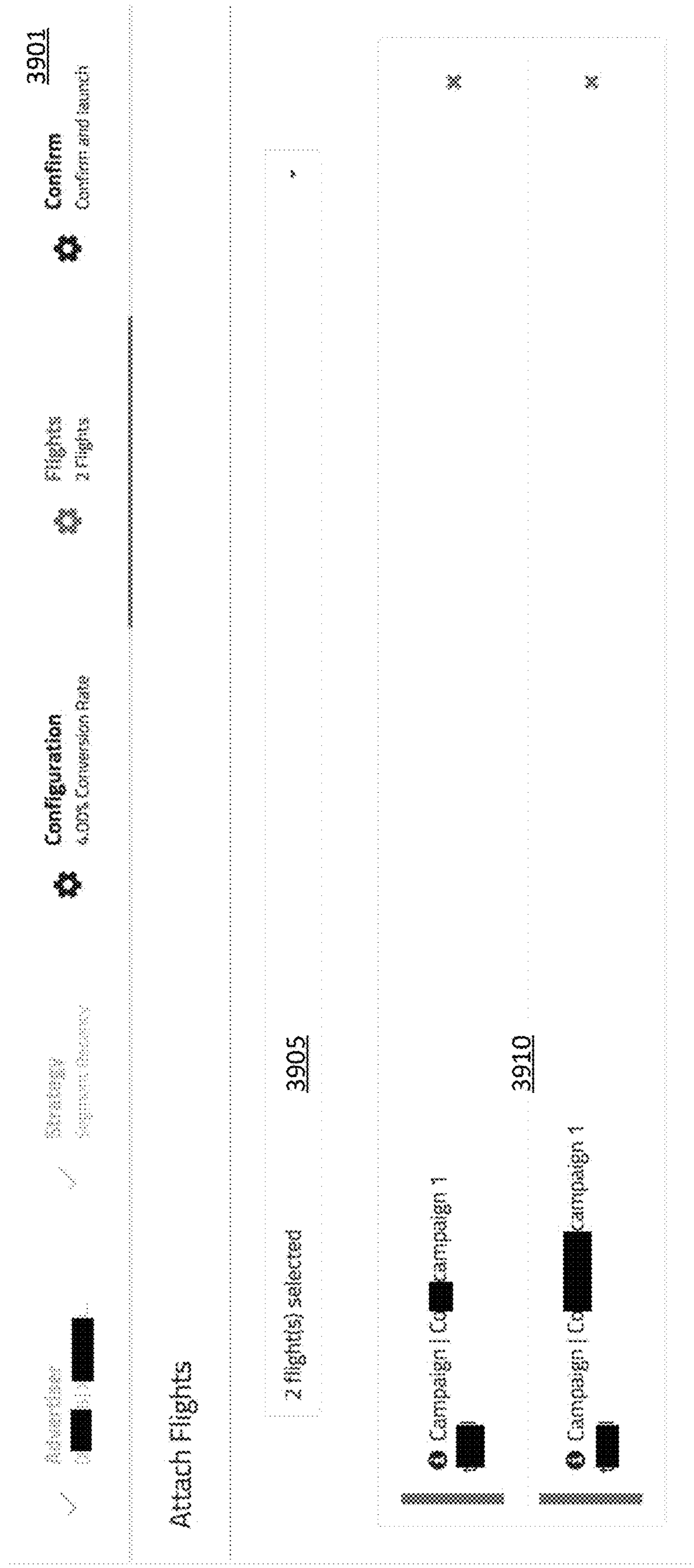
FIGURE 39: DBMLII SCREENSHOT

FIGURE 40: DBMLII SCREENSHOT
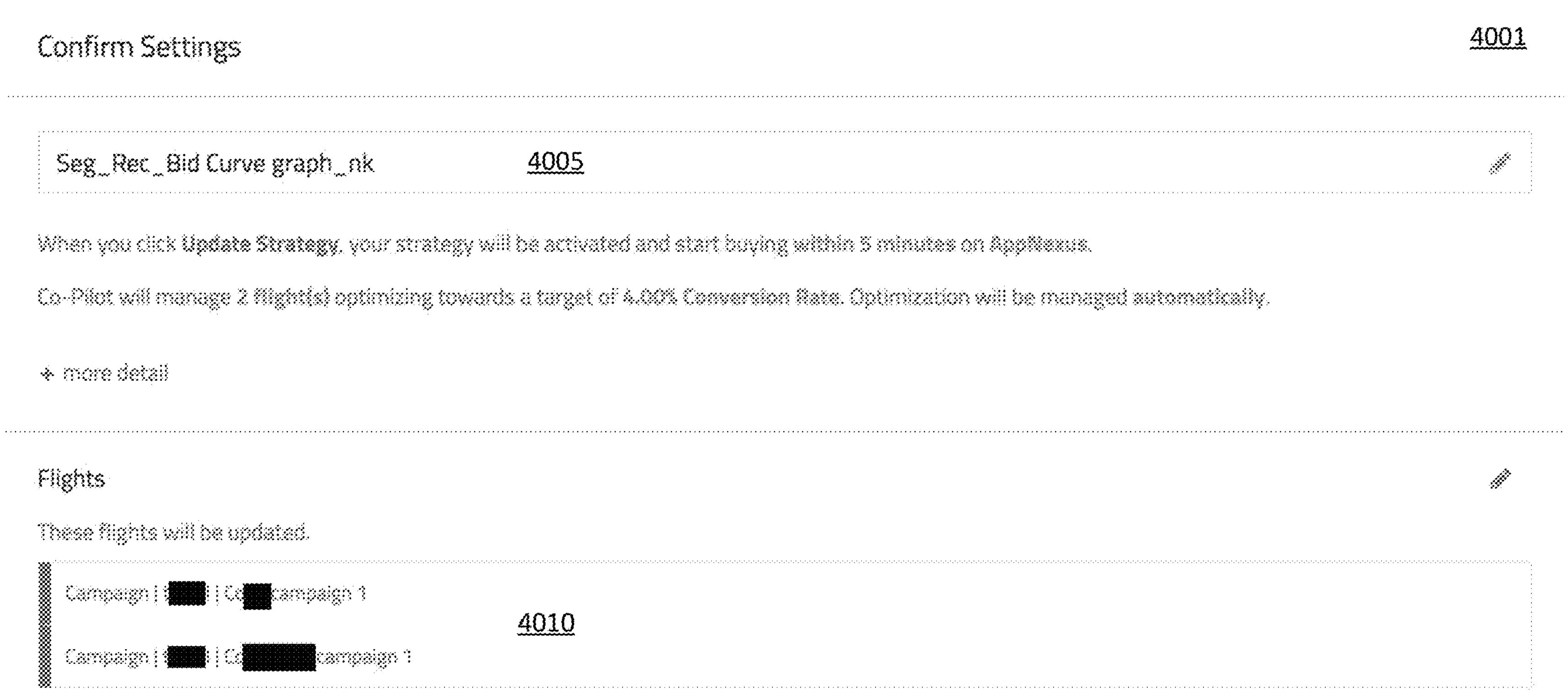

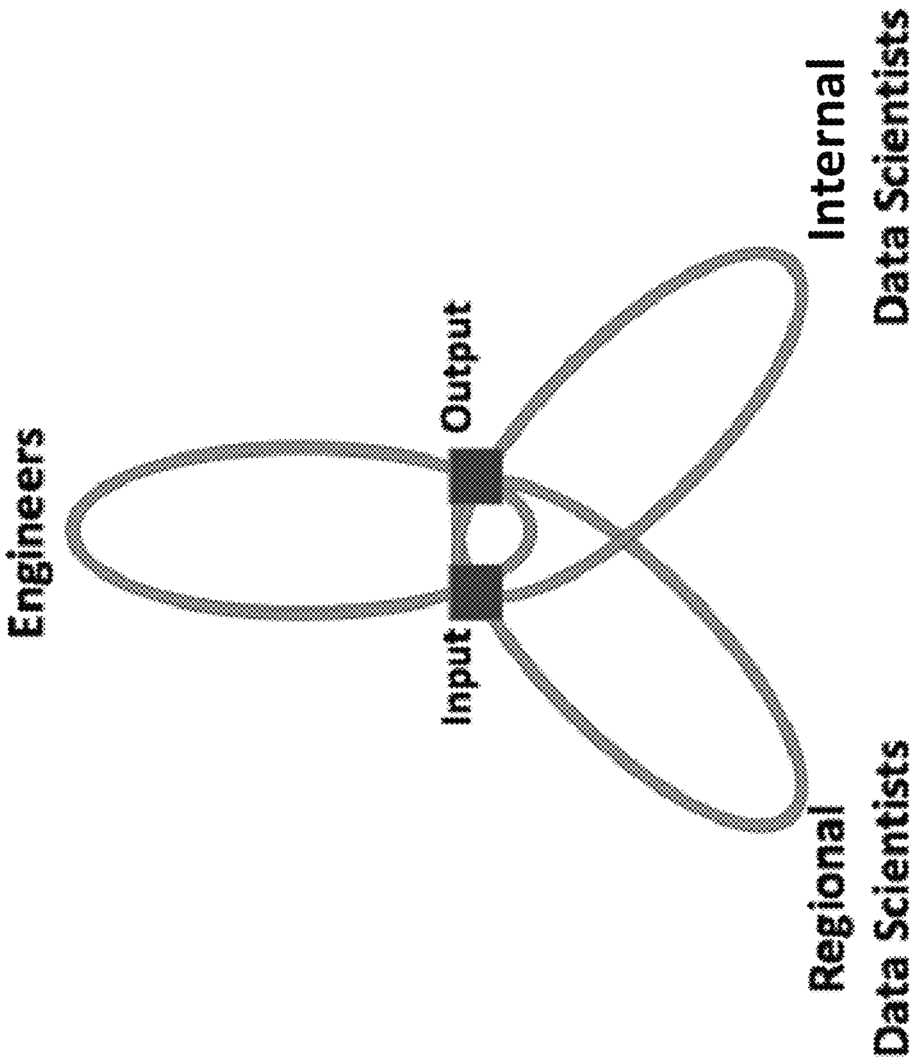
FIGURE 41: DBMLII ARCHITECTURE

FIGURE 43: DBMLII SCREENSHOT
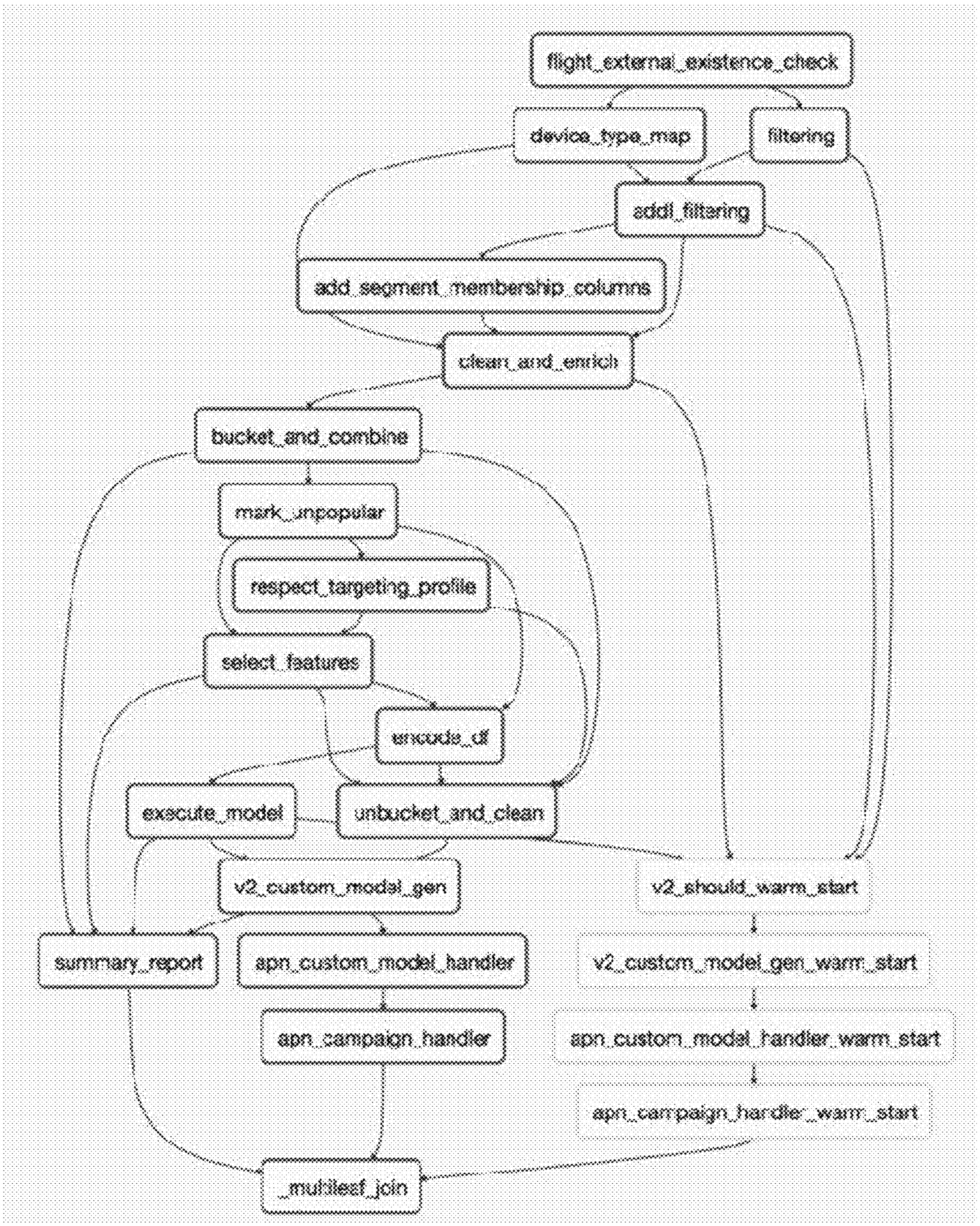

FIGURE 44: DBMLII SCREENSHOT
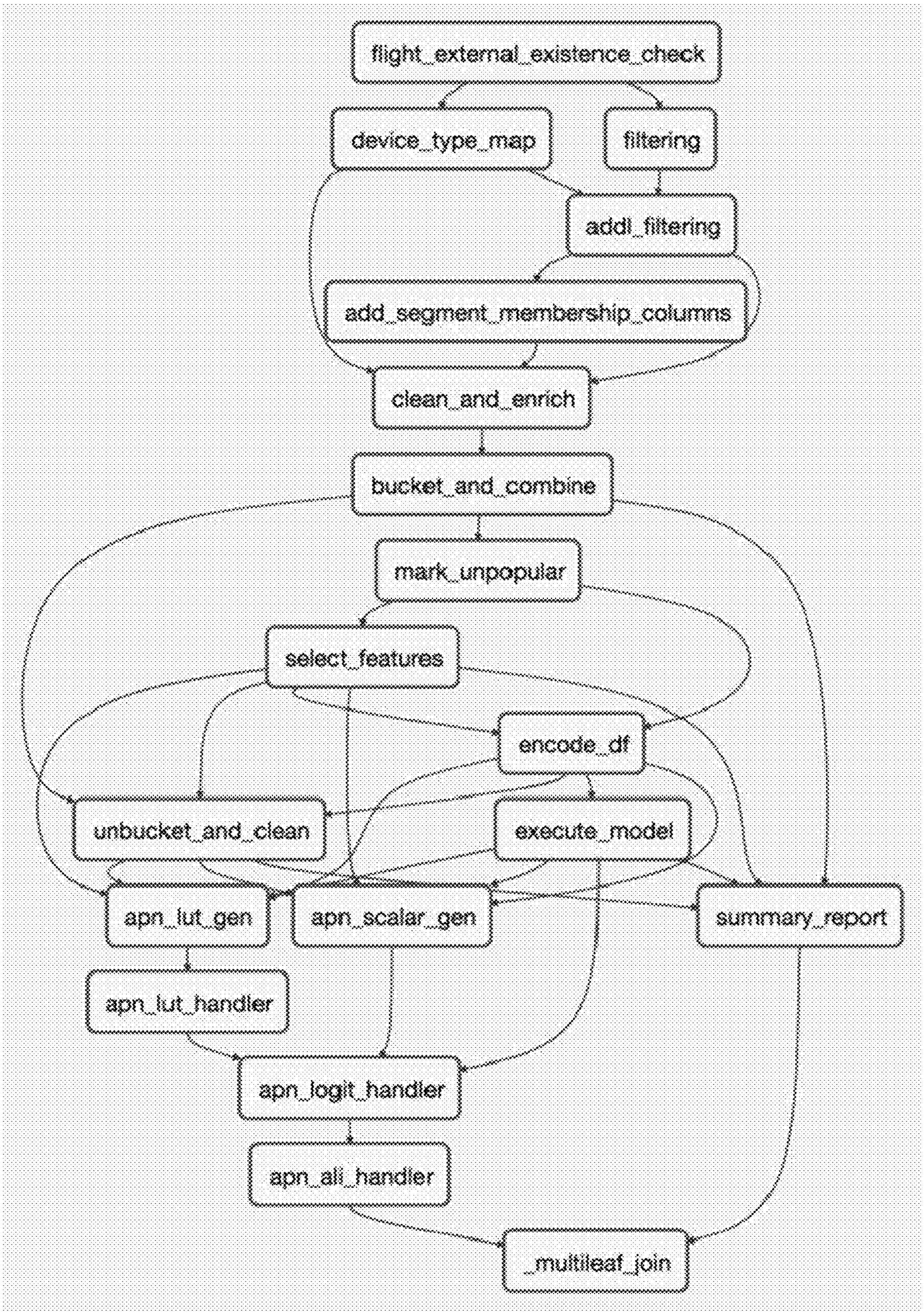

FIGURE 45: DBMLII SCREENSHOT

```
class AFV2SelectFeatures(SelectFeatures, AFInterfaceV2):
    TASK_ID = 'select_features'

    @classmethod
    def af_adjust_args(cls, args_dict: dict, task_instance, dag, dag_run, af_input_paths) -> dict:
        args_dict = super().af_adjust_args(args_dict, task_instance, dag, dag_run, af_input_paths)
        typenames = [TypeName(OutputTypes.features_to_exclude, 'features_to_exclude'),
                     TypeName(OutputTypes.lld_df, 'df')]
        cls._set_missing_args_from_upstream(args_dict, af_input_paths, *typenames)
        cls._update_args_based_on_conf(args_dict, dag_run)

        return args_dict

    def af_run(self, af_input_paths: List[str], af_output_path: str):
        chi2res = self.run()
        self.task_result.write_output(chi2res, OutputTypes.feature_select_output, af_output_path)
```

FIGURE 46: DBMLII Controller
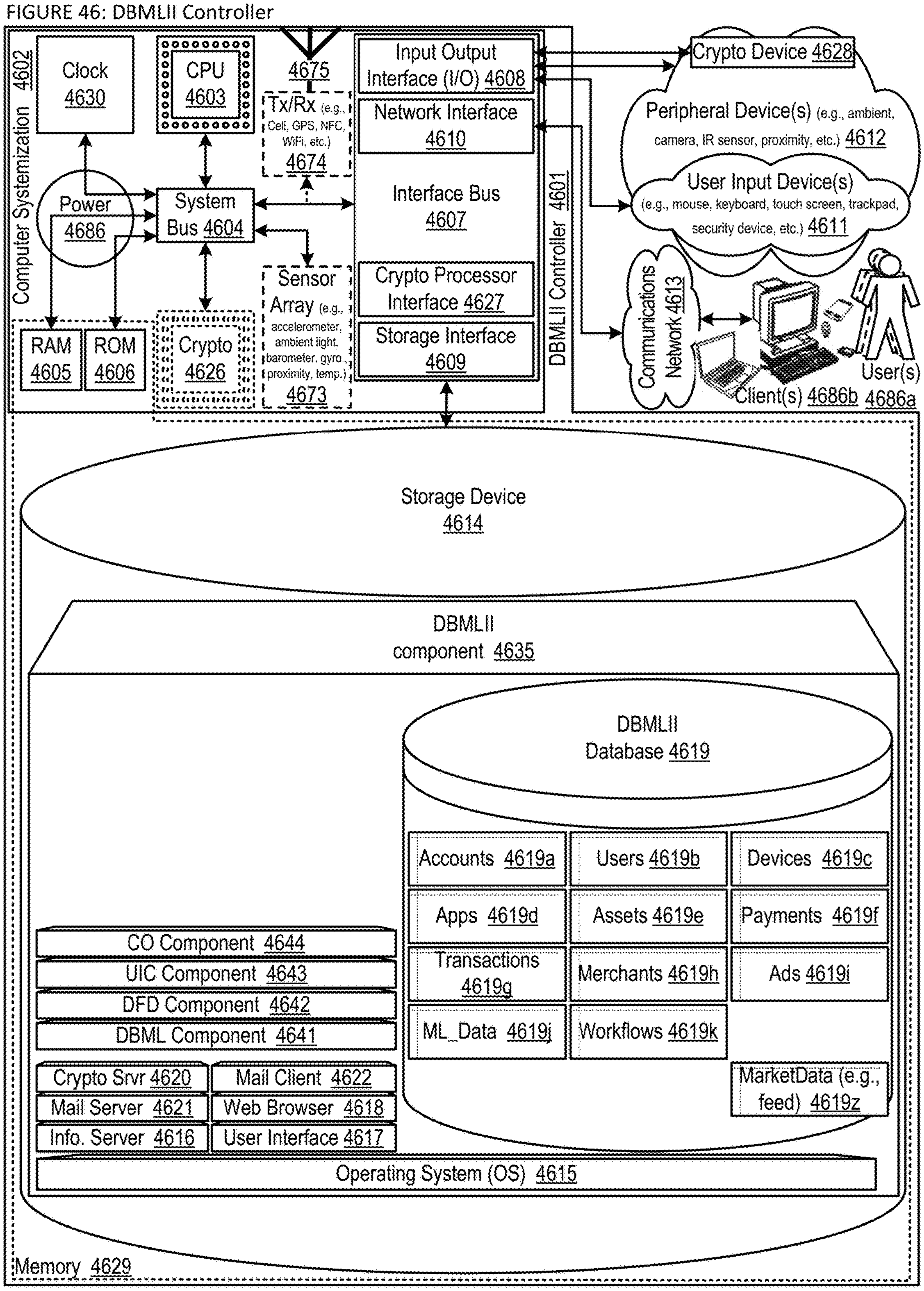

DOUBLE BLIND MACHINE LEARNING INSIGHT INTERFACE APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/489,942, filed Apr. 25, 2017, entitled "Double Blind Machine Learning Insight Interface Apparatuses, Methods and Systems".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned applications are herein expressly incorporated by reference.

FIELD

The present innovations generally address data anonymized machine learning, and more particularly, include Double Blind Machine Learning Insight Interface Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Content providers such as a website could host advertising spaces at their web pages, i.e., by displaying advertising content on a side column of a web page. Advertising networks may provide a variety of ads fed into these ad content portions of content provider web sites. In this way, Internet users who visit the content providers' web pages will be presented advertisements in addition to regular contents of the web pages. Internet users can visit a web page through a user device, such as a computer and a mobile Smartphone. Computers may employ statistical applications such as SAS, to process large amounts of data to discern statistical likelihoods of a frequently experienced data event occurring. Additionally, machine learning employs statistical processing, neural networks, or other systems to determine patterns and relationships between inputs and outputs.

BRIEF DESCRIPTION OF THE DRAWINGS

Appendices and/or drawings illustrating various, non-limiting, example, innovative aspects of the Double Blind Machine Learning Insight Interface Apparatuses, Methods and Systems (hereinafter "DBMLII") disclosure, include:

FIG. 1 shows an exemplary architecture for the DBMLII;

FIG. 2 shows a screenshot diagram illustrating embodiments of the DBMLII;

FIG. 3 shows a datagraph diagram illustrating embodiments of a data flow for the DBMLII;

FIG. 4 shows a logic flow diagram illustrating embodiments of a double blind machine learning (DBML) component for the DBMLII;

FIG. 5 shows a logic flow diagram illustrating embodiments of a dynamic feature determining (DFD) component for the DBMLII;

FIG. 6 shows a screenshot diagram illustrating embodiments of the DBMLII;

FIG. 7 shows a screenshot diagram illustrating embodiments of the DBMLII;

FIG. 8 shows a screenshot diagram illustrating embodiments of the DBMLII;

FIG. 9 shows a screenshot diagram illustrating embodiments of the DBMLII;

FIG. 10 shows a screenshot diagram illustrating embodiments of the DBMLII;

FIG. 11 shows a screenshot diagram illustrating embodiments of the DBMLII;

FIG. 12 shows a screenshot diagram illustrating embodiments of the DBMLII;

FIG. 13 shows a screenshot diagram illustrating embodiments of the DBMLII;

FIG. 14 shows a screenshot diagram illustrating embodiments of the DBMLII;

FIG. 15 shows a screenshot diagram illustrating embodiments of the DBMLII;

FIG. 25A shows a datagraph diagram illustrating embodiments of a data flow for the DBMLII;

FIG. 25B shows a datagraph diagram illustrating embodiments of a data flow for the DBMLII;

FIG. 26A shows a logic flow diagram illustrating embodiments of a user interface configuring (UIC) component for the DBMLII;

FIG. 26B shows a logic flow diagram illustrating embodiments of a user interface configuring (UIC) component for the DBMLII;

FIG. 27 shows a logic flow diagram illustrating embodiments of a campaign optimization (CO) component for the DBMLII;

FIG. 28 shows a screenshot diagram illustrating embodiments of the DBMLII;

FIG. 29 shows a screenshot diagram illustrating embodiments of the DBMLII;

FIG. 30 shows a screenshot diagram illustrating embodiments of the DBMLII;

FIG. 31 shows a screenshot diagram illustrating embodiments of the DBMLII;

FIG. 32 shows a screenshot diagram illustrating embodiments of the DBMLII;

FIG. 33 shows a screenshot diagram illustrating embodiments of the DBMLII;

FIG. 34 shows a screenshot diagram illustrating embodiments of the DBMLII;

FIG. 35 shows a screenshot diagram illustrating embodiments of the DBMLII;

FIG. 36 shows a screenshot diagram illustrating embodiments of the DBMLII;

FIG. 37 shows a screenshot diagram illustrating embodiments of the DBMLII;

FIG. 38 shows a screenshot diagram illustrating embodiments of the DBMLII;

FIG. 39 shows a screenshot diagram illustrating embodiments of the DBMLII;

FIG. 40 shows a screenshot diagram illustrating embodiments of the DBMLII;

FIG. 41 shows an exemplary architecture for the DBMLII;

FIG. 43 shows a screenshot diagram illustrating embodiments of the DBMLII;

FIG. 44 shows a screenshot diagram illustrating embodiments of the DBMLII;

FIG. 45 shows a screenshot diagram illustrating embodiments of the DBMLII; and FIG. 46 shows a block diagram illustrating embodiments of a DBMLII controller.

Figure 16:
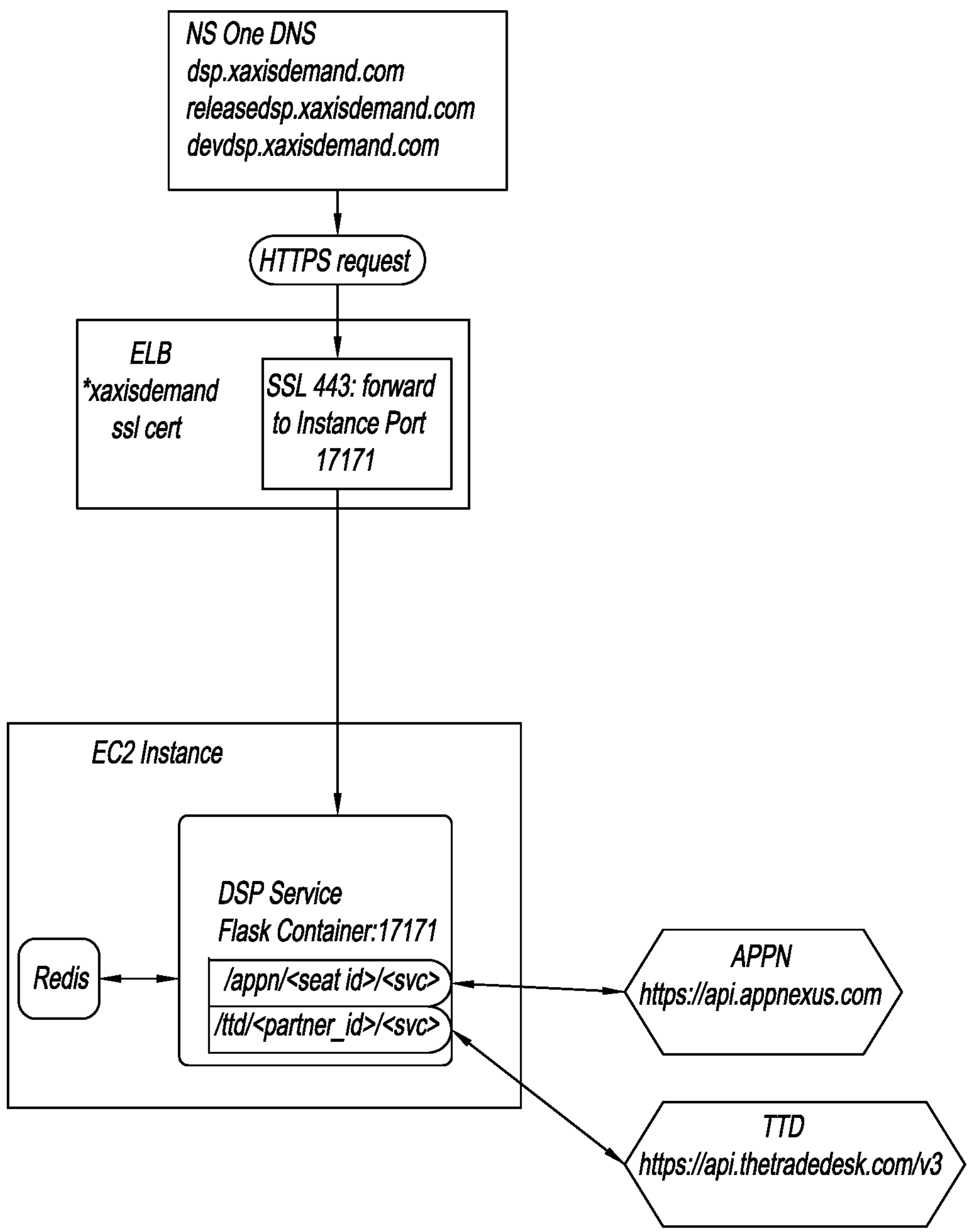
FIG. 16 shows a block diagram illustrating embodiments of a demand side platform (DSP) service for the DBMLII.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Double Blind Machine Learning Insight Interface Apparatuses, Methods and Systems (hereinafter "DBMLII") transforms campaign configuration request, campaign optimization input inputs, via DBMLII components (e.g., DBML, DFD, UIC, CO, etc. components), into top features, machine learning configured user interface, translated commands, campaign configuration response outputs. The DBMLII components, in various embodiments, implement advantageous features asset forth below.

Introduction

In various embodiments, the DBMLII may include:

Campaign dynamic data pruning: e.g., dynamically pruning datasets per campaign for machine learning processing, which reduces need for huge data sets. It includes facets of heuristic intelligence that provide deeper insights into the decisioning.

UI to machine learning bridge: which includes, e.g., human heuristics interaction with machine learning. Also, it may include actionable user interface elements that provide visual heuristics to see available data that is also easily actionable. This includes user interfaces (UI) elements that are manipulatable for transactions that are hooked to the machine learning feeds.

Double blind machine learning insights: which includes, e.g., an externalized optimization pipeline without needing underlying data to generate the insights.

Machine learning model decoupled from engineering interfaces: e.g., which allows for independent work on the machine learning models separated from the interfaces that hook in and leverage the machine learning models.

DBMLII

FIG. 1 shows an exemplary architecture for the DBMLII. In one embodiment, double blind machine learning may be utilized (e.g., via a tool such as a Click and Conversions Predictor (CCP)) to perform dynamic optimization based on a user's likelihood to generate an action (e.g., a click or a conversion). Historical log level data (LLD), which may include millions of rows containing information on users (e.g., device type, geographical information), inventory (e.g., domain on which the impression was served, placement), time of day, etc., may be fed into a machine learning structure (e.g., a logistic regression (LR) structure) to recognize feature value combinations that are most and/or least likely to result in an action. A weight may be assigned to each feature value. For each value combination, the weights may be added up and converted into a probability to click, which in turn may be converted into a bid. The results may be uploaded to different Demand Side Platforms (DSPs) in different formats (e.g., the weights themselves may be submitted, a JSON object made up of feature value combinations and their bids may be submitted).

A. Data Ingestion (Ingest and/or Filter Data)

An incoming stream of shared observed data (e.g., LLD) coming from a DSP may be saved (e.g., into a ML_Data database 4619*j*). See FIG. 6 for an example of LLD. The LLD may be filtered such that the positives (e.g., clicks and conversions) are kept, and a fraction of the negatives (e.g., impressions or imps—ads that did not results in a click/conversion) are kept. The fraction of negatives sampled is a parameter specified via a configuration setting (e.g., default may be 35%). Columns/features that may be used by the machine learning structure may be kept. Domain names may be cleaned up. See FIG. 7 for an example of filtered LLD. In one implementation, features available in the filtered LLD Data may include:

User day
User hour
Size
Position
Country
Region
Operating system
Browser
Language
Seller member id
Publisher
Placement group
Placement
Domain
Device mode
Device type
Carrier
Supply type B. Proprietary Data (Add Proprietary Data)

For example, proprietary data may include a list of segments, which can be specified by a trader to be added to the dataframe and used in machine learning. See FIG. 8 for an example of proprietary data.

C. Feature Building and Encoding

Clean and Enrich:

The time stamp of the impression may be converted into user day and hour, and size column may be created from width and height columns. It may be verified that the data contains at least one click. See FIG. 9 for an example of cleaned and enriched data.

Combine Features:

A list of feature doublets or triplets may be specified by a trader to be considered in machine learning. For example, device type and user hour may be combined into a single feature (e.g., some of the values could be phone< >12, tablet< >3). The columns in features_to_combine list may be combined in the specified manner and added to the dataframe See FIG. 10 for an example of enriched data with combined features.

Mark Unpopular:

Values that appear less than N (e.g., default N=10) number of times in the dataframe may be renamed and/or removed before machine learning is run.

Respect Targeting Profile:

Values that are excluded by a targeting profile specified by a trader at the beginning of a campaign may be added to a dictionary, which is then used to exclude those values from appearing in the final results (e.g., Bonsai Tree, JSON object).

Select Features:

Chi Square Test (Chi2) may be run on the data, and the dependence of each feature on the labels column, which contains click and conversion information, may be calculated. The Chi2 function may find the features that are most likely to be independent of the "click column" and therefore useless for classification. The top X (e.g., default X=3) features (e.g., most dependent on the "click column") may be selected to be used by the machine learning structure (e.g., the number of top features is a parameter that may be changed).

Encode Dataframe:

In one implementation, dataframe contents may be separated into a features dataframe and a labels dataframe. See FIG. 11 for an example of a features dataframe and a labels dataframe. In some implementations, the machine learning structure (e.g., a logistic regression structure) utilizes floats or integers data, and not strings data. As such, string columns may be label encoded. For example, 'yahoo.com' may become 123. See FIG. 12 for an example of a label encoded features dataframe. Categorical features may be one-hot-encoded. For example, one column of 'user_day' may become seven columns (e.g., corresponding to Sunday through Saturday) of 'user_day=0', 'user_day=1', 'user_day=2', 'user_day=3', 'user_day=4', 'user_day=5', and 'user_day=6'. This type of dataframe is sparse—most of the entries are zeros. The output may be a sparse matrix array of (row, column) entries of 1s and a separate class labels column indicating which rows resulted in a click and which did not.

D. Machine Learning (Execute Machine Learning)

FBI In one implementation, a grid search may be run to optimize the parameters of LR (e.g., the two parameters that may be optimized are the penalty for regularization and the inverse of regularization strength—the smaller the value, the stronger the regularization, the smaller number of features affecting the probability of a click). When the best parameters are found, LR may be run and the weights for each feature and/or the intercept may be returned. For example, the first entry in the LR weights list may correspond to the first column in the sparse feature dataframe, the second to the second column, etc. See FIG. 13 for an example of a logistic regression weights list.

E. Command Translation (Translate Results into a Format Accepted by a DSP)

Machine learning results (e.g., LR weights) may be used to find the probability of a click in accordance with the following formula:

$$\text{Probability} = \frac{1}{1 + e^{-(\Sigma weights + intercept)}}$$

The weights may be translated into a format accepted by a third party (e.g., a DSP).

Bonsai Trees:

In one implementation, once the probability of a click for any impression is found, a Bonsai tree may be built. A list of "feature=value: weight" entries (e.g., 'domain=msn.com': 4.23, . . . ) may be prepared and/or ordered by the absolute value of the weights such that the most positive and the most negative values (e.g., the most predictive values) come first. Then a Bonsai tree may be built with the possible combinations. For example, the bid for a particular set of features may be decided by using the probability of a click and taking into the account the min and max bid set by a trader. The number of nodes (leaves) may be restricted to a certain number by the max_nodes parameter (e.g., default=35,000) to prevent the tree from exceeding the size limit set by a DSP. See FIG. 13 for an example of a Bonsai tree.

Genie JSON:

In another implementation, the results may be translated into executable commands accepted by a DSP (e.g., Genie JSONs). A look up table (LUT) may be created for each feature listing LR weights for the values of that feature. See FIG. 13 for an example of a LUT. The Logit JSON may be created using the IDs of the LUTs and information such as min bid, max bid, goal_value (scale), and/or the like. For example, the bid for a particular set of features may be decided by using the probability of a click and taking into the account the min and max bid set by a trader. See FIG. 13 for an example of a Logit JSON.

The final JSON object produced (e.g., translated commands specified in a Bonsai tree or in a Genie JSON) may be provided (e.g., pushed) to a DSP.

J. Command Execution

Once a Bonsai tree or a Genie JSON is pushed to a DSP and attached to a campaign, the DSP may then execute the commands—find the appropriate bid for the impression using Bonsai trees or calculate the expected values based on the weights, and thus probabilities, specified in Genie JSON. The DSP may be provided with encoded proprietary data (e.g., associated with features utilized by the machine learning structure that are based on proprietary data).

F. Bidder

Once the DSP calculates and/or decides on the bid for a particular impression, the bid may be sent to the Bidder, and if it is higher than any of the other bids made for that impression, the bid is won.

G. Data Logging

If the bid is won, the information relating to that impression (browser, size of the ad, domain, etc.) may be recorded as a row in LLD.

H. Feature Building, Encoding

A DSP can do its own feature engineering.

I. Machine Learning

A DSP can run its own machine learning structures to create external prediction columns, such as predicted viewability. The CCP may ingest such external predictions data as part of LLD or separately (e.g., as some other table).

FIG. 2 shows a screenshot diagram illustrating embodiments of the DBMLII. The CCP may build predictive machine learning commands based on observed data shared by a DSP and also based on the DSP's own predictions as long as these predictions are available when the command executes within the DSP's bidder. The DSP's predictions can be based on data not shared with the CCP as a way of hiding some of the proprietary inputs in raw form. Similarly, the CCP may incorporate its own proprietary data from non-DSP sources by encoding those values before machine learning (e.g., before training LR) and passing the encoded values into the DSP to be available at the time the command will be executed. By the DSP sharing predictions based on non-shared data with the CCP, and the CCP providing encoded features in addition to its commands, the CCP can effectively make use of non-transparent (double-blind) data to maximize machine learning (double blind machine learning) performance in the DSP. In FIG. 2, examples of shared data, encoded predictions (external), and encoded features (internal) are shown, which may be used as input into the CCP's machine learning.

Shared Data

In one embodiment, shared data may include observations that are logged during a transaction. Such data may include fields that are provided by bid-requests to allow the DSP to evaluate whether the request meets targeting criteria (e.g., browser, site, region, etc.). In another embodiment, shared data may include DSP-specific information that was chosen to be shared.

Encoded Predictions (External)

The DSP may run its own machine learning to optimize campaign performance across the platform. These predictions may be based on Shared Data but may include proprietary transformations, data resulting from impressions not purchased by the CCP, or other information that was chosen not to be shared.

The CCP may use these predictions as features in its own machine learning to evaluate how well generic predictions apply to CCP's campaigns in the context of Shared Data from CCP impressions and/or Encoded Features (Internal) that are unique to the CCP.

Since the DSP commands are evaluated in the platform, the CCP may reference them in its machine learning commands and adjust their values or reject them entirely.

Encoded Features (Internal)

The CCP may collect data through many sources separate from impressions purchased within a particular DSP (e.g., impressions from other DSPs, 1st-party Advertiser data, 3rd-party audience data, social data, etc.).

The CCP may use this data as features in its machine learning training as long as the DSP has a copy of this data to reference when executing the CCP's commands against bid requests. Accordingly, an encoded copy of this data may be shared with the DSP.

FIG. 3 shows a datagraph diagram illustrating embodiments of a data flow for the DBMLII. In FIG. 3, a client 302 (e.g., of a trader) may send a campaign configuration request 321 to a DBMLII server 304 to facilitate configuring a campaign (e.g., an advertising campaign with an advertising platform (e.g., a DSP)). For example, the client may be a desktop, a laptop, a tablet, a smartphone, and/or the like that is executing a client application. In one implementation, the campaign configuration request may include data such as a request identifier, a campaign identifier, a DSP identifier, a goal type, a goal target, a minimum bid, a maximum bid, a viewability target, features to include, features to exclude, features to combine, a tolerance, a pricing strategy, a maximum number of nodes, number of top features, proprietary data to use, external predictions to use, a look back window, and/or the like. In one embodiment, the client may provide the following example campaign configuration request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth__request>
    <timestamp>2020-12-31 23:59:59</timestamp>
    <user__accounts__details>
            <user__account__credentials>
                    <user__name>JohnDaDoeDoeDoooe@gmail.com</user__name>
                    <password>abc123</password>
                    //OPTIONAL <cookie>cookieID</cookie>
                    //OPTIONAL <digital__cert__link>www.mydigitalcertificate.com/
JohnDoeDaDoeDoe@gmail.com/mycertifcate.dc</digital__cert__link>
                    //OPTIONAL <digital__certificate>__DATA__</digital__certificate>
            </user__account__credentials>
    </user__accounts__details>
    <client__details> //iOS Client with App and Webkit
                    //it should be noted that although several client details
                    //sections are provided to show example variants of client
                    //sources, further messages will include only on to save
                    //space
            <client__IP>10.0.0.123</client__IP>
            <user__agent__string>Mozilla/5.0 (iPhone; CPU iPhone OS 7__1__1 like Mac OS
X) AppleWebKit/537.51.2 (KHTML, like Gecko) Version/7.0 Mobile/11D201
Safari/9537.53</user__agent__string>
            <client__product__type>iPhone6,1</client__product__type>
            <client__serial__number>DNXXX1X1XXXX</client__serial__number>
            <client__UDID>3XXXXXXXXXXXXXXXXXXXXXXXXD</client__UDID>
            <client__OS>iOS</client__OS>
```

-continued

```
<client__OS__version>7.1.1</client__OS__version>
<client__app__type>app with webkit</client__app__type>
<app__installed__flag>true</app__installed__flag>
<app__name>DBMLII.app</app__name>
<app__version>1.0 </app__version>
<app__webkit__name>Mobile Safari</client__webkit__name>
<client__version>537.51.2</client__version>
</client__details>
<client__details> //iOS Client with Webbrowser
<client__IP>10.0.0.123</client__IP>
<user__agent__string>Mozilla/5.0 (iPhone; CPU iPhone OS 7__1__1 like Mac OS
X) AppleWebKit/537.51.2 (KHTML, like Gecko) Version/7.0 Mobile/11D201
Safari/9537.53</user__agent__string>
<client__product__type>iPhone6,1</client__product__type>
<client__serial__number>DNXXX1X1XXXX</client__serial__number>
<client__UDID>3XXXXXXXXXXXXXXXXXXXXXXXXXD</client__UDID>
<client__OS>iOS</client__OS>
<client__OS__version>7.1.1</client__OS__version>
<client__app__type>web browser</client__app__type>
<client__name>Mobile Safari</client__name>
<client__version>9537.53</client__version>
</client__details>
<client__details> //Android Client with Webbrowser
<client__IP>10.0.0.123</client__IP>
<user__agent__string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user__agent__string>
<client__product__type>Nexus S</client__product__type>
<client__serial__number>YXXXXXXXXZ</client__serial__number>
<client__UDID>FXXXXXXXXX-XXXX-XXXX-XXXX-XXXXXXXXXXXXX</client__UDID>
<client__OS>Android</client__OS>
<client__OS__version>4.0.4</client__OS__version>
<client__app__type>web browser</client__app__type>
<client__name>Mobile Safari</client__name>
<client__version>534.30</client__version>
</client__details>
<client__details> //Mac Desktop with Webbrowser
<client__IP>10.0.0.123</client__IP>
<user__agent__string>Mozilla/5.0 (Macintosh; Intel Mac OS X 10__9__3)
AppleWebKit/537.75.14 (KHTML, like Gecko) Version/7.0.3
Safari/537.75.14</user__agent__string>
<client__product__type>MacPro5,1</client__product__type>
<client__serial__number>YXXXXXXXXZ</client__serial__number>
<client__UDID>FXXXXXXXXX-XXXX-XXXX-XXXX-XXXXXXXXXXXXX</client__UDID>
<client__OS>Mac OS X</client__OS>
<client__OS__version>10.9.3</client__OS__version>
<client__app__type>web browser</client__app__type>
<client__name>Mobile Safari</client__name>
<client__version>537.75.14</client__version>
</client__details>
<campaign__configuration__request>
<request__identifier>ID__request__1</request__identifier>
<campaign__identifier>ID__campaign__1</campaign__identifier>
<DSP__identifier>ID__DSP__1</DSP__identifier>
<goal__type>CPC</goal__type>
<goal__target>$1</goal__target>
<min__bid>$1</min__bid>
<max__bid>$2</max__bid>
<features__to__combine>browser+country,
user__hour+device__type</features__to__combine>
<number__of__top__features>3</number__of__top__features>
<proprietary__data>ID__proprietary__data__1,
ID__proprietary__data__2</proprietary__data>
<external__predictions>
ID__external__predictions__data__1, ID__external__predictions__data__2
</external__predictions>
</campaign__configuration__request>
</auth__request>
```

A DBMLII DSP service 306 may (e.g., periodically, such as multiple times per day) send a DSP data request 325 to a DSP server 308 to obtain DSP data from the DSP. In one implementation, the DSP data request may include data such as a request identifier, DSP authentication credentials, DSP data to obtain, and/or the like. In one embodiment, the DBMLII DSP service may provide the following example DSP data request, substantially in the form of a HTTP(S) POST message including XML-formatted data, as provided below:

```
POST /DSP_data_request.php HTTP/1.1
Host: www.server.com
Content-Type: Application/XML
Content-Length: 667
<?XML version = "1.0" encoding = "UTF-8"?>
<DSP_data_request>
    <request_identifier>ID_request_2</request_identifier>
    <authentication_credentials>e.g., username and password, or
token</authentication_credentials>
    <desired_DSP_data>log_level_data,
    external_predictions</desired_DSP_data>
</DSP_data_request>
```

The DSP server may send a DSP data response 329 to a repository 310 to provide the requested DSP data. For example, the repository may be an Amazon S3 cloud storage repository. In one implementation, the DSP data response may include data such as a response identifier, the requested DSP data, and/or the like. In one embodiment, the DSP server may provide the following example DSP data response, substantially in the form of a HTTP(S) POST message including XML-formatted data, as provided below:

```
POST /DSP_data_response.php HTTP/1.1
Host: www.server.com
Content-Type: Application/XML
Content-Length: 667
<?XML version = "1.0" encoding = "UTF-8"?>
<DSP_data_response>
    <response_identifier>ID_response_2</response_identifier>
    <DSP_data>
        <row>
            <auction_identifier>
            ID_auction_1</auction_identifier>
            <ID_LLD_1>data for auction 1</ID_LLD_1>
            <ID_LLD_2>data for auction 1</ID_LLD_2>
            <ID_LLD_3>data for auction 1</ID_LLD_3>
            ...
            <ID_external_predictions_data_1>data for auction
1</ID_external_predictions_data_1>
            <ID_external_predictions_data_2>data for auction
1</ID_external_predictions_data_2>
            <ID_external_predictions_data_3>data for auction
1</ID_external_predictions_data_3>
            ...
        </row>
        <row>
            <auction_identifier>
            id_auction_2</auction_identifier>
            <ID_LLD_1>data for auction 2</ID_LLD_1>
            <ID_LLD_2>data for auction 2</ID_LLD_2>
            <ID_LLD_3>data for auction 2</ID_LLD_3>
            ...
            <ID_external_predictions_data_1>data for auction
2</ID_external_predictions_data_1>
            <ID_external_predictions_data_2>data for auction
2</ID_external_predictions_data_2>
            <ID_external_predictions_data_3>data for auction
2</ID_external_predictions_data_3>
```

-continued

```
            ...
        </row>
        ...
    </DSP_data>
</DSP_data_response>
```

The DBMLII server may send a data ingestion request 333 to the repository to obtain DSP data (e.g., log level data and external predictions data associated with the campaign). In one implementation, the data ingestion request may include data such as a request identifier, a campaign identifier, a DSP identifier, desired DSP data to obtain, and/or the like. In one embodiment, the DBMLII server may provide the following example data ingestion request, substantially in the form of a HTTP(S) POST message including XML-formatted data, as provided below:

```
POST /data_ingestion_request.php HTTP/1.1
Host: www.server.com
Content-Type: Application/XML
Content-Length: 667
<?XML version = "1.0" encoding = "UTF-8"?>
<data_ingestion_request>
    <request_identifier>ID_request_3</request_identifier>
    <campaign_identifier>ID_campaign_1</campaign_identifier>
    <DSP_identifier>ID_DSP_1</DSP_identifier>
    <desired_DSP_data>
        <log_level_data>ID_LLD_1,
        ID_LLD_2</log_level_data>
        <external_predictions>
            ID_external_predictions_data_1,
            ID_external_predictions_data_2
        </external_predictions>
    </desired_DSP_data>
</data_ingestion_request>
```

The repository may send a data ingestion response 337 to the DBMLII server. In one implementation, the data ingestion response may include data such as a response identifier, a campaign identifier, the requested DSP data, and/or the like. In one embodiment, the repository may provide the following example data ingestion response, substantially in the form of a HTTP(S) POST message including XML-formatted data, as provided below:

```
POST /data_ingestion_response.php HTTP/1.1
Host: www.server.com
Content-Type: Application/XML
Content-Length: 667
<?XML version = "1.0" encoding = "UTF-8"?>
<data_ingestion_response>
    <response_identifier>ID_response_3</response_identifier>
    <campaign_identifier>ID_campaign_1</campaign_identifier>
    <DSP_data>
        <row>
            <auction_identifier>
            ID_auction_1</auction_identifier>
            <ID_LLD_1>data for auction 1</ID_LLD_1>
            <ID_LLD_2>data for auction 1</ID_LLD_2>
            <ID_external_predictions_data_1>data for auction
1</ID_external_predictions_data_1>
            <ID_external_predictions_data_2>data for auction
1</ID_external_predictions_data_2>
        </row>
        <row>
            <auction_identifier>
            id_auction_2</auction_identifier>
            <ID_LLD_1>data for auction 2</ID_LLD_1>
            <ID_LLD_2>data for auction 2</ID_LLD_2>
            <ID_external_predictions_data_1>data for auction
```

```
2</ID_external_predictions_data_1>
                    <ID_external_predictions_data_2>data for auction
2</ID_external_predictions_data_2>
            </row>
            ...
    </DSP_data>
</data_ingestion_response>
```

The DBMLII server may send a proprietary data request 341 to the repository to obtain proprietary data. In one implementation, the proprietary data request may include data such as a request identifier, a campaign identifier, desired proprietary data to obtain, and/or the like. In one embodiment, the DBMLII server may provide the following example proprietary data request, substantially in the form of a HTTP(S) POST message including XML-formatted data, as provided below:

```
POST /proprietary_data_request.php HTTP/1.1
Host: www.server.com
Content-Type: Application/XML
Content-Length: 667
<?XML version = "1.0" encoding = "UTF-8"?>
<proprietary_data_request>
    <request_identifier>ID_request_4</request_identifier>
    <campaign_identifier>ID_campaign_1</campaign_identifier>
    <desired_proprietary_data>ID_proprietary_data_1,
ID_proprietary_data_2</desired_proprietary_data>
</proprietary_data_request>
```

The repository may send a proprietary data response 345 to the DBMLII server with the requested proprietary data.

A double blind machine learning (DBML) component 349 may utilize ingested data (e.g., LLD, external predictions), and/or proprietary data to execute double blind machine learning and/or to generate translated commands for the DSP. See FIG. 4 for additional details regarding the DBML component. In some implementations, the DBML component may utilize a dynamic feature determining (DFD) component 353 to determine top features (e.g., to prune features utilized for LR) for double blind machine learning. See FIG. 5 for additional details regarding the DFD component.

The DBMLII server may send encoded proprietary data 357 to the DBMLII DSP service. In one implementation, the encoded proprietary data may include data such as a request identifier, a campaign identifier, a DSP identifier, encoded proprietary data to send, and/or the like. In one embodiment, the DBMLII server may provide the following example encoded proprietary data, substantially in the form of a HTTP(S) POST message including XML-formatted data, as provided below:

```
POST /encoded_proprietary_data.php HTTP/1.1
Host: www.server.com
Content-Type: Application/XML
Content-Length: 667
<?XML version = "1.0" encoding = "UTF-8"?>
<encoded_proprietary_data>
    <request_identifier>ID_request_5</request_identifier>
    <campaign_identifier>ID_campaign_1</campaign_identifier>
    <DSP_identifier>ID_DSP_1</DSP_identifier>
    <encoded_proprietary_data>
            <ID_proprietary_data_1>encoded proprietary
            data</ID_proprietary_data_1>
            <ID_proprietary_data_2>encoded proprietary
            data</ID_proprietary_data_2>
```

```
    </encoded_proprietary_data>
</encoded_proprietary_data>
```

The DBMLII DSP service may act as a proxy and send encoded proprietary data 361 to the DSP server. In one implementation, the encoded proprietary data may include data such as a request identifier, DSP authentication credentials, a campaign identifier, encoded proprietary data to send, and/or the like. In one embodiment, the DBMLII DSP service may provide the following example encoded proprietary data, substantially in the form of a HTTP(S) POST message including XML-formatted data, as provided below:

```
POST /encoded_proprietary_data.php HTTP/1.1
Host: www.server.com
Content-Type: Application/XML
Content-Length: 667
<?XML version = "1.0" encoding = "UTF-8"?>
<encoded_proprietary_data>
    <request_identifier>ID_request_6</request_identifier>
    <authentication_credentials>e.g., username and password, or
token</authentication_credentials>
    <campaign_identifier>ID_campaign_1</campaign_identifier>
    <encoded_proprietary_data>
            <ID_proprietary_data_1>encoded proprietary
            data</ID_proprietary_data_1>
            <ID_proprietary_data_2>encoded proprietary
            data</ID_proprietary_data_2>
    </encoded_proprietary_data>
</encoded_proprietary_data>
```

The DBMLII server may send translated commands 365 (e.g., via a JSON object) to the DBMLII DSP service. In one implementation, the translated commands may be in the form of a Bonsai tree. See FIG. 13 for an example of a Bonsai tree. In another implementation, the translated commands may be in the form of a Genie JSON. See FIG. 13 for an example of a Genie JSON (e.g., look up table and Logit JSON). The DBMLII DSP service may act as a proxy and send translated commands 369 (e.g., via a JSON object) to the DSP server. The translated commands may be utilized by the DSP server to determine appropriate bids for auctions for impressions.

The DBMLII server may send a campaign configuration response 373 to the client to inform the trader regarding the results of the double blind machine learning (e.g., to confirm that the translated commands for the campaign were sent to the DSP, to show the top features, to obtain additional input (e.g., optimization input)).

FIG. 4 shows a logic flow diagram illustrating embodiments of a double blind machine learning (DBML) component for the DBMLII. In FIG. 4, a double blind machine learning request may be obtained at 401. For example, the double blind machine learning request may be obtained as a result of a user (e.g., a trader) utilizing a GUI to send a campaign configuration request to predict probability of clicks or conversions for an advertising campaign, and/or to provide translated commands based on the predicted probabilities to a third party (e.g., a DSP). See FIGS. 17-24 for an example of a GUI that may be utilized by the user. In another example, the double blind machine learning request may be obtained periodically (e.g., every six hours) for a currently running campaign to optimize the bidding parameters based on updated data.

Shared data (e.g., log level data) and/or encoded external predictions from the DSP may be ingested at 405. For example, each row may represent a purchased impression/ad. In another example, an external prediction may represent a third party's (e.g., the DSP's) prediction of probability of a click or of a conversion. In one implementation, DSP data to be ingested may be specified in the campaign configuration request. In another implementation, DSP data to be ingested may be specified in a default configuration setting. For example, DSP data (e.g., DSP data that shows the campaign's performance so far (e.g., over the first few days), DSP data that shows the campaign's performance during a look back window (e.g., over the last seven days), DSP data that shows historical performance of similar campaigns (e.g., over the last seven days)) may be retrieved from a ML_Data database 4619*j*. See FIG. 6 for an example of LLD that may be ingested.

The ingested log level data and/or encoded external predictions may be filtered at 409. In one implementation, the ingested DSP data may be filtered such that the positives (e.g., rows associated with clicks and/or conversions) are kept, and a fraction of the negatives (e.g., impressions or imps—ads that did not results in a click or conversion) are kept. For example, the fraction of negatives that are kept may be specified via a configuration setting (e.g., default may be 35%). In another implementation, the ingested DSP data may be filtered such that features (e.g., columns) that may be used for double blind machine learning are kept (e.g., other columns may be discarded). See FIG. 7 for an example of filtered LLD. In one implementation, features available in the filtered LLD Data may include:

User day
User hour
Size
Position
Country
Region
Operating system
Browser
Language
Seller member id
Publisher
Placement group
Placement
Domain
Device mode
Device type
Carrier
Supply type A determination may be made at 413 whether proprietary data is available for double blind machine learning. For example, this determination may be made based on whether proprietary data should be used when executing machine learning for the campaign. In one implementation, proprietary data to be used may be specified in the campaign configuration request. In another implementation, proprietary data to be used may be specified in a default configuration setting. For example, proprietary data may include a list of market segments. See FIG. 8 for an example of proprietary data.

If it is determined that proprietary data should be used, the proprietary data to be used may be retrieved (e.g., via one or more SQL statements) at 417. In one implementation, the retrieved proprietary data may be added to the dataframe containing the filtered DSP data. For example, each row of the dataframe may be analyzed (e.g., based on the feature values for a row) to determine an appropriate value of the proprietary data (e.g., market segment associated with the row) for the row, and a new column with the determined proprietary data values may be added to the dataframe as a feature.

The dataframe may be cleaned and enriched at 421. For example, rows with missing or outlying (e.g., corrupt, unusual) data may be discarded. In another example, the time stamp of the impression may be converted into user day and hour. In another example, a size column may be created from width and height columns See FIG. 9 for an example of cleaned and enriched data.

A determination may be made at 425 whether combined features should be used for double blind machine learning. For example, this determination may be made based on whether a set of features to combine (e.g., feature doublets, triplets, etc.) was specified. In one implementation, a set of features to combine may be specified in the campaign configuration request. In another implementation, a set of features to combine may be specified in a default configuration setting.

If it is determined that combined features should be used, the combined features may be determined at 429. For example, device_type and user_hour may be combined into a single feature (e.g., some of the values could be "phone< >12", "tablet< >3"). In another example, if the trader entered two combinations—size+domain and device_type+placement—two new columns may be added: size< >domain with values such as "400×600< >yahoo.com" and device_type< >placement with values such as "phone< >523551". In one implementation, the columns in the set of features to combine may be combined in the specified manner and added to the dataframe. See FIG. 10 for an example of enriched data with combined features.

Top features from the dataframe may be determined via a DFD component at 433. Sometimes adding more features into machine learning makes the results worse because it introduces more noise rather than useful information. As such, in some embodiments, the DFD component may be utilized to select top features (e.g., features that are most likely to be useful for classification) to utilize for machine learning. In one implementation, the number of top features to determine may be specified in the campaign configuration request. In another implementation, the number of top features to determine may be specified in a default configuration setting. See FIG. 5 for additional details regarding the DFD component.

Data associated with the determined top features may be encoded at 437. In one implementation, dataframe contents may be separated into a features dataframe and a labels dataframe See FIG. 11 for an example of a features dataframe and a labels dataframe In another implementation, string columns may be label encoded. For example, 'yahoo.com' may become 123. See FIG. 12 for an example of a label encoded features dataframe In another implementation, categorical features may be one-hot-encoded. For example, one column of 'user_day' may become seven columns (e.g., corresponding to Sunday through Saturday) of 'user_day=0', 'user_day=1', 'user_day=2', 'user_day=3', 'user_day=4', 'user_day=5', and 'user_day=6'. This type of dataframe is sparse—most of the entries are zeros. The output may be a sparse matrix array of (row, column) entries of 1s and a separate class labels column indicating which rows resulted in a click and which did not.

Machine learning may be executed at 441. In one embodiment, a machine learning structure may be generated. In one implementation, a grid search may be run to optimize the parameters of LR (e.g., the two parameters that may be optimized are the penalty for regularization and the inverse of regularization strength—the smaller the value, the stronger the regularization, the smaller number of features affecting the probability of a click). In another embodiment, the generated machine learning structure (e.g., the optimized LR structure) may be utilized to produce machine learning results (e.g., LR weights). In one implementation, the optimized LR structure may be run on the dataframe containing the top features and the weights for each feature and/or the intercept may be returned. The values positively (negatively) correlated with clicks may get positive (negative) weights. The values more (less) correlated with success events may have larger (smaller) absolute values of weights. For example, the first entry in the LR weights list may correspond to the first column in the sparse feature dataframe, the second to the second column, etc. See FIG. 13 for an example of a logistic regression weights list. In another implementation, for each weight value the number of times it appeared in the dataframe may be counted, and the weights and the counts may be stored (e.g., in a ML_Data database 4619*j* in Amazon S3). See FIG. 14 for an example of feature weights and counts. In some embodiments, a targeting filter may be applied to the machine learning results. For example, if the trader specifies targeting parameters to target a specific set of users (e.g., a specific market segment, users utilizing a specific device type), then bids may not be placed on auctions that do not satisfy the targeting parameters (e.g., regardless of the probability of a click). In one implementation, the targeting filter may be applied to the machine learning results when translating the machine learning results into commands.

The machine learning results may be translated into commands in a format accepted by the DSP at 445. In one embodiment, the machine learning results (e.g., LR weights) may be used to find the probability of a click (or of a conversion) in accordance with the following formula:

$$\text{Probability} = \frac{1}{1 + e^{-(\sum weights + intercept)}}$$

In one implementation, once the probability of a click for any impression may be found, a Bonsai tree may be built. A list of "feature=value: weight" entries (e.g., 'domain=msn.com': 4.23, . . . ) may be prepared and/or ordered by the absolute value of the weights such that the most positive and the most negative values (e.g., the most predictive values) come first. Then a Bonsai tree may be built with the possible combinations. For example, the bid for a particular set of features may be decided by using the probability of a click and taking into account the min and max bid set by the trader. The number of nodes (leaves) may be restricted to a certain number by the max_nodes parameter (e.g., default=35,000) to prevent the tree from exceeding the size limit set by the DSP. See FIG. 13 for an example of a Bonsai tree.

In another implementation, the results may be translated into executable commands accepted by the DSP (e.g., Genie JSONs). A look up table (LUT) may be created for each feature, listing LR weights for the values of that feature. See FIG. 13 for an example of a LUT. The Logit JSON may be created using the IDs of the LUTs and information such as min bid, max bid, goal_value (scale), and/or the like. See FIG. 13 for an example of a Logit JSON.

In one implementation, the bid for a particular set of features may be decided by using the probability of a click and taking into the account the min and max bid set by the trader (e.g., scaled linearly). For example, the bid value may be calculated as follows:

1. Calculate the probability of a click P for the auction based on the associated weights per the formula above
2. Calculate the bid as follows: Bid=min(max ((Probability*goal/scale), min_bid)), max_bid)

In another implementation, the bid for a particular set of features may be decided by taking into account the difference between the probability of a click determined based on the machine learning results and the probability of a click determined by a third party (e.g., an encoded external prediction of the DSP). For example, the higher the calculated value of the difference (e.g., the machine learning results predict a much higher probability of a click than the third party, so the auction is likely to be underpriced), the higher the calculated bid value.

A determination may be made at 449 whether proprietary features (e.g., features based on proprietary data) were used as top features. If so, the corresponding encoded proprietary data may be provided (e.g., pushed via a JSON object) to the DSP at 453. In one embodiment, proprietary data (e.g., about visitors) may be collected from a variety of sources (e.g., advertiser purchase data, 3rd-party demographic data, offline behavioral data) and associated with a user identifier (e.g., a user_id) of a corresponding visitor (e.g., a cookie with the user_id of the visitor may be placed on the visitor's user device via the DSP). For example, proprietary data may include market segment data (e.g., a list of market segments and a set of user identifiers associated with each market segment). In one implementation, proprietary data may be encoded by obfuscating market segment names before uploading the encoded proprietary data to the DSP. In another implementation, proprietary data may be encoded by applying a machine learning technique (e.g., clustering) to further obfuscate the source of information while preserving its predictive value before uploading the encoded proprietary data to the DSP. Accordingly, the encoded proprietary data may be used by the DSP (e.g., in accordance with the translated commands) to adjust probability calculations and hence bid prices (e.g., when a visitor is a member of a specified market segment, when a visitor is associated with a specified proprietary data value) without having access to the underlying proprietary data.

The translated commands (e.g., specified in a Bonsai tree or in a Genie JSON) may be provided (e.g., pushed via a JSON object) to the DSP at 457.

FIG. 5 shows a logic flow diagram illustrating embodiments of a dynamic feature determining (DFD) component for the DBMLII. In FIG. 5, a dynamic feature determining request may be obtained at 501. For example, the dynamic feature determining request may be obtained from a DBML component or from a user interface configuring (UIC) component to facilitate determining top features.

A dataset to process may be determined at 502. In one implementation, a pre-formatted dataset may be provided via the dynamic feature determining request. In another implementation, a dataset may be specified (e.g., based on a tool identifier of a tool that utilizes the specified dataset, based on a campaign identifier of an advertising campaign that utilizes the specified dataset) via the dynamic feature determining request, and the dataset may be obtained and formatted as described further below.

A determination may be made at 503 whether the dataset is pre-formatted. If the dataset is not pre-formatted, shared data (e.g., log level data) and/or encoded external predictions (e.g., associated with the tool and/or the campaign)

from a DSP may be ingested at 505. For example, each row may represent a purchased impression/ad. In one implementation, DSP data to be ingested may be specified in the dynamic feature determining request. In another implementation, DSP data to be ingested may be specified in a default configuration setting. For example, DSP data (e.g., DSP data that shows the campaign's performance so far (e.g., over the first few days), DSP data that shows historical performance of similar campaigns (e.g., over the last seven days)) may be saved into a ML_Data database **4619*j*. See FIG. 6** for an example of LLD that may be ingested.

The ingested log level data and/or encoded external predictions may be filtered at 509. In one implementation, the ingested DSP data may be filtered such that the positives (e.g., rows associated with clicks and/or conversions) are kept, and a fraction of the negatives (e.g., impressions or imps—ads that did not results in a click or conversion) are kept. For example, the fraction of negatives that are kept may be specified via a configuration setting (e.g., default may be 35%). In another implementation, the ingested DSP data may be filtered such that features (e.g., columns) that may be used for machine learning are kept (e.g., other columns may be discarded). See FIG. 7 for an example of filtered LLD. In one implementation, features available in the filtered LLD Data may include:

User day
User hour
Size
Position
Country
Region
Operating system
Browser
Language
Seller member id
Publisher
Placement group
Placement
Domain
Device mode
Device type
Carrier
Supply type A determination may be made at 513 whether proprietary data is available. For example, this determination may be made based on whether proprietary data should be used when executing machine learning for the campaign. In one implementation, proprietary data to be used may be specified in the dynamic feature determining request. In another implementation, proprietary data to be used may be specified in a default configuration setting. For example, proprietary data may include a list of market segments. See FIG. 8 for an example of proprietary data.

If it is determined that proprietary data should be used, the proprietary data to be used may be retrieved (e.g., via one or more SQL statements) at 517. In one implementation, the retrieved proprietary data may be added to the dataframe containing the filtered DSP data. For example, each row of the dataframe may be analyzed (e.g., based on the feature values for a row) to determine an appropriate value of the proprietary data (e.g., market segment associated with the row) for the row, and a new column with the determined proprietary data values may be added to the dataframe as a feature.

The dataframe may be cleaned and enriched at 521. For example, rows with missing or outlying (e.g., corrupt, unusual) data may be discarded. In another example, the time stamp of the impression may be converted into user day and hour. In another example, a size column may be created from width and height columns See FIG. 9 for an example of cleaned and enriched data.

A determination may be made at 525 whether combined features should be used. For example, this determination may be made based on whether a set of features to combine (e.g., feature doublets, triplets, etc.) was specified. In one implementation, a set of features to combine may be specified in the dynamic feature determining request. In another implementation, a set of features to combine may be specified in a default configuration setting.

If it is determined that combined features should be used, the combined features may be determined at 529. For example, device_type and user_hour may be combined into a single feature (e.g., some of the values could be "phone < >12", "tablet< >3"). In another example, if the trader entered two combinations—size+domain and device_type+placement—two new columns may be added: size < >domain with values such as "400×600< >yahoo.com" and device_type< >placement with values such as "phone < >523551". In one implementation, the columns in the set of features to combine may be combined in the specified manner and added to the dataframe. See FIG. 10 for an example of enriched data with combined features.

Unusable columns may be dropped from the dataframe at 533. In one implementation, unusable columns may include features that are not available during bid time (e.g., buyer_spend). In another implementation, unusable columns may include columns with too few (e.g., one) values (e.g., such columns may not be useful for machine learning). In another implementation, unusable columns may include features that are in the list of features to exclude. For example, the list of features to exclude may be as follows:

```
features_to_exclude: ['user_day', 'user_hour',
'device_model', 'carrier', 'language', 'region']
```

The dataframe contents may be separated into a features dataframe and a labels dataframe at 537. For example, the feature columns, such as user_hour, domain, browser, etc., may be separated from the event_type labels column, which may have a value of 1 for an impression associated with a click or a conversion and a value of 0 for an impression that was not clicked on. See FIG. 11 for an example of a features dataframe and a labels dataframe.

Data in the features dataframe may be encoded at 541. In one implementation, string columns may be label encoded. For example, 'yahoo.com' may become 123. See FIG. 12 for an example of a label encoded features dataframe. In another implementation, categorical features may be one-hot-encoded. For example, one column of 'user_day' may become seven columns (e.g., corresponding to Sunday through Saturday) of 'user_day=0', 'user_day=1', 'user_day=2', 'user_day=3', 'user_day=4', 'user_day=5', and 'user_day=6'.

Features in the features dataframe may be scored (e.g., to determine their usefulness for classification) at 545. In one embodiment, the Chi Square Test (Chi2) may be run on the data, and the dependence of each feature on the labels column, which contains click and conversion information, may be calculated (e.g., as a score). In another embodiment, the Random Forest method may be run on the data, and the dependence of each feature on the labels column may be calculated (e.g., as a score). In one implementation, the features may be sorted according to their score (e.g., Chi2 score) with highest scored features first in the list. For example, the features may be sorted as follows:

```
features: ['publisher', 'placement', 'domain', 'position', 'size',
'user_hour<>device_type',
'supply_type', 'device_type]
```

The scored features may be pruned at 549. In one implementation, same type (e.g., correlated) features with smaller scores may be removed from the list (e.g., so that placement_group and domain, or browser and device_type, don't end up in the top_features list together). For example, this may be done to improve the efficiency of the final output builder that converts LR weights to bids, and/or to help conform to size limits on the final JSON object accepted by the DSP. In one implementation, groups of same type (e.g., correlated) features may include the following:

```
CORRELATED_FEATURES = [{'os_extended', 'browser',
'device_type', 'supply_type', 'carrier', 'device_model'},
                {'country', 'region'},
                {'placement', 'placement_group', 'publisher',
'seller_member_id', 'domain'}]
```

Top features may be determined at 553 based on their score. In one implementation, the top X (e.g., default X=3) features may be selected (e.g., the number of top features is a parameter that may be changed (e.g., by the trader)). For example, the selected top features may be as follows:

top_features: ['publisher', 'position', 'size']

See FIG. 15 for an example of source code that may be utilized to determine top features. The top features may be returned at 557. For example, the list of top features may be returned.

FIG. 6 shows a screenshot diagram illustrating embodiments of the DBMLII. In FIG. 6, an example of log level data (LLD) is shown. The LLD shows columns/features for ten auctions for impressions.

FIG. 7 shows a screenshot diagram illustrating embodiments of the DBMLII. In FIG. 7, an example of filtered log level data is shown.

FIG. 8 shows a screenshot diagram illustrating embodiments of the DBMLII. In FIG. 8, an example of proprietary data is shown.

FIG. 9 shows a screenshot diagram illustrating embodiments of the DBMLII. In FIG. 9, an example of cleaned and enriched data is shown.

FIG. 10 shows a screenshot diagram illustrating embodiments of the DBMLII. In FIG. 10, an example of enriched data with combined features is shown. The combined features include "user_hour< >device_type" combined feature (e.g., with values such as "3< >pc & other devices").

FIG. 11 shows a screenshot diagram illustrating embodiments of the DBMLII. In FIG. 11, an example of a features dataframe and a labels dataframe is shown. The features dataframe shows a set of features. The labels dataframe indicates whether an event (e.g., a click, a conversion (e.g., a purchase)) occurred for the corresponding auction for impression.

FIG. 12 shows a screenshot diagram illustrating embodiments of the DBMLII. In FIG. 12, an example of a label encoded features dataframe is shown. For example, for the device_type feature, the value of "pc & other devices" is encoded as "1".

FIG. 13 shows a screenshot diagram illustrating embodiments of the DBMLII. In FIG. 13, an example of a logistic regression weights list is shown. For example, the first entry in the LR weights list may correspond to the first column in the sparse feature dataframe, the second to the second column, etc., and the last entry may correspond to the intercept.

Also shown in FIG. 13 are translated commands in a Bonsai tree format and in a Genie JSON format (e.g., including a look up table and Logit JSON). For example, the Bonsai tree may indicate that if position=0 and every user_hour in (1, 0, 2) and device_type="gameconsole" and placement=10005344, then the bid value should be $0.8260. For example, data provided in the Genie JSON may be utilized to calculate a bid value for a particular set of features associated with an auction for impression.

FIG. 14 shows a screenshot diagram illustrating embodiments of the DBMLII. In FIG. 14, feature weights and counts for top features utilized in logistic regression are shown.

FIG. 15 shows a screenshot diagram illustrating embodiments of the DBMLII. In FIG. 15, an example of source code that may be utilized to determine top features is shown.

FIG. 16 shows a block diagram illustrating embodiments of a demand side platform (DSP) service for the DBMLII. In one embodiment, the DSP service may be a program (e.g., a Python program built with Flask) that serves as a proxy for communication between DBMLII processes and external DSPs.

Authentication

Typically if a process wants to access a DSP API (e.g., the AppNexus API) programmatically, the process has to authenticate with a user name and password, receive a token, and then use that token in subsequent requests. By utilizing the DSP service, the authentication step is avoided. The DSP service has access to the information utilized for authentication (e.g., usernames, encrypted passwords, etc.) and the private key utilized to decrypt those passwords. The DSP service may authenticate for the active users in the database and it may maintain token info (e.g., in Redis). The DSP service may re-authenticate when it detects a token has expired, so the caller (e.g., the process) that is making use of the DSP Service does not have to deal with authentication details.

Rate Limiting

Some DSP APIs have rate limits. The DSP service may track the rate with which the DBMLII is hitting external APIs and may limit the rate globally when needed, something that would be difficult if processes individually made requests to external APIs. Rate limiting information may be stored in Redis, and if the rate exceeds the allowed rate, requests may be throttled until the rate is again under the allowed rate.

Pass Through of HTTP Method and URL/Query/POST Parameters

When a process makes a request to the DSP service, the DSP and the member for that DSP that should be contacted via the DSP service may be specified. For example, when making requests for AppNexus seat 1661, a URL such as:

https://dsp.xaxisdemand.com/appn/1661/ may be specified. Additional parameters specified in the URL may be passed along to the DSP along with any query parameters, post body and the HTTP method that is being used. For example, if the following URL is specified:

HTTP GET https://dsp.xaxisdemand.com/appn/1661/campaign?id=1 the DSP service may utilize the following URL:

HTTP GET https://api.appnexus.com/campaign?id=1 sending along the authentication token that the DSP service has for seat 1661, and the DSP service may return the response back to the original caller.

In one implementation, Python and Javascript code utility classes for communicating with the DSP service directly may be utilized (e.g., by a process).

Figure 17:
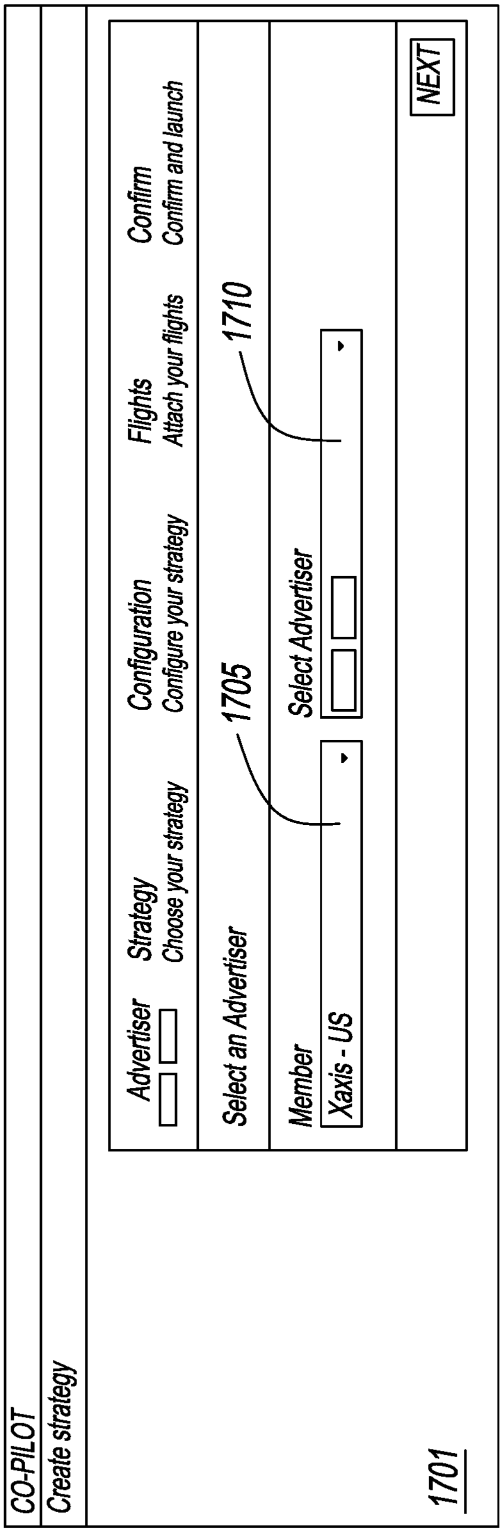
FIG. 17 shows a screenshot diagram illustrating embodiments of the DBMLII.

FIG. 17 shows a screenshot diagram illustrating embodiments of the DBMLII. In FIG. 17, an exemplary user interface is shown. Screen 1701 illustrates that a user (e.g., a trader) may select a market (e.g., US) via a dropdown 1705 and an advertiser via a dropdown 1710.

Figure 18:
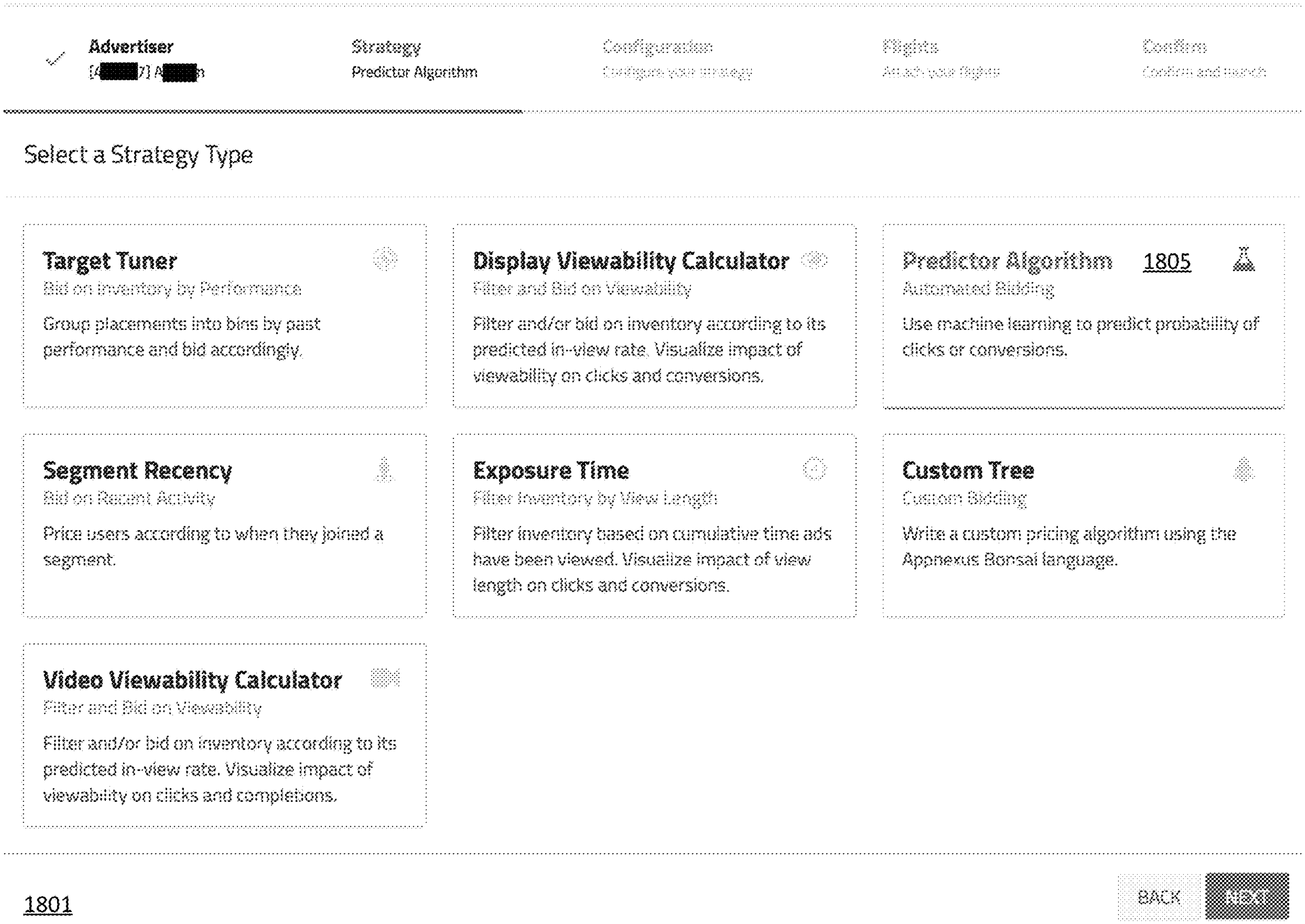
FIG. 18 shows a screenshot diagram illustrating embodiments of the DBMLII.

FIG. 18 shows a screenshot diagram illustrating embodiments of the DBMLII. In FIG. 18, an exemplary user interface is shown. Screen 1801 illustrates that the trader may utilize double blind machine learning by selecting a predictor tool via a widget 1805 to facilitate automated bidding.

Figure 19:
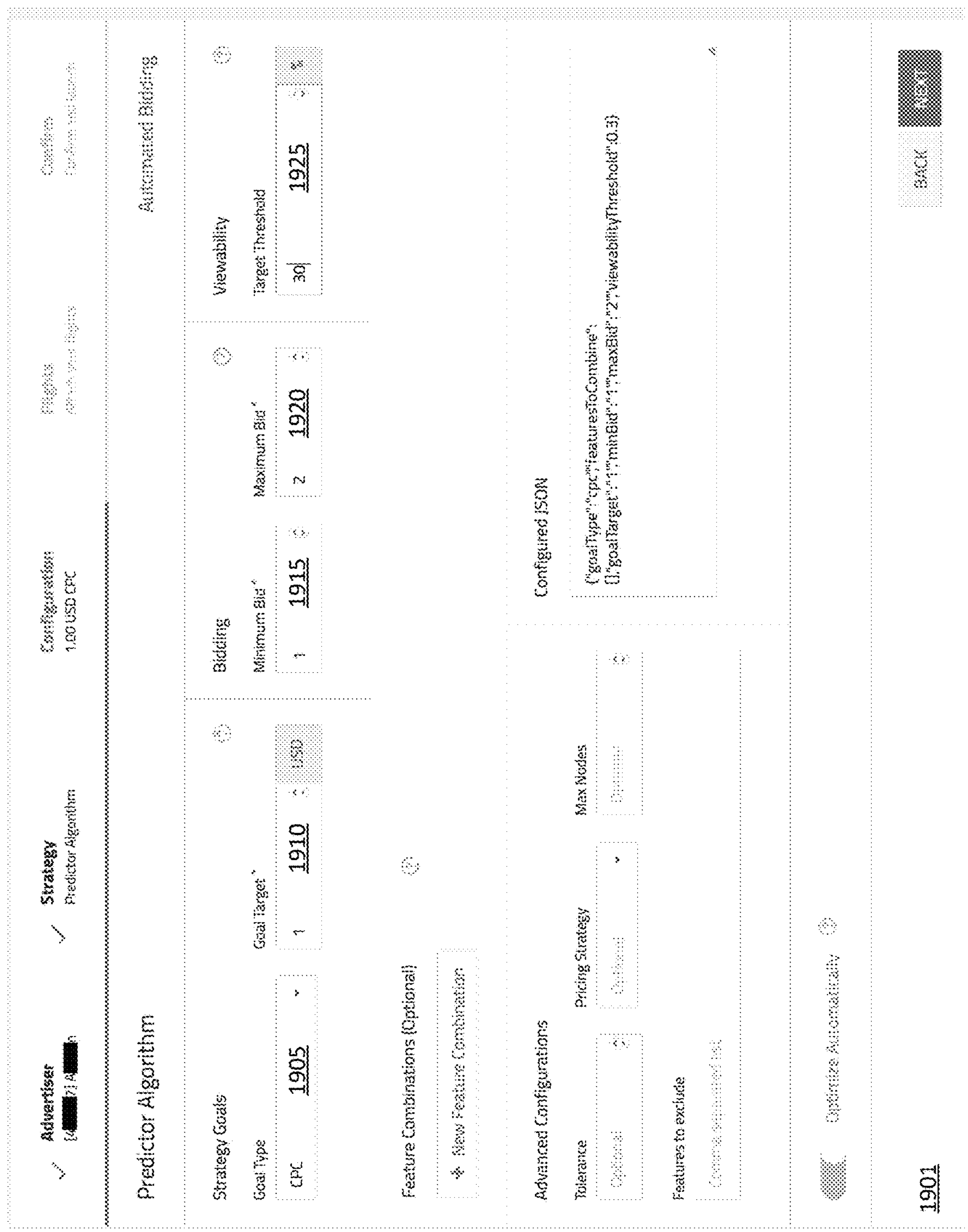
FIG. 19 shows a screenshot diagram illustrating embodiments of the DBMLII.

FIG. 19 shows a screenshot diagram illustrating embodiments of the DBMLII. In FIG. 19, an exemplary user interface is shown. Screen 1901 illustrates that the trader may configure parameters of the double blind machine learning. The trader may specify a goal type (e.g., CPC) via a widget 1905, a goal target (e.g., $1) via a widget 1910, a minimum bid (e.g., $1) via a widget 1915, a maximum bid (e.g., $2) via a widget 1920, a viewability target threshold (e.g., minimum of 30%) via a widget 1925.

Figure 20:
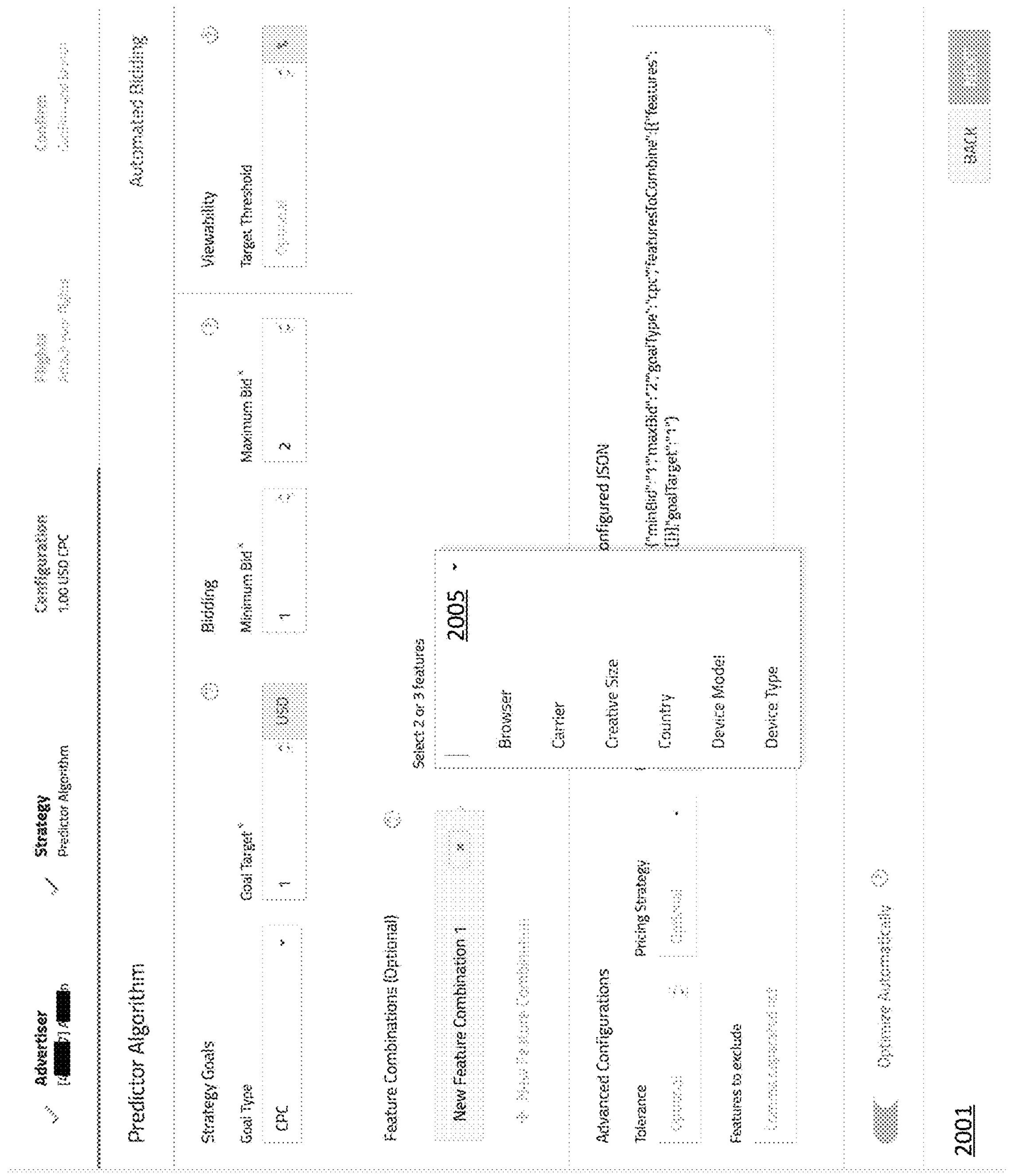
FIG. 20 shows a screenshot diagram illustrating embodiments of the DBMLII.

FIG. 20 shows a screenshot diagram illustrating embodiments of the DBMLII. In FIG. 20, an exemplary user interface is shown. Screen 2001 illustrates that the trader may configure parameters of the double blind machine learning. The trader may specify combined features that should be used for the double blind machine learning via a widget 2005 by selecting a set of features to combine.

Figure 21:
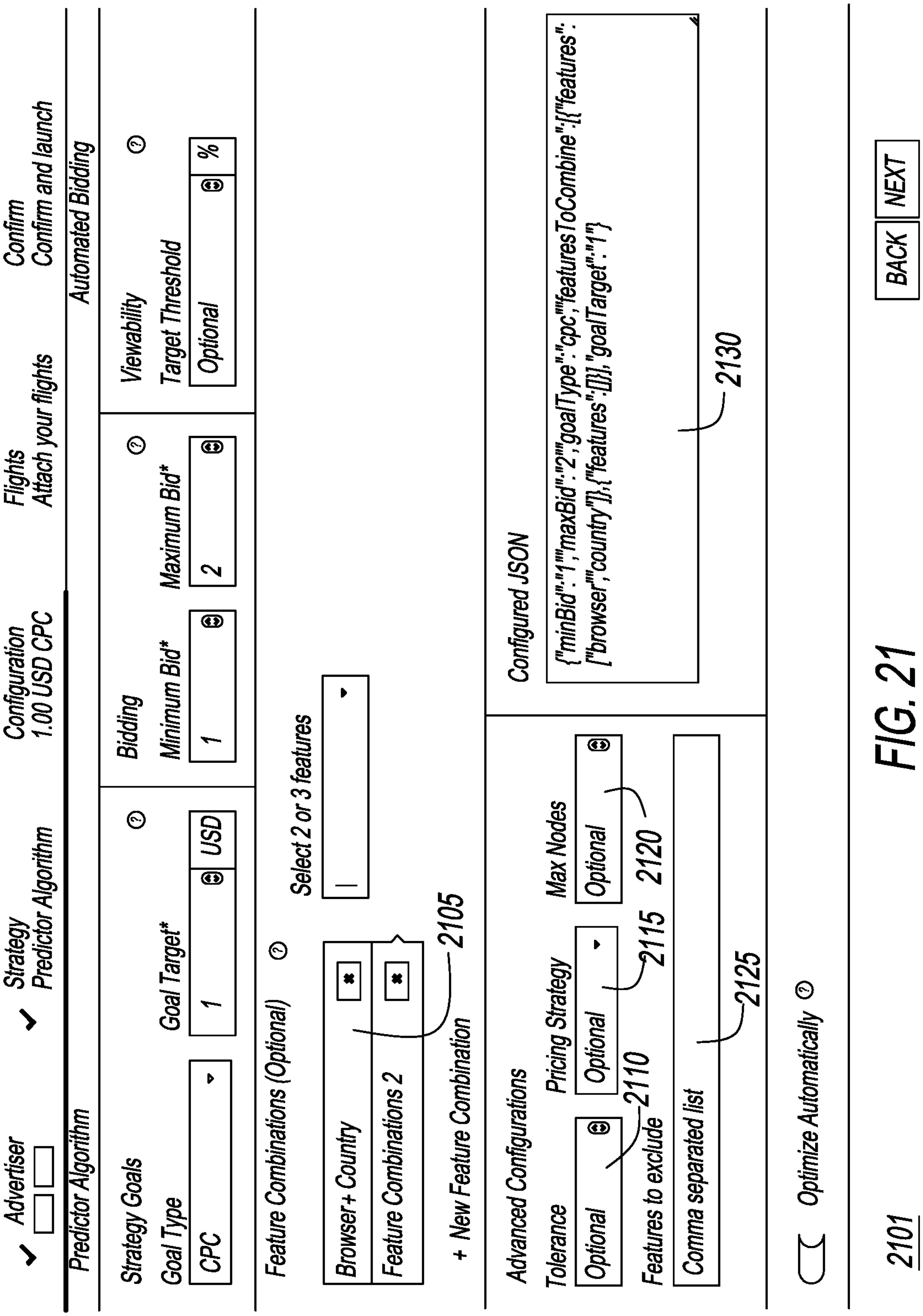
FIG. 21 shows a screenshot diagram illustrating embodiments of the DBMLII.

FIG. 21 shows a screenshot diagram illustrating embodiments of the DBMLII. In FIG. 21, an exemplary user interface is shown. Screen 2101 illustrates that the trader may configure parameters of the double blind machine learning. Widget 2105 shows that the trader specified browser+country as a combined feature. The trader may specify a tolerance via a widget 2110, a pricing strategy via a widget 2115, a maximum number of nodes via a widget 2120, a list of features to exclude via a widget 2125. Widget 2130 shows the configured JSON that specifies the configured parameters.

Figure 22:
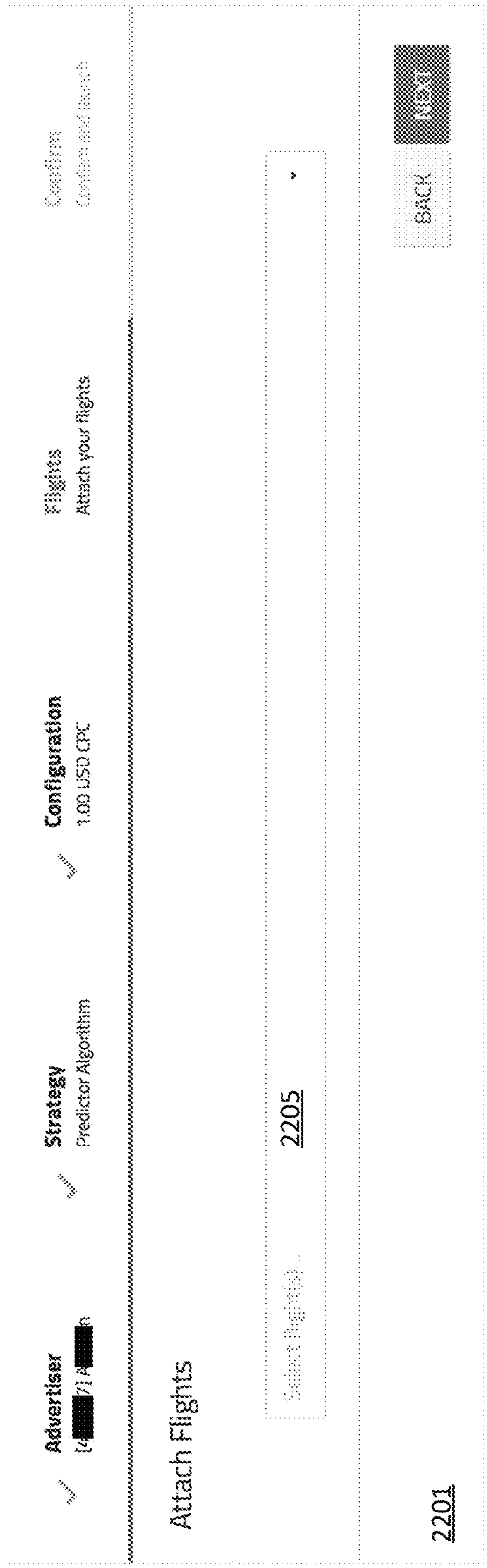
FIG. 22 shows a screenshot diagram illustrating embodiments of the DBMLII.

FIG. 22 shows a screenshot diagram illustrating embodiments of the DBMLII. In FIG. 22, an exemplary user interface is shown. Screen 2201 illustrates that the trader may specify advertising campaigns (e.g., flights) that should utilize the double blind machine learning configured by the trader for automated bidding via a widget 2205.

Figure 23:
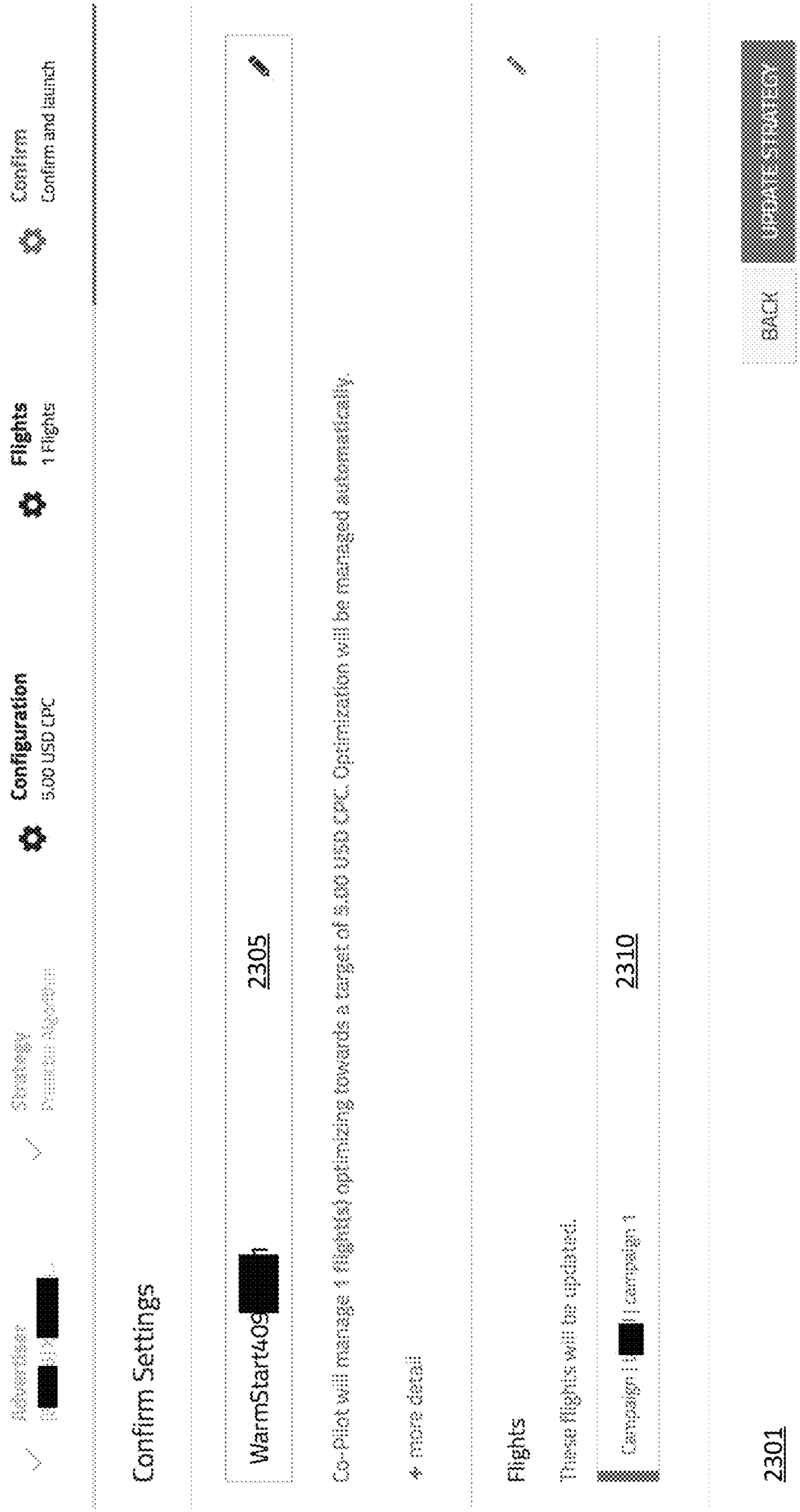
FIG. 23 shows a screenshot diagram illustrating embodiments of the DBMLII.

FIG. 23 shows a screenshot diagram illustrating embodiments of the DBMLII. In FIG. 23, an exemplary user interface is shown. Screen 2301 illustrates that the trader may specify a name for the configuration via a widget 2305. Widget 2310 shows advertising campaigns selected by the trader for the configuration.

Figure 24:
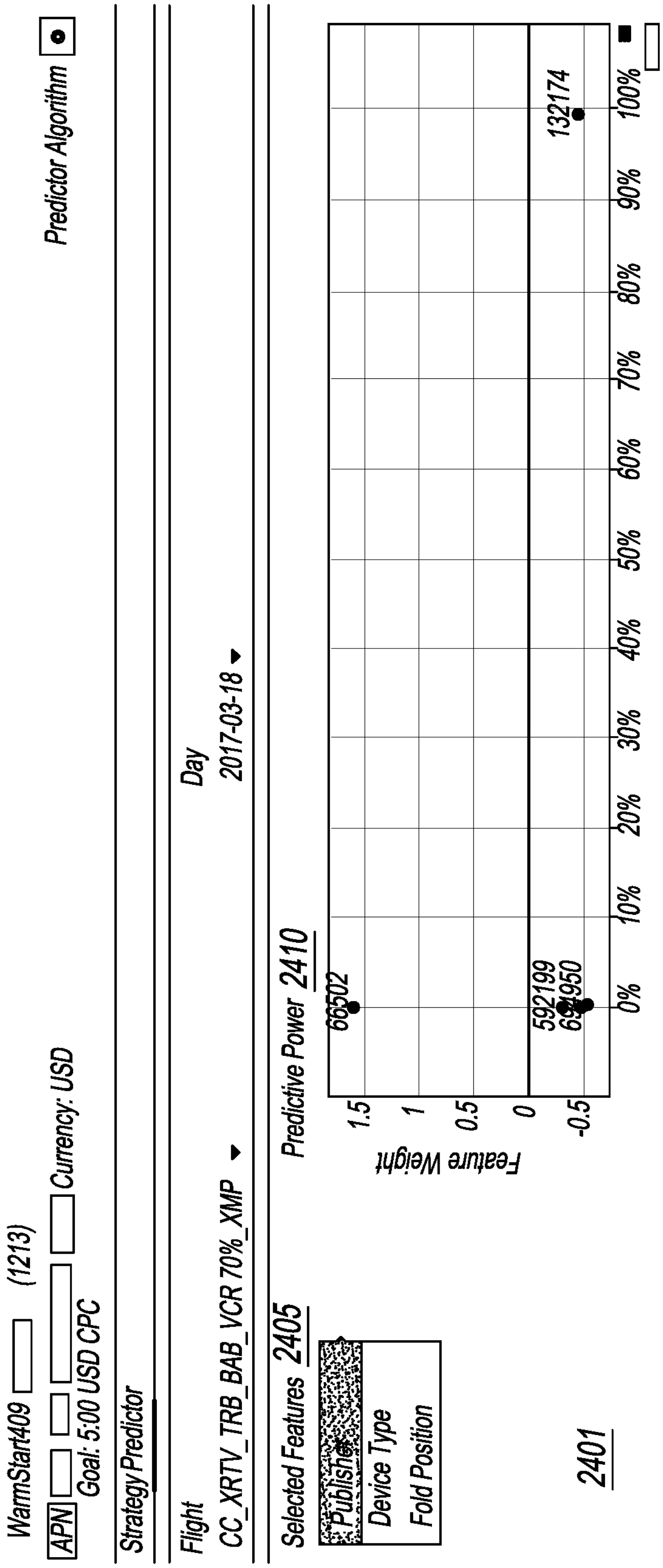
FIG. 24 shows a screenshot diagram illustrating embodiments of the DBMLII.

FIG. 24 shows a screenshot diagram illustrating embodiments of the DBMLII. In FIG. 24, an exemplary user interface is shown. Screen 2401 illustrates feature reporting that may be provided to the trader. Widget 2405 shows top features determined for the configuration (e.g., publisher, device type, and fold position). Widget 2410 shows predictive power of the most predictive values of the selected top feature (e.g., publisher). For example, publisher 66502 is associated with an increased probability of a click, while publisher 132174 is associated with a decreased probability of a click. In another example, the percentage of advertising budget spent on various publishers is shown (e.g., most of the advertising budget is spent on publisher 132174). The trader may evaluate whether to keep the current configuration settings (e.g., feature combinations) for subsequent runs (e.g., based on whether those feature combinations were selected for machine learning) or whether to try new configuration settings.

FIG. 25A shows a datagraph diagram illustrating embodiments of a data flow for the DBMLII. In FIG. 25A, a client 2502 (e.g., of a trader) may send a campaign configuration request 2521 to a DBMLII server 2504 to facilitate configuring a campaign (e.g., an advertising campaign with an advertising platform (e.g., a DSP)). For example, the client may be a desktop, a laptop, a tablet, a smartphone, and/or the like that is executing a client application. In one implementation, the campaign configuration request may include data such as a request identifier, a campaign identifier, a DSP identifier, a goal type, a goal target, a minimum bid, a maximum bid, a viewability target, features to include, features to exclude, features to combine, a tolerance, a pricing strategy, a maximum number of nodes, number of top features, proprietary data to use, external predictions to use, a look back window, and/or the like. In one embodiment, the client may provide the following example campaign configuration request, substantially in the form of a HTTP(S) POST message including XML-formatted data, as provided below:

```
POST /campaign_configuration_request.php HTTP/1.1
<campaign_configuration_request>
  <request_identifier>ID_request_7</request_identifier>
  <campaign_identifier>ID_campaign_2</campaign_identifier>
  <DSP_identifier>ID_DSP_2</DSP_identifier>
  <goal_type>Conversion Rate</goal_type>
  <goal_target>5%</goal_target>
  <min_bid>$3</min_bid>
  <max_bid>$10</max_bid>
  <look_back_window>7 days</look_back_window>
</campaign_configuration_request>
```

The DBMLII server may send a features data request 2525 to a repository 2510 to obtain features data (e.g., data regarding top features associated with the campaign). In one implementation, the features data request may include data such as a request identifier, a campaign identifier, desired features data to obtain, and/or the like. In one embodiment, the DBMLII server may provide the following example features data request, substantially in the form of a HTTP(S) POST message including XML-formatted data, as provided below:

```
POST /features_data_request.php HTTP/1.1
Host: www.server.com
Content-Type: Application/XML
Content-Length: 667
<?XML version = "1.0" encoding = "UTF-8"?>
<features_data_request>
    <request_identifier>ID_request_8</request_identifier>
    <campaign_identifier>ID_campaign_2</campaign_identifier>
    <desired_features_data>top (e.g., top 1, top 3) features for the
campaign</desired_features_data>
</features_data_request>
```

The repository may send a features data response 2529 to the DBMLII server with the requested features data. In one implementation, the features data response may include data such as a response identifier, a campaign identifier, the requested features data, and/or the like. In one embodiment, the repository may provide the following example features data response, substantially in the form of a HTTP(S) POST message including XML-formatted data, as provided below:

```
POST /features_data_response.php HTTP/1.1
Host: www.server.com
Content-Type: Application/XML
Content-Length: 667
<?XML version = "1.0" encoding = "UTF-8"?>
<features_data_response>
    <response_identifier>ID_response_8</response_identifier>
    <campaign_identifier>ID_campaign_2</campaign_identifier>
    <features_data>top_features: ['segment_recency']</features_data>
</features_data_response>
```

A user interface configuring (UIC) component 2533 may utilize data regarding the top features to generate and/or provide a machine learning configured user interface. See FIG. 26A for additional details regarding the UIC component. In some implementations, the UIC component may utilize a DFD component 2535 to determine top features (e.g., if data regarding top features is not available in the repository, if data regarding top features should be updated) to utilize for generating a machine learning configured user interface. See FIG. 5 for additional details regarding the DFD component.

The DBMLII server may provide a campaign configuration response 2539 with the machine learning configured user interface to the client to facilitate campaign optimization. For example, the trader may utilize the provided GUI to provide additional campaign configuration input parameters and/or to provide campaign optimization input parameters.

FIG. 25B shows a datagraph diagram illustrating alternative embodiments of a data flow for the DBMLII. In FIG. 25B, a client 2502 (e.g., of a trader) may send a campaign configuration request 2521 to a DBMLII server 2504 to facilitate configuring a campaign (e.g., an advertising campaign with an advertising platform (e.g., a DSP)). For example, the client may be a desktop, a laptop, a tablet, a smartphone, and/or the like that is executing a client application. In one implementation, the campaign configuration request may include data such as a request identifier, a campaign identifier, a DSP identifier, a goal type, a goal target, a minimum bid, a maximum bid, a viewability target, features to include, features to exclude, features to combine, a tolerance, a pricing strategy, a maximum number of nodes, number of top features, proprietary data to use, external predictions to use, a look back window, and/or the like. In one embodiment, the client may provide the following example campaign configuration request, substantially in the form of a HTTP(S) POST message including XML-formatted data, as provided below:

```
POST /campaign_configuration_request.php HTTP/1.1
<campaign_configuration_request>
    <request_identifier>ID_request_7</request_identifier>
    <campaign_identifier>ID_campaign_2</campaign_identifier>
    <DSP_identifier>ID_DSP_2</DSP_identifier>
    <goal_type>Conversion Rate</goal_type>
    <goal_target>5%</goal_target>
    <min_bid>$3</min_bid>
```

-continued

```
    <max_bid>$10</max_bid>
    <look_back_window>7 days</look_back_window>
</campaign_configuration_request>
```

The DBMLII server may send a features data request 2525 to a repository 2510 to obtain features data (e.g., data regarding top features associated with the campaign). In one implementation, the features data request may include data such as a request identifier, a campaign identifier, desired features data to obtain, and/or the like. In one embodiment, the DBMLII server may provide the following example features data request, substantially in the form of a HTTP(S) POST message including XML-formatted data, as provided below:

```
POST /features_data_request.php HTTP/1.1
Host: www.server.com
Content-Type: Application/XML
Content-Length: 667
<?XML version = "1.0" encoding = "UTF-8"?>
<features_data_request>
    <request_identifier>ID_request_8</request_identifier>
    <campaign_identifier>ID_campaign_2</campaign_identifier>
    <desired_features_data>top (e.g., top 1, top 3) features for the
campaign</desired_features_data>
</features_data_request>
```

The repository may send a features data response 2529 to the DBMLII server with the requested features data. In one implementation, the features data response may include data such as a response identifier, a campaign identifier, the requested features data, and/or the like. In one embodiment, the repository may provide the following example features data response, substantially in the form of a HTTP(S) POST message including XML-formatted data, as provided below:

```
POST /features_data_response.php HTTP/1.1
Host: www.server.com
Content-Type: Application/XML
Content-Length: 667
<?XML version = "1.0" encoding = "UTF-8"?>
<features_data_response>
    <response_identifier>ID_response_8</response_identifier>
    <campaign_identifier>ID_campaign_2</campaign_identifier>
    <features_data>top_features: ['segment_recency']</features_data>
</features_data_response>
```

A user interface configuring (UIC) component 2533 may utilize data regarding the top features to generate and/or provide a machine learning configured user interface. See FIG. 26B for additional details regarding the UIC component. In some implementations, the UIC component may utilize a DFD component 2535 to determine top features (e.g., if data regarding top features is not available in the repository, if data regarding top features should be updated) to utilize for generating a machine learning configured user interface. See FIG. 5 for additional details regarding the DFD component.

The DBMLII server may provide a machine learning configured user interface 2537 to the client to facilitate campaign optimization. For example, the trader may utilize the provided GUI to provide additional campaign configuration input parameters and/or to provide campaign optimization input parameters. See FIGS. 33-40 for an example of a GUI that may be provided to the user.

The client may send campaign optimization input 2541 to the DBMLII server that specifies how to optimize the campaign. In one implementation, the campaign optimization input may include data such as a request identifier, a campaign identifier, optimization parameters, and/or the like. In one embodiment, the client may provide the following example campaign optimization input, substantially in the form of a HTTP(S) POST message including XML-formatted data, as provided below:

```
POST /campaign_optimization_input.php HTTP/1.1
Host: www.server.com
Content-Type: Application/XML
Content-Length: 667
<?XML version = "1.0" encoding = "UTF-8"?>
<campaign_optimization_input>
    <request_identifier>ID_request_9</request_identifier>
    <campaign_identifier>ID_campaign_2</campaign_identifier>
    <optimization_parameters>
        <feature_identifier>segment_recency</feature_identifier>
        <feature_change>add specified intervals to bid
        curve</feature_change>
    </optimization_parameters>
</campaign_optimization_input>
```

A campaign optimization (CO) component 2545 may utilize campaign optimization input to optimize the campaign and/or to generate translated commands for the DSP. See FIG. 27 for additional details regarding the CO component.

The DBMLII server may send translated commands 2549 (e.g., via a JSON object) to a DBMLII DSP service 2506. In one implementation, the translated commands may be in the form of a Bonsai tree. See FIG. 13 for an example of a Bonsai tree. In another implementation, the translated commands may be in the form of a Genie JSON. See FIG. 13 for an example of a Genie JSON (e.g., look up table and Logit JSON). The DBMLII DSP service may act as a proxy and send translated commands 2553 (e.g., via a JSON object) to a DSP server 2508. The translated commands may be utilized by the DSP server to determine appropriate bids for auctions for impressions.

The DBMLII server may send a campaign configuration response 2557 to the client to inform the trader regarding the results of the campaign optimization (e.g., to confirm that the translated commands for the campaign were sent to the DSP, to show the utilized features, to obtain additional input (e.g., optimization input)).

FIG. 26A shows a logic flow diagram illustrating embodiments of a user interface configuring (UIC) component for the DBMLII. In FIG. 26A, a user interface configuration request may be obtained at 2601. For example, the user interface configuration request may be obtained as a result of a user (e.g., a trader) utilizing a GUI to send a campaign configuration request to facilitate configuring a campaign (e.g., an advertising campaign with an advertising platform (e.g., a DSP)). In another example, user interface configuration request may be obtained as a result of a user (e.g., a trader) utilizing a GUI to modify top features utilized by the GUI.

A determination may be made at 2605 whether top features data associated with the campaign is available from a repository (e.g., from a ML_Data database 4619*j*). In one implementation, the trader may wish to optimize a previously configured and/or optimized campaign, and information regarding top features associated with the campaign may be available in the repository. In another implementation, the trader may wish to optimize a campaign that was not previously configured and/or optimized or a campaign for which top features data should be updated, and information regarding top features associated with the campaign may not be available in the repository.

If it is determined that information regarding top features associated with the campaign is available in the repository, top features data may be retrieved from the repository at 2609. For example, the top features data may be determined via a MySQL database command similar to the following:

```
SELECT topFeatures
FROM ML_Data
WHERE campaignID = ID_campaign_2;
```

The retrieved top features data may be parsed (e.g., using PHP commands) to determine the top X (e.g., top 1—as specified by a parameter) features from the returned top features.

In an alternative embodiment, a tool may be configured (e.g., based on a previous analysis of data regarding top features) to utilize a specified set of top features, and this set of top features (e.g., utilized for any campaign to be optimized via the tool) may be determined based on a configuration setting of the tool.

If it is determined that information regarding top features associated with the campaign not available in the repository, top features data may be determined via a DFD component at 2613. See FIG. 5 for additional details regarding the DFD component. For example, the DFD component may determine the top features based on the campaign identifier and/or configuration settings (e.g., specified in a campaign configuration request).

A machine learning configured user interface of the tool may be provided to the trader at 2617. In one implementation, the trader may utilize the provided machine learning configured user interface to provide campaign optimization input for optimizing the campaign. As such, the machine learning configured user interface may be utilized for configuring how to set bids for the campaign based on one or more dimensions/features (e.g., set bid price based on the values of segment recency, news data, weather data, and market data).

A determination may be made at 2621 whether results provided by the machine learning configured user interface are satisfactory. In one implementation, if the user does not modify top features utilized by the machine learning configured user interface, the results may be considered satisfactory. If the results are satisfactory, the machine learning configured user interface may continue running the CCP with the current configuration at 2625.

If the results are not satisfactory, changes to top features specified by the user may be determined at 2629. In one implementation, added/removed features may be determined, and/or a UI configuration request may be sent to update the machine learning configured user interface based on the updated set of top features.

FIG. 26B shows a logic flow diagram illustrating alternative embodiments of a user interface configuring (UIC) component for the DBMLII. In FIG. 26B, a user interface configuration request may be obtained at 2601. For example, the user interface configuration request may be obtained as a result of a user (e.g., a trader) utilizing a GUI to send a campaign configuration request to facilitate configuring a campaign (e.g., an advertising campaign with an advertising platform (e.g., a DSP)).

A determination may be made at 2605 whether top features data associated with the campaign is available from a repository (e.g., from a ML_Data database **4619*j***). In one implementation, the trader may wish to optimize a previously configured and/or optimized campaign, and information regarding top features associated with the campaign may be available in the repository. In another implementation, the trader may wish to optimize a campaign that was not previously configured and/or optimized or a campaign for which top features data should be updated, and information regarding top features associated with the campaign may not be available in the repository.

If it is determined that information regarding top features associated with the campaign is available in the repository, top features data may be retrieved from the repository at 2609. For example, the top features data may be determined via a MySQL database command similar to the following:

```
SELECT topFeatures
FROM ML_Data
WHERE campaignID = ID_campaign_2;
```

The retrieved top features data may be parsed (e.g., using PHP commands) to determine the top X (e.g., top 1—as specified by a parameter) features from the returned top features.

In an alternative embodiment, a tool may be configured (e.g., based on a previous analysis of data regarding top features) to utilize a specified set of top features, and this set of top features (e.g., utilized for any campaign to be optimized via the tool) may be determined based on a configuration setting of the tool.

If it is determined that information regarding top features associated with the campaign is not available in the repository, top features data may be determined via a DFD component at 2613. See FIG. 5 for additional details regarding the DFD component. For example, the DFD component may determine the top features based on the campaign identifier and/or configuration settings (e.g., specified in a campaign configuration request).

A determination may be made at 2617 whether there remain top features to process. In one implementation, each of the top features may be processed. If there remain top features to process, the next top feature may be selected for processing at 2621.

A user interface configuration for the selected top feature may be determined at 2625. In one implementation, a user interface configuration may be available (e.g., pre-built) for each feature that may be selected as a top feature, and the user interface configuration (e.g., a GUI for configuring how to set bids for a campaign based on the value of the feature) corresponding to the selected top feature may be determined (e.g., based on the feature identifier (e.g., segment_recency) of the selected top feature).

The determined top feature user interface configuration may be added to the overall machine learning configured user interface configuration of a tool (e.g., to be provided to the trader to facilitate campaign optimization) at 2629. In one implementation, tool configuration parameters may be adjusted to include the determined top feature user interface configuration in the set of user interface configurations utilized by the tool. For example, the tool's GUI may include a set of tabs with each tab corresponding to a top feature user interface configuration.

The machine learning configured user interface of the tool may be provided to the trader at 2633. In one implementation, the trader may utilize the provided machine learning configured user interface to provide campaign optimization input for optimizing the campaign. As such, the machine learning configured user interface may be utilized for configuring how to set bids for the campaign based on one or more dimensions/features (e.g., set bid price based on the values of segment recency, news data, weather data, and market data).

FIG. 27 shows a logic flow diagram illustrating embodiments of a campaign optimization (CO) component for the DBMLII. In FIG. 27, a campaign optimization request may be obtained at 2701. For example, the campaign optimization request may be obtained as a result of a user (e.g., a trader) utilizing a GUI to send a campaign configuration request to facilitate configuring a campaign (e.g., an advertising campaign with an advertising platform (e.g., a DSP)).

Campaign configuration input parameters may be determined at 2705. For example, campaign configuration input parameters (e.g., goal type, goal target, min bid, max bid, etc.) provided by the trader via the campaign configuration request may be determined. In one implementation, the campaign configuration request may be parsed (e.g., using PHP commands) to determine the specified campaign configuration input parameters.

Campaign optimization may be executed at 2709. In one embodiment, the campaign may be optimized based on the campaign configuration input parameters and/or the top features associated with the campaign. For example, if the campaign is associated with segment_recency top feature, or if a tool is configured to utilize segment_recency top feature, campaign optimization may be executed as follows:

Campaign Optimization Example

DSP data (e.g., DSP data that shows the campaign's performance so far (e.g., over the first few days), DSP data that shows historical performance of similar campaigns (e.g., over the last seven days)) may be analyzed to generate a conversion table and/or an impression table. See FIG. 28 for an example of a conversion table. The conversion table may be utilized to determine the "recency time" for conversion for each row (e.g., the time between entering a segment (e.g., a market segment) and converting (e.g., making a purchase)). Similarly, the impression table may be utilized to determine the "recency time" for impression for each row.

The range of recency times may be divided into "buckets" that are close enough to one another that the recency times in a bucket may be assigned the same bid. In one implementation, the buckets may cover very small ranges of time early in the curve, to provide high granularity in bid pricing, but increase in size further out in the curve to avoid unnecessary complexity. See FIG. 29 for an example of bucket sizes that may be utilized.

Bid prices for each bucket may be created utilizing the following transformations. See FIG. 30 for an example of a transformations table illustrating the transformations. Find the number of rows in the conversion table that occurred in each bucket (column B). Get a table of impressions from the same time period as that of the conversion table, and find the number of impressions that occurred in each bucket (column C). Normalize the conversions column for changes in campaign activity by finding the rate of conversions/impressions served in each bucket period (column D). For example, even for campaigns where conversions are not directly caused by impressions, the number of impressions served may be useful as a normalizing heuristic. In order to base the bid price on how the conversion/impression rate is expected to change in the near future, the average conversion/impression rate of the current bucket along with that of the next two may be determined (column E). The forward conversion rate may be normalized, so that the highest value in the series (column F) is equal to the highest value in the original conversion/impression rate series (column D). The resulting series (column F) may be graphed as a curve illustrated in FIG. 31.

In one implementation, in order to determine whether there is enough data to generate a useful curve, the following tests may be run. Test for a minimum number of total impressions in dataset (e.g., default=1000). Test for a minimum number of total conversions in dataset (e.g., default=50). Test for a minimum number of total conversions in bucket with the most conversions (e.g., default=20). Test for a minimum number of buckets with more than zero impressions (e.g., default=14). Test for a minimum number of buckets with more than zero conversions (e.g., default=14). Test for a minimum ratio of total impressions to total conversions (e.g., default=10). To accommodate for different kinds of datasets, different configurations of test suites may be utilized (e.g., it may be acceptable for either the total impressions in dataset or the ratio of total impressions to total conversions to be below its minimum, as long as the other one is above minimum). Any of these default values may be changed by passing new values as parameters. If a dataset fails its suite of tests, the trader may be requested to provide an initial bid curve manually.

The resulting series (column F) may be completed by adding one final point to the end of the normalized, forward-looking curve (e.g., where the x value is set equal to the recency_window (in days)*24*60, and y is set to 80% of the value of the last bucket). This creates a downward slope at the end of the recency window. The completed series (curve) may be scaled to the range of minimum bid to maximum bid, which provides a bid price for each bucket. In some implementations, bids may be further adjusted based on other considerations (e.g., total amount spent per user). The resulting bid prices for buckets may be returned in an optimization results structure (e.g., in a JSON-like format). See FIG. 32 for an example of an optimization results structure with buckets bid prices.

Optimization recommendations may be provided (e.g., based on data in an optimization results structure) at 2713. In one implementation, a curve of the bid prices vs. values of top features (e.g., bid prices vs. recency) may be provided to the trader.

A determination may be made at 2717 whether optimization input was provided by the trader. For example, the trader may provide optimization input via a machine learning configured user interface to specify changes to optimization recommendations. If it is determined that optimization input was provided, campaign optimization input parameters may be determined at 2721. In one implementation, campaign optimization input parameters may include changes to features utilized for optimization. For example, the trader may add additional features to use for optimization or remove features currently used for optimization. In another implementation, campaign optimization input parameters may include changes to data points provided in the optimization. For example, the trader may make changes to the recommended bid curve (e.g., split a recency bucket into multiple buckets, adjust sizes of recency buckets, adjust the bid value for a recency bucket).

A determination may be made at 2731 whether changes to features were specified in the campaign optimization input parameters. If so, the campaign may be re-optimized based on the added/removed features at 2735. In one implementation, the curve of the bid prices may be restructured (e.g., re-optimized) based on the added/removed dimensions/features. In another implementation, the machine learning configured user interface may be adjusted (e.g., to include a user interface configuration for optimizing the campaign based on an added feature), and/or the trader may be prompted to provide campaign optimization input with regard to the added feature.

A determination may be made at 2741 whether changes to data points (e.g., of a recommended bid curve) were specified in the campaign optimization input parameters. If so, the campaign may be re-optimized based on changed data points at 2745. In one implementation, the curve of the bid prices may be re-optimized by taking into account changes specified by the trader (e.g., if the trader split a recency bucket into multiple buckets, the curve of the bid prices may be re-optimized based on the new set of recency buckets).

The re-optimized recommendations may be provided at 2751. In one implementation, an adjusted curve of the bid prices vs. values of features (e.g., adjusted bid prices vs. recency) may be provided to the trader via the GUI.

The campaign optimization results may be translated into commands in a format accepted by the DSP at 2755. In one implementation, the translated commands may be in the form of a Bonsai tree. See FIG. 13 for an example of a Bonsai tree. In another implementation, the translated commands may be in the form of a Genie JSON. See FIG. 13 for an example of a Genie JSON (e.g., look up table and Logit JSON).

The translated commands (e.g., specified in a Bonsai tree or in a Genie JSON) may be provided (e.g., pushed via a JSON object) to the DSP at 2759.

FIG. 28 shows a screenshot diagram illustrating embodiments of the DBMLII. In FIG. 28, an example of a conversion table is shown. The conv_time column of the conversion table shows the time of the conversion for a user, the seg_time column shows the time when the user was first added to a segment, and the user_id_64 column shows the user's identifier. In one implementation, recency time for each row may be determined by subtracting the value of the seg_time column from the value of the conv_time column to get the time between entering the segment and converting.

FIG. 29 shows a screenshot diagram illustrating embodiments of the DBMLII. In FIG. 29, an example of bucket sizes that may be utilized is shown.

FIG. 30 shows a screenshot diagram illustrating embodiments of the DBMLII. In FIG. 30, an example of a transformations table is shown. Each bucket is identified (column A) by the corresponding value of the End column from FIG. 29.

FIG. 31 shows a screenshot diagram illustrating embodiments of the DBMLII. In FIG. 31, an example of a conversions recency to retargeting segment graph is shown.

FIG. 32 shows a screenshot diagram illustrating embodiments of the DBMLII. In FIG. 32, an example of an optimization results structure with buckets bid prices is shown. In one implementation, the optimization results structure includes a set of substructures (e.g., a list for each bucket) and each substructure (e.g., [0, 50.0]) indicates a start time (e.g., 0 minutes) for a bucket and the bid price for the bucket (e.g., $50).

FIG. 33 shows a screenshot diagram illustrating embodiments of the DBMLII. In FIG. 33, an exemplary user interface is shown. Screen 3301 illustrates that a user (e.g., a trader) may select a market (e.g., US) via a dropdown 3305 and an advertiser via a dropdown 3310.

FIG. 34 shows a screenshot diagram illustrating embodiments of the DBMLII. In FIG. 34, an exemplary user interface is shown. Screen 3401 illustrates that the trader may utilize a segment recency tool via a widget 3405 to facilitate bidding based on recent activity. The segment recency tool may be configured (e.g., based on a previous analysis of data regarding top features) to have a machine learning configured user interface that may be utilized for campaign configuration and/or campaign optimization based on segment_recency.

FIG. 35 shows a screenshot diagram illustrating embodiments of the DBMLII. In FIG. 35, an exemplary user interface is shown. Screen 3501 illustrates that the trader may configure parameters of segment recency. The trader may specify a goal type (e.g., Conversion Rate) via a widget 3505, a goal target (e.g., 5%) via a widget 3510, a set of conversion pixels (e.g., to track conversions) via a widget 3515.

FIG. 36 shows a screenshot diagram illustrating embodiments of the DBMLII. In FIG. 36, an exemplary user interface is shown. Screen 3601 illustrates that the trader may configure parameters of segment recency. The trader may specify the name of a bid curve (e.g., Curve1) via a widget 3605, a set of segments to analyze via a widget 3610, a minimum bid (e.g., $3) via a widget 3615, a maximum bid (e.g., $10) via a widget 3620, a look back window (e.g., 7 days) via a widget 3625, whether to bid the minimum bid on users that have been in a segment longer than the look back window via a widget 3630.

FIG. 37 shows a screenshot diagram illustrating embodiments of the DBMLII. In FIG. 37, an exemplary user interface is shown. Screen 3701 shows a GUI that may be utilized by the trader to set bid prices for various recency buckets. For example, the trader may drag the curve to adjust the bucket sizes, bid prices, and/or the like. In another example, the trader may split a bucket into multiple buckets. In one implementation, the trader may be provided a bid curve optimized via a CO component, and the trader may modify the provided bid curve via optimization input to obtain the resulting bid curve shown. The trader may specify whether the resulting bid curve should be re-optimized via a widget 3705.

FIG. 38 shows a screenshot diagram illustrating embodiments of the DBMLII. In FIG. 38, an exemplary user interface is shown. Screen 3801 shows a re-optimized bid curve that may be generated via the CO component by optimizing the bid curve set up by the trader shown in FIG. 37.

FIG. 39 shows a screenshot diagram illustrating embodiments of the DBMLII. In FIG. 39, an exemplary user interface is shown. Screen 3901 illustrates that the trader may specify advertising campaigns (e.g., flights) that should utilize the optimized bid curve for automated bidding via a widget 3905. The selected campaigns are shown via a widget 3910.

FIG. 40 shows a screenshot diagram illustrating embodiments of the DBMLII. In FIG. 40, an exemplary user interface is shown. Screen 4001 illustrates that the trader may specify a name for the configuration via a widget 4005. Widget 4010 shows advertising campaigns selected by the trader for the configuration.

FIG. 41 shows an exemplary architecture for the DBMLII. In one embodiment, the DBMLII may be designed to be highly aligned and loosely coupled. The three loops—engineers (e.g., building DBMLII UI and data pipelines), internal data scientists (e.g., creating machine learning commands to evaluate inventory), and regional data scientists (e.g., contributing algorithms based on the knowledge of local markets)—connect at two points: input and output. For example, an input may be log level data and an output may be a Bonsai tree (a JSON object) with granular bidding rules.

Figure 42:
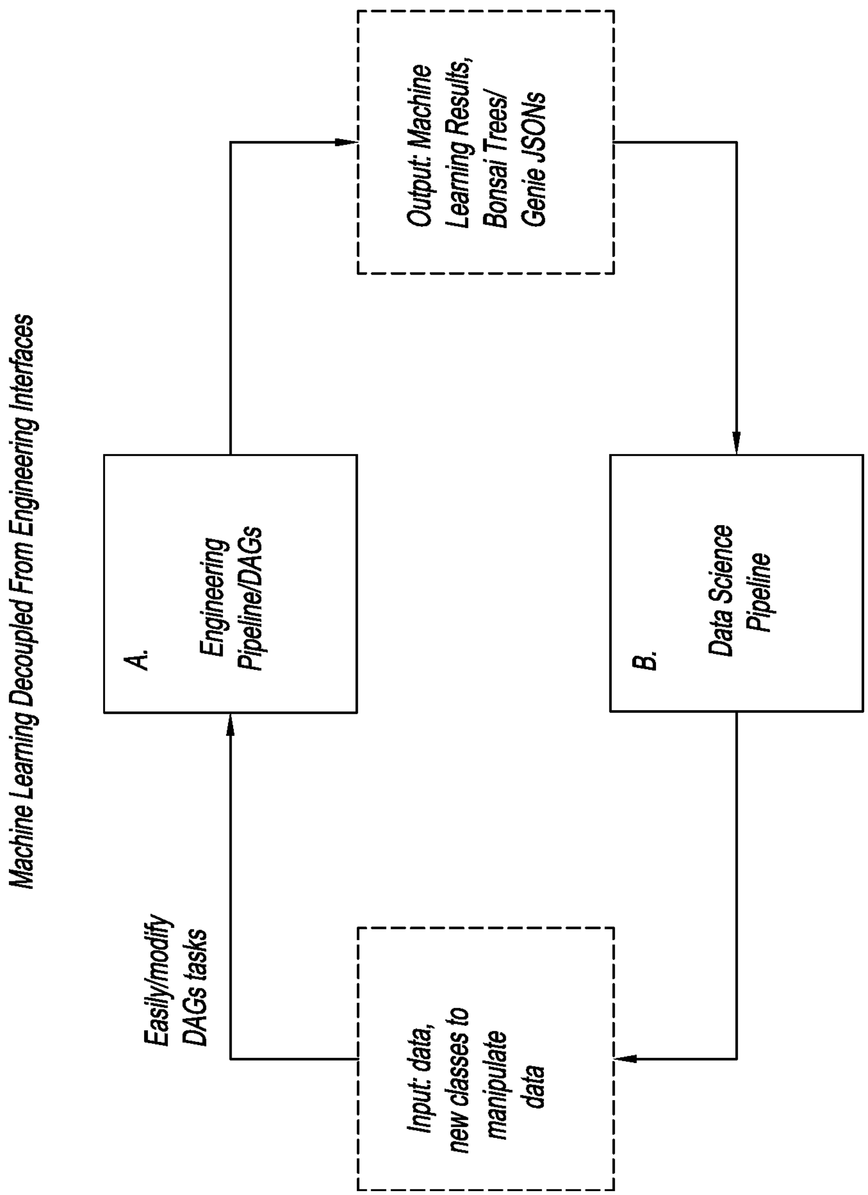
FIG. 42 shows an exemplary architecture for the DBMLII.

FIG. 42 shows an exemplary architecture for the DBMLII. In one embodiment, to achieve the separation between engineers and data scientists a dynamic, scalable, and extensible service that can programmatically author, schedule, and monitor DBMLII data pipelines may be utilized (e.g., the Airflow platform).

A. Engineering Pipeline/DAGs

To organize the steps in a strategy's workflow, Directed Acyclic Graphs (DAGs) may be employed, which contain independent operators describing single steps. An instantiated operator is referred to as a task. By combining DAGs and operators to create task instances, complex workflows may be built. See FIGS. 43 and 44 for examples of DAGs. When a data scientist writes a new class, an engineer may create a DAG task with defined inputs and outputs as in the example shown in FIG. 45. The code to handle the tasks, kick off the DAGs, and store the results has already been written and may be maintained by engineers.

B. Data Science Pipeline

A data scientist may write a new class in whichever programming language they prefer. For example, a data scientist might write a class for determining top features. See FIG. 15 for an example of a class that may be written to determine top features. A data scientist may specify parameters for the job (e.g., which data to use, which features to include in machine learning, etc.) and kick off the DAG.

FIG. 43 shows a screenshot diagram illustrating embodiments of the DBMLII. In FIG. 43, an example of a DAG (e.g., for the CCP) is shown. The DAG has a Bonsai tree as output. Each task may be a separate step in CCP workflow. The arrows indicate task dependencies. For example, the Chi Square test—select_features—uses the outputs of mark_unpopular and respect_targeting_profile tasks and in turn has its outputs sent to encode_df, unbucket_and_clean, and summary_report tasks.

FIG. 44 shows a screenshot diagram illustrating embodiments of the DBMLII. In FIG. 44, an example of a DAG (e.g., for the CCP) is shown. The DAG has Genie JSON as output. Each task may be a separate step in CCP workflow. The arrows indicate task dependencies. For example, the Chi Square test—select_features—uses the output of mark_unpopular task and in turn has its outputs sent to apn_lut_gen, encode_df, unbucket_and_clean, and summary_report tasks.

FIG. 45 shows a screenshot diagram illustrating embodiments of the DBMLII. In FIG. 45, an example of a DAG task (e.g., written by an engineer) is shown.

Additional Alternative Embodiment Examples

The following alternative example embodiments provide a number of variations of some of the core principles already discussed for expanded color on the abilities of the a DBMLII.

Co-Pilot

Co-Pilot is an advanced trading platform that leverages human intuition, machine learning, and automation to drive growth. It increases bidding and performance efficiency and acts as a visualization tool that allows traders to see the impact of their optimizations.

Log level data (LLD) from demand side platforms (DSPs) is ingested by Co-Pilot to determine which factors make up successful campaigns. Impressions are then evaluated based on those learnings.

Highly Aligned, Loosely Coupled

One of the DBMLII's goals may be to make advertising welcome, which means that a right ad has to be served at the right time to the right person. This should result in increased probability to click or to purchase the item/service advertised. At Co-Pilot we recognize that AI/machine learning cannot achieve this alone—a human has to be in the loop to provide intuition gained from years of experience and knowledge of human psychology.

For this reason, Co-Pilot is designed to be highly aligned and loosely coupled. See FIG. 1.

The three loops—engineers (building Co-Pilot UI and data pipelines), internal data scientists (creating machine learning models to evaluate inventory), and regional data scientists (contributing models based on the knowledge of local markets)—connect at two points: input and output. An input might be Appnexus' LLD and an output a bonsai tree (a JSON object) with granular bidding rules.

Click and Conversion Predictor Overview

One of the Co-Pilot's tools is the Click and Conversions Predictor (CCP), which performs dynamic optimization based on a user's likelihood to generate an action—a click or a conversion. Historical LLD, which consists of millions of rows containing information on users (e.g. device type, geographical information), inventory (e.g. domain on which the impression was served, placement), time of day, etc., is fed into a machine learning algorithm (logistic regression—LR) to recognize feature value combinations that are most and least likely to result in an action. A weight is assigned to each feature value. For each value combination, the weights can be added up and converted into a probability to click, which in turn can be converted into a bid. The results can be uploaded to different DSPs in different formats: the weights themselves can be submitted, for example, or a JSON object made up of feature value combinations and their bids.

For every campaign using the CCP strategy, the model is run on LLD producing different feature value weights every six hours.

The biggest challenge in recognizing patterns in ad impression data is noise. Some of the features are more predictive than others; for example, hour or domain are usually more predictive than browser language or device model. Sometimes adding more features into the model makes the results worse because it introduces more noise rather than useful information. This is one of the reasons the CCP uses dynamic feature determining (DFD). Every time the algorithm runs, the most predictive features are selected. Different techniques have been used for DFD at different times, including random forest and chi-square test. Only the features chosen by DFD are preprocessed using label and one-hot encoding and passed on to logistic regression.

Scheduling and Monitoring Data Pipelines

Since a lot of Co-Pilot's tools allow a trader to automate the campaign's optimization (to run on a schedule) and since some steps in the tool's workflow might be the same (which means that running the entire workflow if the same parameters are used doesn't make sense), a dynamic, scalable, and extensible service was needed to programmatically author, schedule, and monitor Co-Pilot's data pipelines. Airflow platform was chosen for this purpose.

To organize all the steps in a strategy's workflow, Directed Acyclic Graphs (DAGs) are used, which consist of independent Operators describing single steps. An instantiated operator is referred to as a task. By combining DAGs and operators to create task instances, complex workflows can be built.

DSP Overview

FIG. 16 shows an example of the DSP Service, which may take the form of a python program built with Flask that serves as a proxy for all communication between our other processes and external DSP's.

Authentication

Normally if you wanted to access the Appnexus API programmatically, you would be required to follow their docs which involves authenticating with a user name and password, receiving a token, and then using that token in all subsequent requests. When you make use of the DSP Service, the authentication step is avoided. The DSP Service has access to all information required for authentication (encrypted passwords in Member table in database) and the required private key needed to decrypt those passwords. It is able to authenticate for all the active users in our database and it maintains token info in redis. It will automatically reauthenticate when it detects a token has expired so the caller who is making use of the DSP Service does not have to deal with it.

Rate Limiting

The API's we use have rate limits they expect us to abide by. The DSP Service allows us to track the rate with which we are hitting external API's and limit them globally when needed, something that would not be possible if all of our processes individually made requests to external API's. Rate limiting info is stored in redis, and if we go beyond the allowed rate, requests will be throttled until we are again under the allowable rate.

Pass Through of HTTP Method and URL/Query/POST Parameters

When you make a request to the DSP service, you specify the DSP and the member for that DSP that you mean to contact via the DSP service. For example, whenever making requests for Appnexus seat 1661, you would be hitting a url like https://dsp.xaxisdemand.com/appn/1661/. Anything further you put in the URL would get passed along to Appnexus along with any query parameters, post body and the HTTP method that is being used.

For example if you do:

HTTP GET https://dsp.xaxisdemand com/appn/1661/campaign?id=1 the DSP service will do

HTTP GET https://api.appnexus.com/campaign?id=1 sending along the authentication token that it has for seat 1661, and it will return the response back to the original caller.

Our python and javascript code have utility classes for communicating with the DSP service directly. You should essentially never need to test direct requests to any DSP's API, other than if you are working on the DSP service itself.

Click and Conversion Predictor

The algorithm is run after the log-level-data (LLD) is filtered and prepared. The input for the algorithm is a dataframe of 7-day LLD containing 100% of the positives (clicks/conversions) and 35% of the negatives (impressions that did not result in clicks/conversions). The purpose of the algorithm is to find the probabilities of a click occurring for various sets of feature values, and then translate that into bids while building a bonsai tree. The algorithm has four steps.

For Dynamic Data Pruning, Random Forest is used (in Version 2 of CCP, chi2 test is used instead of RF)

Random Forest (RF) algorithm is run on the data, and the importance of each feature is calculated. If the algorithm predicts enough of the positives correctly, then we can trust these importances and the top 5 features are returned in a list. If it does not predict enough positives, a default list of the following 8 features is returned: ['user_day', 'user_hour', 'region', 'size', 'browser', 'domain', 'os_extended', 'placement']

Encoders

The dataframe used in this step only has the five features determined by RF (or the default 8). For the data to be used by the Logistic Regression (LR) algorithm, its columns have to consist only of floats or integers and not strings. So first, all string columns are label encoded. 'yahoo.com' becomes 374 for example. All categorical features (at the moment all of the features we use are categorical since we don't use recency or frequency, which are numerical features) then have to be one-hot-encoded. So one column of 'user_day' becomes seven columns of 'user_day=0', 'user_day=1', etc.

Logistic Regression

Once the data consists only of numbers and is one-hot-encoded, a grid search is run to optimize the parameters of Logistic Regression (the two parameters we optimize are the penalty for regularization and the inverse of regularization strength—the smaller the value, the stronger the regularization, the smaller number of features affecting the probability of a click). When the best parameters are found, LR is run and the weights for every single feature and the intercept are returned. These numbers can then be used to find the probability of a click.

$$\text{Probability} = \frac{1}{1 + e^{-(\sum weights + intercept)}}$$

Bonsai Tree

Once the probability of a click for any impression can be found, a bonsai tree can be built. A list of "feature: weight" values ('domain=msn.com': 4.23, . . . ) is prepared and ordered by the absolute value of the weights such that the best and the worst features come first. Then a bonsai tree is built with all possible combinations. The bid for a particular set of features is decided by using the probability of a click and taking into the account the min and max bid set by a user. The number of nodes (leaves) is limited to a certain number (usually 40,000) to prevent the tree from exceeding the 3 MB limit.

Features Available in the Filtered LLD Data user_day
user_hour
size
position
country
region
os_extended
browser
language
seller_member_id
publisher
placement_group
domain
placement
device_model
carrier
supply_type Segment Recency Structure Initial Introduction.

The traders using the CoPilot Segment Recency tool used to have to drag the points on the recency bid strategy curve to get the curve they think is reasonable for a particular campaign. To improve the tool, an "Analyze" button is provided. After clicking this button (and waiting for about 10-25 minutes), a curve based on conversion data will be automatically drawn, and the trader will have an option to save the curve and apply it to campaigns. The model that outputs the curve is described below.

Segment Recency Model.

The inputs for the model are: seat, advertiser id, segment id or ids, Max Bid, Min Bid, and Max Window Days (recency window).

There are two steps to the process:

1. Get the conversion table. See FIG. 28 for an example of a conversion table. The first column is the time of the conversion and the second column is the time when a user was first added to the segment.

2. Run the model to get the final output that's a list of lists: [[minute_×1, bid1], [minute_×2, bid2] . . . ]

After the conversions table is obtained, the second column is subtracted from the first to get the recency time, and then the conversions are counted in 5 minute intervals. An example of the output for the first hour is shown below.

| | |
|---|---|
| 0 | 2048 |
| 5 | 2262 |
| 10 | 1469 |
| 15 | 986 |
| 20 | 743 |
| 25 | 497 |
| 30 | 424 |
| 35 | 327 |
| 40 | 274 |
| 45 | 199 |
| 50 | 188 |
| 55 | 175 |
| 60 | 123 |

There were 2048 conversion between 0 minutes and 5 minutes, 2262 conversions between 5 minutes and 10 minutes, etc.

The rolling mean calculation (https://en.wikipedia.org/wiki/Moving_average) is applied on the counts with the size of the moving window set to 8 hours to smooth out the fluctuations. The output for the first hour might look like this:

| | |
|---|---|
| 0 | 2048.000000 |
| 5 | 2155.000000 |
| 10 | 1926.333333 |
| 15 | 1691.250000 |
| 20 | 1501.600000 |
| 25 | 1334.166667 |
| 30 | 1204.142857 |
| 35 | 1094.500000 |
| 40 | 1003.333333 |
| 45 | 922.900000 |
| 50 | 856.090909 |

-continued

| | |
|---|---|
| 55 | 799.333333 |
| 60 | 747.307692 |

There are still thousands of points at this stage, so to reduce it down to a reasonable number of buckets a 'bucketing' algorithm looks at the two neighbouring numbers and finds their absolute difference |a−b| and the percent change |a−b|/a.

308.1. If the absolute difference is greater than 0.5 and percent change is greater than X: b is kept in the series.

308.2. Else: b is removed from the series.

The algorithm loops over different values of X until N number of points remain. At the moment N is set to 20, because it was found that having less than 20 points results in most of the points being located in the first few hours. Having more than 20 points would make it hard for a trader to drag and adjust the points later.

| | |
|---|---|
| 0 | 2048.000000 |
| 145 | 356.466670 |
| 490 | 60.020833 |
| 615 | 10.395833 |
| 2205 | 1.833333 |
| 2890 | 3.395833 |
| 9460 | 0.583333 |
| 9875 | 1.104167 |
| 10040 | 2.031250 |
| 19650 | 0.354167 |
| 20010 | 0.864583 |
| 20180 | 1.583333 |
| 25300 | 0.270833 |
| 25895 | 0.781250 |
| 28920 | 1.437500 |
| 32615 | 0.250000 |
| 33110 | 0.770833 |
| 38350 | 0.135417 |
| 38840 | 0.656250 |

To complete the series, another point is added to the end of the series whose x value is set to recency_window*24*60 (so 43,200 minutes for 30 day recency window) and the y value is set to 80% of the last value returned by the bucketing algorithm to create a sloping line to the end of the recency window.

The final step scales the conversion averages to (Min Bid, Max Bid) range and rewrites the result into a JSON-like format. See FIG. 32 for an example of the JSON-like format.

Initial Recency Conclusion

The first version of the segment recency model has been created. It is a simple model and will be improved in the future. It does not take into account the frequency or the total amount spent on a user. However, even this simple model should make setting up retargeting campaigns a lot easier.

Segment Recency Structure Additional

Introduction

Traders who would like to use the Co-Pilot Segment Recency tool currently have two options to set their bids: For the first option, they are presented with a bid curve, reflecting bid price based on the time since a user entered the specified target segment(s); the trader can then manually create and drag nodes on the curve to change the bids for various recency lengths. The second option is to use the Analyze function, which automatically creates bids based on past conversion data. The model described here is the basis for our second-generation Analyze function, designed to ameliorate issues with the first generation, and provide useful predictions for traders.

Segment Recency Model

The inputs for the model are: Seat, Advertiser ID, Segment ID(s), Max Bid, Min Bid, and Max Window Days (recency window). We also have several optional inputs for testing whether we have enough data to make a curve, which will be described in the section Testing for Sufficient Data.

To start the process, we get a conversion table. See FIG. 28 for an example of a conversion table. The first column is the time of the conversion, and the second column is the time when a user was first added to the segment. After the conversion table is obtained, the second column is subtracted from the first to get the time between entering the segment and converting—the "recency time"—for each row. This step is then repeated for impressions.

Bucketing

Because the segment recency tool bases bid price on recency time, we divide the range of recency times into "buckets" that are close enough to one another that we can give them the same bid. Since the recency curve represents 30+ days, the buckets should ideally cover very small ranges of time early in the curve, to provide high granularity in bid pricing, but increase in size further out in the curve to avoid unnecessary complexity.

To address this, we chose the bucket sizes as shown in FIG. 29 (For more information on this bucketing scheme, please see https://www.pvk.ca/Blog/2015/06/27/linear-log-bucketing-fast-versatile-simple/):

322.1. With the bucket sizes established, we can now create bid prices for each bucket. This takes several transformations, which we can see in the table shown in FIG. 30:

322.2. We find the number of rows in the conversion table that occurred in each bucket (column B).

322.3. We also get a table of impressions from the same time period as that of the conversion table, and find the number of impressions that occurred in each bucket (column C).

322.4. In order to normalize the conversions column for changes in campaign activity, we find the rate of conversions/impressions served in each bucket period (column D). (Even for campaigns where conversions are not directly caused by impressions, the number of impressions served is useful as a normalizing heuristic.)

322.5. We want to base our bid price on how we expect the conversion/impression rate to change in the near future, so we find the average cony/imp rate of the current bucket along with that of the next two (column E).

322.6. We want to normalize the values in column E, so that the highest value in this series is equal to the highest value in the original cony/imp rate series. This gives us get column F.

When this is done, we get a curve, like in the graph in FIG. 31.

Testing for Sufficient Data

In order to determine whether we have enough data to generate a useful curve, we run a series of tests:

325.1. Total impressions in dataset (default minimum: 1000)

325.2. Total conversions in dataset (default minimum: 50)

325.3. Total conversions in bucket with the most conversions (default minimum: 20)

325.4. Number of buckets with >0 impressions (default minimum: 14)

325.5. Number of buckets with >0 conversions (default minimum: 14)

325.6. Ratio of total impressions to total conversions (default minimum: 10)

To accommodate for different kinds of datasets, we find it acceptable for either the total impressions in dataset or the ratio of total impressions to total conversions to be below its minimum, as long as the other one is above minimum. If this condition is not met, or any of the other tests return a value below minimum, then no data is returned and a bid is not generated.

We can also change any of these minimum values in the future, by passing new minimum values for some or all of these tests through the model JSON.

Finishing Steps

The series is completed by adding one final point to the end of the normalized, forward-looking curve, where the x value is set equal to the recency_window (in days)*24*60, and y is set to 80% of the value of the last bucket. This creates a downward slope at the end of the recency window.

Finally, we scale the curve to the range of Min Bid to Max Bid. This provides us with a bid price for each bucket, which we then return in a JSON-like format. See FIG. 32 for an example of the JSON-like format.

Additional Recency Conclusion

This describes the implementation of version 2 of the Segment Recency Analyze feature in Co-Pilot, which will provide traders with bid modifications derived from the past history of their targeted segments. With this we have a foundation for leveraging our historical conversion data, to provide our traders with useful bid-price modifications.

DBMLII Controller

FIG. 46 shows a block diagram illustrating embodiments of a DBMLII controller. In this embodiment, the DBMLII controller 4601 may serve to aggregate, process, store, search, serve, identify, instruct, generate, match, and/or facilitate interactions with a computer through data anonymized machine learning technologies, and/or other related data.

Typically, users, which may be people and/or other systems, may engage information technology systems (e.g., computers) to facilitate information processing. In turn, computers employ processors to process information; such processors 4603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 4629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DBMLII controller 4601 may be connected to and/or communicate with entities such as, but not limited to: one or more users from peripheral devices 4612 (e.g., user input devices 4611); an optional cryptographic processor device 4628; and/or a communications network 4613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DBMLII controller 4601 may be based on computer systems that may comprise, but are not limited to, components such as: a computer systemization 4602 connected to memory 4629.

Computer Systemization

A computer systemization 4602 may comprise a clock 4630, central processing unit ("CPU(s)" and/or "processor (s)" (these terms are used interchangeable throughout the disclosure unless noted to the contrary)) 4603, a memory 4629 (e.g., a read only memory (ROM) 4606, a random access memory (RAM) 4605, etc.), and/or an interface bus 4607, and most frequently, although not necessarily, are all interconnected and/or communicating through a system bus 4604 on one or more (mother)board(s) 4602 having conductive and/or otherwise transportive circuit pathways through which instructions (e.g., binary encoded signals) may travel to effectuate communications, operations, storage, etc. The computer systemization may be connected to a power source 4686; e.g., optionally the power source may be internal. Optionally, a cryptographic processor 4626 may be connected to the system bus. In another embodiment, the cryptographic processor, transceivers (e.g., ICs) 4674, and/or sensor array (e.g., accelerometer, altimeter, ambient light, barometer, global positioning system (GPS) (thereby allowing DBMLII controller to determine its location), gyroscope, magnetometer, pedometer, proximity, ultra-violet sensor, etc.) 4673 may be connected as either internal and/or external peripheral devices 4612 via the interface bus I/O 4608 (not pictured) and/or directly via the interface bus 4607. In turn, the transceivers may be connected to antenna(s) 4675, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80×86 series (e.g., 80386, 80486), Pentium, Celeron, Core (2) Duo, i series (e.g., i3, i5, i7, etc.), Itanium, Xeon, and/or XScale; Motorola's 680×0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DBMLII controller and beyond through various interfaces. Should processing requirements dictate a greater amount speed and/or capacity, distributed processors (e.g., see Distributed DBMLII below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the DBMLII may be achieved by implementing a microcontroller such as CAST's R8051XC2 microcontroller; Intel's MCS 51 (i.e., 8051 microcontroller); and/or the like. Also, to implement certain features of the DBMLII, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DBMLII component collection (distributed or otherwise) and/or features may be implemented via the microprocessor and/or via embedded components; e.g., via ASIC, coprocessor, DSP, FPGA, and/or the like. Alternately, some implementations of the DBMLII may be implemented with embedded components that are configured and used to achieve a variety of features or signal processing.

Depending on the particular implementation, the embedded components may include software solutions, hardware solutions, and/or some combination of both hardware/software solutions. For example, DBMLII features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DBMLII features. A hierarchy of programmable interconnects allow logic blocks to be interconnected as needed by the DBMLII system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DBMLII may be developed on regular FPGAs and then migrated into a fixed version that more resembles ASIC implementations. Alternate or coordinating implementations may migrate DBMLII controller features to a final ASIC instead of or in addition to FPGAs. Depending on the implementation all of the aforementioned embedded components and microprocessors may be considered the "CPU" and/or "processor" for the DBMLII.

Power Source

The power source 4686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4686 is connected to at least one of the interconnected subsequent components of the DBMLII thereby providing an electric current to all subsequent components. In one example, the power source 4686 is connected to the system bus component 4604. In an alternative embodiment, an outside power source 4686 is provided through a connection across the I/O 4608 interface. For example, a USB and/or IEEE 1394 connection carries both data and power across the connection and is therefore a suitable source of power.

Interface Adapters

Interface bus(ses) 4607 may accept, connect, and/or communicate to a number of interface adapters, conventionally although not necessarily in the form of adapter cards, such as but not limited to: input output interfaces (I/O) 4608, storage interfaces 4609, network interfaces 4610, and/or the like. Optionally, cryptographic processor interfaces 4627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4609 may accept, communicate, and/or connect to a number of storage devices such as, but not limited to: storage devices 4614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4610 may accept, communicate, and/or connect to a communications network 4613. Through a communications network 4613, the DBMLII controller is accessible through remote clients **4633*b* (e.g., computers with web browsers) by users 4633*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DBMLII below), architectures may similarly be employed to pool, load balance, and/or otherwise decrease/increase the communicative bandwidth required by the DBMLII controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 4610 may be used to engage with various communications network types 4613**. For example, multiple network interfaces may be employed to allow for the communication over broadcast, multicast, and/or unicast networks.

Input Output interfaces (I/O) 4608 may accept, communicate, and/or connect to user, peripheral devices 4612 (e.g., input devices 4611), cryptographic processor devices 4628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 4612 may be connected and/or communicate to I/O and/or other facilities of the like such as network interfaces, storage interfaces, directly to the interface bus, system bus, the CPU, and/or the like. Peripheral devices may be external, internal and/or part of the DBMLII controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 4611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the DBMLII controller may be embodied as an embedded, dedicated, and/or monitor-less (i.e., headless) device, wherein access would be provided over a network interface connection.

Cryptographic units such as, but not limited to, microcontrollers, processors 4626, interfaces 4627, and/or devices 4628 may be attached, and/or communicate with the DBMLII controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 4629. However, memory is a fungible technology and resource, thus, any number of memory embodiments may be employed in lieu of or in concert with one another. It is to be understood that the DBMLII controller and/or a computer systemization may employ various forms of memory 4629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 4629 will include ROM 4606, RAM 4605, and a storage device 4614. A storage device 4614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable®/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 4629 may contain a collection of program and/or database components and/or data such as, but not limited to: operating system component(s) 4615 (operating system); information server component(s) 4616 (information server); user interface component(s) 4617 (user interface); Web browser component(s) 4618 (Web browser); database(s) 4619; mail server component(s) 4621; mail client component(s) 4622; cryptographic server component(s) 4620 (cryptographic server); the DBMLII component(s) 4635; and/or the like (i.e., collectively a component collection). These components may be stored and accessed from the storage devices and/or from storage devices accessible through an interface bus. Although non-conventional program components such as those in the component collection, typically, are stored in a local storage device 4614, they may also be loaded and/or stored in memory such as: peripheral devices, RAM, remote storage facilities through a communications network, ROM, various forms of memory, and/or the like.

Operating System

The operating system component 4615 is an executable program component facilitating the operation of the DBMLII controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DBMLII controller to communicate with other entities through a communications network 4613. Various communication protocols may be used by the DBMLII controller as a subcarrier transport mechanism for interaction, such as, but not limited to: multicast, TCP/IP, UDP, unicast, and/or the like.

Information Server

An information server component 4616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DBMLII controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DBMLII database 4619, operating systems, other program components, user interfaces, Web browsers, and/or the like.

Access to the DBMLII database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DBMLII. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DBMLII as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 4617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DBMLII enabled nodes. The combined application may be nugatory on systems employing standard Web browsers.

Mail Server

A mail server component 4621 is a stored program component that is executed by a CPU 4603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DBMLII. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the DBMLII mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4622 is a stored program component that is executed by a CPU 4603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4620 is a stored program component that is executed by a CPU 4603, cryptographic processor 4626, cryptographic processor interface 4627, cryptographic processor device 4628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DBMLII may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DBMLII component to engage in secure transactions if so desired. The cryptographic component facilitates the secure accessing of resources on the DBMLII and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DBMLII Database

The DBMLII database component 4619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DBMLII database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DBMLII database is implemented as a data-structure, the use of the DBMLII database 4619 may be integrated into another component such as the DBMLII component 4635. Also, the database may be implemented as a mix of data structures, objects, and relational structures. Databases may be consolidated and/or distributed in countless variations (e.g., see Distributed DBMLII below). Portions of databases, e.g., tables, may be exported and/or imported and thus decentralized and/or integrated.

In one embodiment, the database component 4619 includes several tables 4619*a-z:*

An accounts table 4619*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 4619*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DBMLII);

An devices table 4619*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 4619*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 4619*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 4619*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 4619*g* includes fields such as, but not limited to: transactionID, accountID, assetID s, deviceID s, paymentID s, transactionID s, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 4619*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 4619*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, imressionTimeStamp, impressionGeo, impressionAction, impressionType, impressionPublisherID, impressionPublisherURL, and/or the like;

A ML_Data table 4619*j* includes fields such as, but not limited to: associatedCampaignID, DSP_Data, logLevelData, proprietaryData, externalPredictions, machineLearningResults, logisticRegressionWeights, logisticRegressionIntercept, featureScores, correlatedFeatures, topFeatures, userinterfaceConfigurationForFeature, and/or the like;

A workflows table 4619*k* includes fields such as, but not limited to: workflowID, workflowInputs, workflowOutputs, workflowEngineersIDs, workflowDataScientistsIDs, workflowDAG, workflowOperators, workflowTasks, and/or the like;

A market_data table 4619*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the DBMLII database may interact with other database systems. For example, employing a distributed database system, queries and data access by search DBMLII component may treat the combination of the DBMLII database, an integrated data security layer database as a single database entity (e.g., see Distributed DBMLII below).

In one embodiment, user programs may contain various user interface primitives, which may serve to update the DBMLII. Also, various accounts may require custom database tables depending upon the environments and the types of clients the DBMLII may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 4619*a-z*. The DBMLII may be configured to keep track of various settings, inputs, and parameters via database controllers.

The DBMLII database may communicate to and/or with other components in a component collection, including itself, and/or facilities of the like. Most frequently, the DBMLII database communicates with the DBMLII component, other program components, and/or the like. The database may contain, retain, and provide information regarding other nodes and data.

The DBMLIIs

The DBMLII component 4635 is a stored program component that is executed by a CPU. In one embodiment, the DBMLII component incorporates any and/or all combinations of the aspects of the DBMLII that was discussed in the previous figures. As such, the DBMLII affects accessing, obtaining and the provision of information, services, transactions, and/or the like across various communications networks. The features and embodiments of the DBMLII discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DBMLII's features and facilities, and in many cases reduce the costs, energy consumption/requirements, and extend the life of DBMLII's underlying infrastructure; this has the added benefit of making the DBMLII more reliable. Similarly, many of the features and mechanisms are designed to be easier for users to use and access, thereby broadening the audience that may enjoy/employ and exploit the feature sets of the DBMLII; such ease of use also helps to increase the reliability of the DBMLII. In addition, the feature sets include heightened security as noted via the Cryptographic components 4620, 4626, 4628 and throughout, making access to the features and data more reliable and secure The DBMLII transforms campaign configuration request, campaign optimization input inputs, via DBMLII components (e.g., DBML, DFD, UIC, CO), into top features, machine learning configured user interface, translated commands, campaign configuration response outputs.

The DBMLII component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DBMLII server employs a cryptographic server to encrypt and decrypt communications. The DBMLII component may communicate to and/or with other components in a component collection, including itself, and/or facilities of the like. Most frequently, the DBMLII component communicates with the DBMLII database, operating systems, other program components, and/or the like. The DBMLII may contain, communicate, generate, obtain, and/or provide program component, system, user, and/or data communications, requests, and/or responses.

Distributed DBMLIIs

The structure and/or operation of any of the DBMLII node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DBMLII controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for DBMLII controller and/or DBMLII component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which is allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse:

databases, data collections, data stores, structured data, and/or the like. Again, the desired configuration will depend upon the context, environment, and requirements of system deployment.

For example, in some implementations, the DBMLII controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A double blind machine learning apparatus, comprising:
a memory;
a component collection in the memory, including:
a double blind machine learning component;
a processor disposed in communication with the memory, and configured to issue a plurality of processing instructions from the component collection stored in the memory,
wherein the processor issues instructions from the double blind machine learning component, stored in the memory, to:
obtain, via at least one processor, a double blind machine learning request, wherein the double blind machine learning request includes: a minimum bid, a maximum bid, a look back window;
determine, via at least one processor, a third party's shared dataset for the look back window and external predictions data corresponding to the shared dataset, wherein the external predictions data is determined by the third party based on an unavailable dataset;
determine, via at least one processor, proprietary data corresponding to the shared dataset;
generate, via at least one processor, a dataframe comprising at least a subset of the determined shared dataset, at least a subset of the external predictions data, and at least a subset of the proprietary data;
determine, via at least one processor, a set of top features from the dataframe, wherein top features are features that are most likely to be useful for classification;
encode, via at least one processor, top features data associated with the determined set of top features;
generate, via at least one processor, a machine learning structure using the encoded top features data;
utilize, via at least one processor, the generated machine learning structure on the encoded top features data to produce machine learning results, wherein the machine learning results specify an efficacy value for a given set of top features values;
translate, via at least one processor, the produced machine learning results into commands, wherein the translated commands define a bid value for a given set of top features values based on the corresponding efficacy value, the minimum bid, and the maximum bid; and
provide, via at least one processor, the translated commands to the third party.

2. The apparatus of embodiment 1, wherein the shared dataset comprises log level data, and wherein each row of the log level data represents a purchased impression.

3. The apparatus of embodiment 2, wherein the external predictions data specifies an efficacy value calculated by the third party for each row of the log level data.

4. The apparatus of embodiment 1, further, comprising:
the processor issues instructions from the double blind machine learning component, stored in the memory, to:
filter, via at least one processor, the shared dataset such that data regarding impressions that resulted in a click is kept, and a specified fraction of data regarding impressions that did not result in a click is kept.

5. The apparatus of embodiment 1, further, comprising:
the processor issues instructions from the double blind machine learning component, stored in the memory, to:
determine, via at least one processor, a set of features in the generated dataframe to combine into a combined feature; and
add, via at least one processor, the combined feature to the dataframe.

6. The apparatus of embodiment 1, wherein instructions to determine a set of top features from the dataframe further comprise instructions to:
partition, via at least one processor, contents of the dataframe into a features dataframe and a labels dataframe;
determine, via at least one processor, a score for each feature in the features dataframe based on the dependence of a feature on the contents of the labels dataframe; and
determine, via at least one processor, top features in the features dataframe based on the determined scores.
7. The apparatus of embodiment 6, wherein instructions to determine a set of top features from the dataframe further comprise instructions to:
prune, via at least one processor, the scored features in the features dataframe to remove correlated features with smaller scores.
8. The apparatus of embodiment 6, wherein scores are determined using a Chi Square Test.
9. The apparatus of embodiment 1, wherein the top features data is encoded by label encoding string data.
10. The apparatus of embodiment 1, wherein the top features data is encoded by one-hot-encoding categorical features.
11. The apparatus of embodiment 1, wherein the machine learning structure is generated by optimizing parameters of logistic regression using a grid search.
12. The apparatus of embodiment 11, wherein the optimized parameters comprise: penalty for regularization, inverse of regularization strength.
13. The apparatus of embodiment 1, further, comprising:
the processor issues instructions from the double blind machine learning component, stored in the memory, to:
determine, via at least one processor, that the set of top features includes a proprietary feature from the proprietary data; and
provide, via at least one processor, encoded proprietary data corresponding to the proprietary feature to the third party.
14. The apparatus of embodiment 1, wherein the translated commands are in a Bonsai tree format.
15. The apparatus of embodiment 1, wherein the translated commands are executable commands in JSON format.
16. A double blind machine learning non-transient physical medium storing processor-executable components, the components, comprising:
a component collection stored in the medium, including:
a double blind machine learning component;
wherein the double blind machine learning component, stored in the medium, includes processor-issuable instructions to:
obtain, via at least one processor, a double blind machine learning request, wherein the double blind machine learning request includes: a minimum bid, a maximum bid, a look back window;
determine, via at least one processor, a third party's shared dataset for the look back window and external predictions data corresponding to the shared dataset, wherein the external predictions data is determined by the third party based on an unavailable dataset;
determine, via at least one processor, proprietary data corresponding to the shared dataset;
generate, via at least one processor, a dataframe comprising at least a subset of the determined shared dataset, at least a subset of the external predictions data, and at least a subset of the proprietary data;
determine, via at least one processor, a set of top features from the dataframe, wherein top features are features that are most likely to be useful for classification;
encode, via at least one processor, top features data associated with the determined set of top features;
generate, via at least one processor, a machine learning structure using the encoded top features data;
utilize, via at least one processor, the generated machine learning structure on the encoded top features data to produce machine learning results, wherein the machine learning results specify an efficacy value for a given set of top features values;
translate, via at least one processor, the produced machine learning results into commands, wherein the translated commands define a bid value for a given set of top features values based on the corresponding efficacy value, the minimum bid, and the maximum bid; and
provide, via at least one processor, the translated commands to the third party.
17. The medium of embodiment 16, wherein the shared dataset comprises log level data, and wherein each row of the log level data represents a purchased impression.
18. The medium of embodiment 17, wherein the external predictions data specifies an efficacy value calculated by the third party for each row of the log level data.
19. The medium of embodiment 16, further, comprising:
the double blind machine learning component, stored in the medium, includes processor-issuable instructions to:
filter, via at least one processor, the shared dataset such that data regarding impressions that resulted in a click is kept, and a specified fraction of data regarding impressions that did not result in a click is kept.
20. The medium of embodiment 16, further, comprising:
the double blind machine learning component, stored in the medium, includes processor-issuable instructions to:
determine, via at least one processor, a set of features in the generated dataframe to combine into a combined feature; and
add, via at least one processor, the combined feature to the dataframe.
21. The medium of embodiment 16, wherein instructions to determine a set of top features from the dataframe further comprise instructions to:
partition, via at least one processor, contents of the dataframe into a features dataframe and a labels dataframe;
determine, via at least one processor, a score for each feature in the features dataframe based on the dependence of a feature on the contents of the labels dataframe; and
determine, via at least one processor, top features in the features dataframe based on the determined scores.
22. The medium of embodiment 21, wherein instructions to determine a set of top features from the dataframe further comprise instructions to:
prune, via at least one processor, the scored features in the features dataframe to remove correlated features with smaller scores.
23. The medium of embodiment 21, wherein scores are determined using a Chi Square Test.
24. The medium of embodiment 16, wherein the top features data is encoded by label encoding string data.

25. The medium of embodiment 16, wherein the top features data is encoded by one-hot-encoding categorical features.
26. The medium of embodiment 16, wherein the machine learning structure is generated by optimizing parameters of logistic regression using a grid search.
27. The medium of embodiment 26, wherein the optimized parameters comprise: penalty for regularization, inverse of regularization strength.
28. The medium of embodiment 16, further, comprising:
  the double blind machine learning component, stored in the medium, includes processor-issuable instructions to:
    determine, via at least one processor, that the set of top features includes a proprietary feature from the proprietary data; and
    provide, via at least one processor, encoded proprietary data corresponding to the proprietary feature to the third party.
29. The medium of embodiment 16, wherein the translated commands are in a Bonsai tree format.
30. The medium of embodiment 16, wherein the translated commands are executable commands in JSON format.
31. A processor-implemented double blind machine learning system, comprising:
  a double blind machine learning component means, to:
    obtain, via at least one processor, a double blind machine learning request, wherein the double blind machine learning request includes: a minimum bid, a maximum bid, a look back window;
    determine, via at least one processor, a third party's shared dataset for the look back window and external predictions data corresponding to the shared dataset, wherein the external predictions data is determined by the third party based on an unavailable dataset;
    determine, via at least one processor, proprietary data corresponding to the shared dataset;
    generate, via at least one processor, a dataframe comprising at least a subset of the determined shared dataset, at least a subset of the external predictions data, and at least a subset of the proprietary data;
    determine, via at least one processor, a set of top features from the dataframe, wherein top features are features that are most likely to be useful for classification;
    encode, via at least one processor, top features data associated with the determined set of top features;
    generate, via at least one processor, a machine learning structure using the encoded top features data;
    utilize, via at least one processor, the generated machine learning structure on the encoded top features data to produce machine learning results, wherein the machine learning results specify an efficacy value for a given set of top features values;
    translate, via at least one processor, the produced machine learning results into commands, wherein the translated commands define a bid value for a given set of top features values based on the corresponding efficacy value, the minimum bid, and the maximum bid; and
    provide, via at least one processor, the translated commands to the third party.
32. The system of embodiment 31, wherein the shared dataset comprises log level data, and wherein each row of the log level data represents a purchased impression.
33. The system of embodiment 32, wherein the external predictions data specifies an efficacy value calculated by the third party for each row of the log level data.
34. The system of embodiment 31, further, comprising:
  the double blind machine learning component means, to:
    filter, via at least one processor, the shared dataset such that data regarding impressions that resulted in a click is kept, and a specified fraction of data regarding impressions that did not result in a click is kept.
35. The system of embodiment 31, further, comprising:
  the double blind machine learning component means, to:
    determine, via at least one processor, a set of features in the generated dataframe to combine into a combined feature; and
    add, via at least one processor, the combined feature to the dataframe.
36. The system of embodiment 31, wherein means to determine a set of top features from the dataframe further comprise means to:
  partition, via at least one processor, contents of the dataframe into a features dataframe and a labels dataframe;
  determine, via at least one processor, a score for each feature in the features dataframe based on the dependence of a feature on the contents of the labels dataframe; and
  determine, via at least one processor, top features in the features dataframe based on the determined scores.
37. The system of embodiment 36, wherein means to determine a set of top features from the dataframe further comprise means to:
  prune, via at least one processor, the scored features in the features dataframe to remove correlated features with smaller scores.
38. The system of embodiment 36, wherein scores are determined using a Chi Square Test.
39. The system of embodiment 31, wherein the top features data is encoded by label encoding string data.
40. The system of embodiment 31, wherein the top features data is encoded by one-hot-encoding categorical features.
41. The system of embodiment 31, wherein the machine learning structure is generated by optimizing parameters of logistic regression using a grid search.
42. The system of embodiment 41, wherein the optimized parameters comprise: penalty for regularization, inverse of regularization strength.
43. The system of embodiment 31, further, comprising:
  the double blind machine learning component means, to:
    determine, via at least one processor, that the set of top features includes a proprietary feature from the proprietary data; and
    provide, via at least one processor, encoded proprietary data corresponding to the proprietary feature to the third party.
44. The system of embodiment 31, wherein the translated commands are in a Bonsai tree format.
45. The system of embodiment 31, wherein the translated commands are executable commands in JSON format.
46. A processor-implemented double blind machine learning method, comprising:
  executing processor-implemented double blind machine learning component instructions to:
    obtain, via at least one processor, a double blind machine learning request, wherein the double blind machine learning request includes: a minimum bid, a maximum bid, a look back window;
    determine, via at least one processor, a third party's shared dataset for the look back window and external predictions data corresponding to the shared dataset, wherein the external predictions data is determined by the third party based on an unavailable dataset;

determine, via at least one processor, proprietary data corresponding to the shared dataset;

generate, via at least one processor, a dataframe comprising at least a subset of the determined shared dataset, at least a subset of the external predictions data, and at least a subset of the proprietary data;

determine, via at least one processor, a set of top features from the dataframe, wherein top features are features that are most likely to be useful for classification;

encode, via at least one processor, top features data associated with the determined set of top features;

generate, via at least one processor, a machine learning structure using the encoded top features data;

utilize, via at least one processor, the generated machine learning structure on the encoded top features data to produce machine learning results, wherein the machine learning results specify an efficacy value for a given set of top features values;

translate, via at least one processor, the produced machine learning results into commands, wherein the translated commands define a bid value for a given set of top features values based on the corresponding efficacy value, the minimum bid, and the maximum bid; and provide, via at least one processor, the translated commands to the third party.

47. The method of embodiment 46, wherein the shared dataset comprises log level data, and wherein each row of the log level data represents a purchased impression.

48. The method of embodiment 47, wherein the external predictions data specifies an efficacy value calculated by the third party for each row of the log level data.

49. The method of embodiment 46, further, comprising:

executing processor-implemented double blind machine learning component instructions to:

filter, via at least one processor, the shared dataset such that data regarding impressions that resulted in a click is kept, and a specified fraction of data regarding impressions that did not result in a click is kept.

50. The method of embodiment 46, further, comprising:

executing processor-implemented double blind machine learning component instructions to:

determine, via at least one processor, a set of features in the generated dataframe to combine into a combined feature; and add, via at least one processor, the combined feature to the dataframe.

51. The method of embodiment 46, wherein instructions to determine a set of top features from the dataframe further comprise instructions to:

partition, via at least one processor, contents of the dataframe into a features dataframe and a labels dataframe;

determine, via at least one processor, a score for each feature in the features dataframe based on the dependence of a feature on the contents of the labels dataframe; and determine, via at least one processor, top features in the features dataframe based on the determined scores.

52. The method of embodiment 51, wherein instructions to determine a set of top features from the dataframe further comprise instructions to:

prune, via at least one processor, the scored features in the features dataframe to remove correlated features with smaller scores.

53. The method of embodiment 51, wherein scores are determined using a Chi Square Test.

54. The method of embodiment 46, wherein the top features data is encoded by label encoding string data.

55. The method of embodiment 46, wherein the top features data is encoded by one-hot-encoding categorical features.

56. The method of embodiment 46, wherein the machine learning structure is generated by optimizing parameters of logistic regression using a grid search.

57. The method of embodiment 56, wherein the optimized parameters comprise: penalty for regularization, inverse of regularization strength.

58. The method of embodiment 46, further, comprising:

executing processor-implemented double blind machine learning component instructions to:

determine, via at least one processor, that the set of top features includes a proprietary feature from the proprietary data; and provide, via at least one processor, encoded proprietary data corresponding to the proprietary feature to the third party.

59. The method of embodiment 46, wherein the translated commands are in a Bonsai tree format.

60. The method of embodiment 46, wherein the translated commands are executable commands in JSON format.

101. A machine learning structure generator accelerator apparatus, comprising:

a memory;

a component collection in the memory, including:

a dynamic feature determining component;

a processor disposed in communication with the memory, and configured to issue a plurality of processing instructions from the component collection stored in the memory, wherein the processor issues instructions from the dynamic feature determining component, stored in the memory, to:

obtain, via at least one processor, a dataset comprising a set of features;

partition, via at least one processor, contents of the dataset into a features dataframe and a labels dataframe;

encode, via at least one processor, features data in the features dataframe;

calculate, via at least one processor, a score for each feature in the features dataframe;

determine, via at least one processor, top features in the features dataframe based on the calculated scores; and provide, via at least one processor, the determined top features to a machine learning structure generator.

102. The apparatus of embodiment 101, wherein the dataset comprises log level data, and wherein each row of the log level data represents a purchased ad.

103. The apparatus of embodiment 101, further, comprising:

the processor issues instructions from the dynamic feature determining component, stored in the memory, to:

filter, via at least one processor, the dataset such that data regarding impressions that resulted in a conversion is kept, and a specified fraction of data regarding impressions that did not result in a conversion is kept.

104. The apparatus of embodiment 101, further, comprising: the processor issues instructions from the dynamic feature determining component, stored in the memory, to: enrich, via at least one processor, the dataset by converting a feature into a plurality of features.

105. The apparatus of embodiment 101, further, comprising: the processor issues instructions from the dynamic feature determining component, stored in the memory, to: determine, via at least one processor, a set of features in the dataset to combine into a combined feature; and add, via at least one processor, the combined feature to the dataset.

106. The apparatus of embodiment 101, further, comprising: the processor issues instructions from the dynamic feature determining component, stored in the memory, to: drop, via at least one processor, an unusable feature from the dataset.

107. The apparatus of embodiment 106, wherein an unusable feature is a feature that is not available during bid time.

108. The apparatus of embodiment 106, wherein an unusable feature is a feature with fewer than a specified number of values.

109. The apparatus of embodiment 106, wherein an unusable feature is a feature included in a set of features to exclude.

110. The apparatus of embodiment 101, wherein the features data is encoded by label encoding string data.

111. The apparatus of embodiment 101, wherein the features data is encoded by one-hot-encoding categorical features.

112. The apparatus of embodiment 101, wherein scores are calculated using a Chi Square Test.

113. The apparatus of embodiment 101, wherein scores are calculated using a Random Forest method.

114. The apparatus of embodiment 101, wherein the labels dataframe comprises a labels column that specifies for each row of the features dataframe whether a row is associated with a conversion, and wherein a score for each feature in the features dataframe is calculated based on the dependence of a feature on the labels column.

115. The apparatus of embodiment 101, further, comprising: the processor issues instructions from the dynamic feature determining component, stored in the memory, to: prune, via at least one processor, the scored features in the features dataframe such that the highest scored feature from a group of same type features remains for consideration as a top feature.

116. A processor-readable machine learning structure generator accelerator non-transient physical medium storing processor-executable components, the components, comprising:
a component collection stored in the medium, including:
a dynamic feature determining component;
wherein the dynamic feature determining component, stored in the medium, includes processor-issuable instructions to:
obtain, via at least one processor, a dataset comprising a set of features;
partition, via at least one processor, contents of the dataset into a features dataframe and a labels dataframe;
encode, via at least one processor, features data in the features dataframe;
calculate, via at least one processor, a score for each feature in the features dataframe;
determine, via at least one processor, top features in the features dataframe based on the calculated scores; and
provide, via at least one processor, the determined top features to a machine learning structure generator.

117. The medium of embodiment 116, wherein the dataset comprises log level data, and wherein each row of the log level data represents a purchased ad.

118. The medium of embodiment 116, further, comprising: the dynamic feature determining component, stored in the medium, includes processor-issuable instructions to: filter, via at least one processor, the dataset such that data regarding impressions that resulted in a conversion is kept, and a specified fraction of data regarding impressions that did not result in a conversion is kept.

119. The medium of embodiment 116, further, comprising: the dynamic feature determining component, stored in the medium, includes processor-issuable instructions to: enrich, via at least one processor, the dataset by converting a feature into a plurality of features.

120. The medium of embodiment 116, further, comprising: the dynamic feature determining component, stored in the medium, includes processor-issuable instructions to: determine, via at least one processor, a set of features in the dataset to combine into a combined feature; and add, via at least one processor, the combined feature to the dataset.

121. The medium of embodiment 116, further, comprising: the dynamic feature determining component, stored in the medium, includes processor-issuable instructions to: drop, via at least one processor, an unusable feature from the dataset.

122. The medium of embodiment 121, wherein an unusable feature is a feature that is not available during bid time.

123. The medium of embodiment 121, wherein an unusable feature is a feature with fewer than a specified number of values.

124. The medium of embodiment 121, wherein an unusable feature is a feature included in a set of features to exclude.

125. The medium of embodiment 116, wherein the features data is encoded by label encoding string data.

126. The medium of embodiment 116, wherein the features data is encoded by one-hot-encoding categorical features.

127. The medium of embodiment 116, wherein scores are calculated using a Chi Square Test.

128. The medium of embodiment 116, wherein scores are calculated using a Random Forest method.

129. The medium of embodiment 116, wherein the labels dataframe comprises a labels column that specifies for each row of the features dataframe whether a row is associated with a conversion, and wherein a score for each feature in the features dataframe is calculated based on the dependence of a feature on the labels column.

130. The medium of embodiment 116, further, comprising: the dynamic feature determining component, stored in the medium, includes processor-issuable instructions to: prune, via at least one processor, the scored features in the features dataframe such that the highest scored feature from a group of same type features remains for consideration as a top feature.

131. A processor-implemented machine learning structure generator accelerator system, comprising:
a dynamic feature determining component means, to:
obtain, via at least one processor, a dataset comprising a set of features;

partition, via at least one processor, contents of the dataset into a features dataframe and a labels dataframe;

encode, via at least one processor, features data in the features dataframe;

calculate, via at least one processor, a score for each feature in the features dataframe;

determine, via at least one processor, top features in the features dataframe based on the calculated scores; and provide, via at least one processor, the determined top features to a machine learning structure generator.

132. The system of embodiment 131, wherein the dataset comprises log level data, and wherein each row of the log level data represents a purchased ad.

133. The system of embodiment 131, further, comprising: the dynamic feature determining component means, to:

filter, via at least one processor, the dataset such that data regarding impressions that resulted in a conversion is kept, and a specified fraction of data regarding impressions that did not result in a conversion is kept.

134. The system of embodiment 131, further, comprising: the dynamic feature determining component means, to:

enrich, via at least one processor, the dataset by converting a feature into a plurality of features.

135. The system of embodiment 131, further, comprising: the dynamic feature determining component means, to:

determine, via at least one processor, a set of features in the dataset to combine into a combined feature; and add, via at least one processor, the combined feature to the dataset.

136. The system of embodiment 131, further, comprising: the dynamic feature determining component means, to:

drop, via at least one processor, an unusable feature from the dataset.

137. The system of embodiment 136, wherein an unusable feature is a feature that is not available during bid time.

138. The system of embodiment 136, wherein an unusable feature is a feature with fewer than a specified number of values.

139. The system of embodiment 136, wherein an unusable feature is a feature included in a set of features to exclude.

140. The system of embodiment 131, wherein the features data is encoded by label encoding string data.

141. The system of embodiment 131, wherein the features data is encoded by one-hot-encoding categorical features.

142. The system of embodiment 131, wherein scores are calculated using a Chi Square Test.

143. The system of embodiment 131, wherein scores are calculated using a Random Forest method.

144. The system of embodiment 131, wherein the labels dataframe comprises a labels column that specifies for each row of the features dataframe whether a row is associated with a conversion, and wherein a score for each feature in the features dataframe is calculated based on the dependence of a feature on the labels column.

145. The system of embodiment 131, further, comprising: the dynamic feature determining component means, to:

prune, via at least one processor, the scored features in the features dataframe such that the highest scored feature from a group of same type features remains for consideration as a top feature.

146. A processor-implemented machine learning structure generator accelerator method, comprising:

executing processor-implemented dynamic feature determining component instructions to:

obtain, via at least one processor, a dataset comprising a set of features;

partition, via at least one processor, contents of the dataset into a features dataframe and a labels dataframe;

encode, via at least one processor, features data in the features dataframe;

calculate, via at least one processor, a score for each feature in the features dataframe;

determine, via at least one processor, top features in the features dataframe based on the calculated scores; and provide, via at least one processor, the determined top features to a machine learning structure generator.

147. The method of embodiment 146, wherein the dataset comprises log level data, and wherein each row of the log level data represents a purchased ad.

148. The method of embodiment 146, further, comprising: executing processor-implemented dynamic feature determining component instructions to:

filter, via at least one processor, the dataset such that data regarding impressions that resulted in a conversion is kept, and a specified fraction of data regarding impressions that did not result in a conversion is kept.

149. The method of embodiment 146, further, comprising: executing processor-implemented dynamic feature determining component instructions to:

enrich, via at least one processor, the dataset by converting a feature into a plurality of features.

150. The method of embodiment 146, further, comprising: executing processor-implemented dynamic feature determining component instructions to:

determine, via at least one processor, a set of features in the dataset to combine into a combined feature; and add, via at least one processor, the combined feature to the dataset.

151. The method of embodiment 146, further, comprising: executing processor-implemented dynamic feature determining component instructions to:

drop, via at least one processor, an unusable feature from the dataset.

152. The method of embodiment 151, wherein an unusable feature is a feature that is not available during bid time.

153. The method of embodiment 151, wherein an unusable feature is a feature with fewer than a specified number of values.

154. The method of embodiment 151, wherein an unusable feature is a feature included in a set of features to exclude.

155. The method of embodiment 146, wherein the features data is encoded by label encoding string data.

156. The method of embodiment 146, wherein the features data is encoded by one-hot-encoding categorical features.

157. The method of embodiment 146, wherein scores are calculated using a Chi Square Test.

158. The method of embodiment 146, wherein scores are calculated using a Random Forest method.

159. The method of embodiment 146, wherein the labels dataframe comprises a labels column that specifies for each row of the features dataframe whether a row is associated with a conversion, and wherein a score for each feature in the features dataframe is calculated based on the dependence of a feature on the labels column.

160. The method of embodiment 146, further, comprising: executing processor-implemented dynamic feature determining component instructions to:

prune, via at least one processor, the scored features in the features dataframe such that the highest scored feature from a group of same type features remains for consideration as a top feature.

201. A machine learning guided user interface configuring apparatus, comprising:

a memory;

a component collection in the memory, including:

a user interface configuring component;

a processor disposed in communication with the memory, and configured to issue a plurality of processing instructions from the component collection stored in the memory, wherein the processor issues instructions from the user interface configuring component, stored in the memory, to:

obtain, via at least one processor, a user interface configuration request, wherein the user interface configuration request is associated with a dataset comprising a set of features;

determine, via at least one processor, a set of top features associated with the dataset, wherein top features are features that are most likely to be useful for machine learning classification;

add, via at least one processor, a feature user interface configuration associated with each top feature in the set of top features to an overall machine learning guided user interface configuration; and provide, via at least one processor, the overall machine learning guided user interface configuration for a user.

202. The apparatus of embodiment 201, wherein the dataset comprises log level data associated with an advertising campaign.

203. The apparatus of embodiment 202, wherein the set of top features associated with the dataset is retrieved from a repository associated with the advertising campaign.

204. The apparatus of embodiment 201, wherein the set of top features associated with the dataset is specified via a tool configuration setting associated with a tool, wherein the tool configuration setting is determined based on a prior analysis of features data associated with the dataset.

205. The apparatus of embodiment 201, wherein instructions to determine a set of top features associated with the dataset further comprise instructions to:

partition, via at least one processor, contents of the dataset into a features dataframe and a labels dataframe;

determine, via at least one processor, a score for each feature in the features dataframe based on the dependence of a feature on the contents of the labels dataframe; and determine, via at least one processor, top features in the features dataframe based on the determined scores.

206. The apparatus of embodiment 201, wherein a feature user interface configuration is pre-built for each feature that is selectable as a top feature.

207. The apparatus of embodiment 201, wherein a feature user interface configuration facilitates configuring how to set bids for a campaign depending on the associated top feature's value.

208. The apparatus of embodiment 201, wherein the overall machine learning guided user interface configuration facilitates configuring how to set bids for a campaign based on a multidimensional space comprising dimensions corresponding to the set of top features.

209. The apparatus of embodiment 201, wherein the overall machine learning guided user interface configuration is configured to include a bid curve optimized based on top features data associated with the determined set of top features.

210. The apparatus of embodiment 201, further, comprising:

a campaign optimization component in the component collection;

wherein the processor issues instructions from the campaign optimization component, stored in the memory, to:

obtain, via at least one processor, optimization input from the user;

determine, via at least one processor, campaign optimization input parameters specified via the optimization input;

optimize, via at least one processor, a bid curve for a campaign associated with the dataset based on the campaign optimization input parameters and top features data associated with the set of top features; and provide, via at least one processor, the overall machine learning guided user interface configuration that includes the optimized bid curve for the user.

211. The apparatus of embodiment 210, wherein the campaign optimization input parameters include changes to the set of top features utilized for optimization.

212. The apparatus of embodiment 210, wherein the campaign optimization input parameters include changes to data points of the bid curve.

213. The apparatus of embodiment 210, further, comprising:

the processor issues instructions from the campaign optimization component, stored in the memory, to:

translate, via at least one processor, the optimized bid curve into commands, wherein the translated commands define a bid value for a given set of top features values; and provide, via at least one processor, the translated commands to a third party.

214. The apparatus of embodiment 213, wherein the translated commands are in a Bonsai tree format.

215. The apparatus of embodiment 213, wherein the translated commands are executable commands in JSON format.

216. A processor-readable machine learning guided user interface configuring non-transient physical medium storing processor-executable components, the components, comprising:

a component collection stored in the medium, including:

a user interface configuring component;

wherein the user interface configuring component, stored in the medium, includes processor-issuable instructions to:

obtain, via at least one processor, a user interface configuration request, wherein the user interface configuration request is associated with a dataset comprising a set of features;

determine, via at least one processor, a set of top features associated with the dataset, wherein top features are features that are most likely to be useful for machine learning classification;

add, via at least one processor, a feature user interface configuration associated with each top feature in the set of top features to an overall machine learning guided user interface configuration; and provide, via at least one processor, the overall machine learning guided user interface configuration for a user.

217. The medium of embodiment 216, wherein the dataset comprises log level data associated with an advertising campaign.

218. The medium of embodiment 217, wherein the set of top features associated with the dataset is retrieved from a repository associated with the advertising campaign.

219. The medium of embodiment 216, wherein the set of top features associated with the dataset is specified via a tool configuration setting associated with a tool, wherein the tool configuration setting is determined based on a prior analysis of features data associated with the dataset.

220. The medium of embodiment 216, wherein instructions to determine a set of top features associated with the dataset further comprise instructions to:

partition, via at least one processor, contents of the dataset into a features dataframe and a labels dataframe;

determine, via at least one processor, a score for each feature in the features dataframe based on the dependence of a feature on the contents of the labels dataframe; and determine, via at least one processor, top features in the features dataframe based on the determined scores.

221. The medium of embodiment 216, wherein a feature user interface configuration is pre-built for each feature that is selectable as a top feature.

222. The medium of embodiment 216, wherein a feature user interface configuration facilitates configuring how to set bids for a campaign depending on the associated top feature's value.

223. The medium of embodiment 216, wherein the overall machine learning guided user interface configuration facilitates configuring how to set bids for a campaign based on a multidimensional space comprising dimensions corresponding to the set of top features.

224. The medium of embodiment 216, wherein the overall machine learning guided user interface configuration is configured to include a bid curve optimized based on top features data associated with the determined set of top features.

225. The medium of embodiment 216, further, comprising:

a campaign optimization component in the component collection;

wherein the campaign optimization component, stored in the medium, includes processor-issuable instructions to:

obtain, via at least one processor, optimization input from the user;

determine, via at least one processor, campaign optimization input parameters specified via the optimization input;

optimize, via at least one processor, a bid curve for a campaign associated with the dataset based on the campaign optimization input parameters and top features data associated with the set of top features; and provide, via at least one processor, the overall machine learning guided user interface configuration that includes the optimized bid curve for the user.

226. The medium of embodiment 225, wherein the campaign optimization input parameters include changes to the set of top features utilized for optimization.

227. The medium of embodiment 225, wherein the campaign optimization input parameters include changes to data points of the bid curve.

228. The medium of embodiment 225, further, comprising:

the campaign optimization component, stored in the medium, includes processor-issuable instructions to:

translate, via at least one processor, the optimized bid curve into commands, wherein the translated commands define a bid value for a given set of top features values; and provide, via at least one processor, the translated commands to a third party.

229. The medium of embodiment 228, wherein the translated commands are in a Bonsai tree format.

230. The medium of embodiment 228, wherein the translated commands are executable commands in JSON format.

231. A processor-implemented machine learning guided user interface configuring system, comprising:

a user interface configuring component means, to:

obtain, via at least one processor, a user interface configuration request, wherein the user interface configuration request is associated with a dataset comprising a set of features;

determine, via at least one processor, a set of top features associated with the dataset, wherein top features are features that are most likely to be useful for machine learning classification;

add, via at least one processor, a feature user interface configuration associated with each top feature in the set of top features to an overall machine learning guided user interface configuration; and provide, via at least one processor, the overall machine learning guided user interface configuration for a user.

232. The system of embodiment 231, wherein the dataset comprises log level data associated with an advertising campaign.

233. The system of embodiment 232, wherein the set of top features associated with the dataset is retrieved from a repository associated with the advertising campaign.

234. The system of embodiment 231, wherein the set of top features associated with the dataset is specified via a tool configuration setting associated with a tool, wherein the tool configuration setting is determined based on a prior analysis of features data associated with the dataset.

235. The system of embodiment 231, wherein means to determine a set of top features associated with the dataset further comprise means to:

partition, via at least one processor, contents of the dataset into a features dataframe and a labels dataframe;

determine, via at least one processor, a score for each feature in the features dataframe based on the dependence of a feature on the contents of the labels dataframe; and determine, via at least one processor, top features in the features dataframe based on the determined scores.

236. The system of embodiment 231, wherein a feature user interface configuration is pre-built for each feature that is selectable as a top feature.

237. The system of embodiment 231, wherein a feature user interface configuration facilitates configuring how to set bids for a campaign depending on the associated top feature's value.

238. The system of embodiment 231, wherein the overall machine learning guided user interface configuration facilitates configuring how to set bids for a campaign based on a multidimensional space comprising dimensions corresponding to the set of top features.

239. The system of embodiment 231, wherein the overall machine learning guided user interface configuration is configured to include a bid curve optimized based on top features data associated with the determined set of top features.

240. The system of embodiment 231, further, comprising:
a campaign optimization component means, to:
obtain, via at least one processor, optimization input from the user;
determine, via at least one processor, campaign optimization input parameters specified via the optimization input;
optimize, via at least one processor, a bid curve for a campaign associated with the dataset based on the campaign optimization input parameters and top features data associated with the set of top features; and
provide, via at least one processor, the overall machine learning guided user interface configuration that includes the optimized bid curve for the user.

241. The system of embodiment 240, wherein the campaign optimization input parameters include changes to the set of top features utilized for optimization.

242. The system of embodiment 240, wherein the campaign optimization input parameters include changes to data points of the bid curve.

243. The system of embodiment 240, further, comprising:
the campaign optimization component means, to:
translate, via at least one processor, the optimized bid curve into commands, wherein the translated commands define a bid value for a given set of top features values; and
provide, via at least one processor, the translated commands to a third party.

244. The system of embodiment 243, wherein the translated commands are in a Bonsai tree format.

245. The system of embodiment 243, wherein the translated commands are executable commands in JSON format.

246. A processor-implemented machine learning guided user interface configuring method, comprising:
executing processor-implemented user interface configuring component instructions to:
obtain, via at least one processor, a user interface configuration request, wherein the user interface configuration request is associated with a dataset comprising a set of features;
determine, via at least one processor, a set of top features associated with the dataset, wherein top features are features that are most likely to be useful for machine learning classification;
add, via at least one processor, a feature user interface configuration associated with each top feature in the set of top features to an overall machine learning guided user interface configuration; and
provide, via at least one processor, the overall machine learning guided user interface configuration for a user.

247. The method of embodiment 246, wherein the dataset comprises log level data associated with an advertising campaign.

248. The method of embodiment 247, wherein the set of top features associated with the dataset is retrieved from a repository associated with the advertising campaign.

249. The method of embodiment 246, wherein the set of top features associated with the dataset is specified via a tool configuration setting associated with a tool, wherein the tool configuration setting is determined based on a prior analysis of features data associated with the dataset.

250. The method of embodiment 246, wherein instructions to determine a set of top features associated with the dataset further comprise instructions to:
partition, via at least one processor, contents of the dataset into a features dataframe and a labels dataframe;
determine, via at least one processor, a score for each feature in the features dataframe based on the dependence of a feature on the contents of the labels dataframe; and
determine, via at least one processor, top features in the features dataframe based on the determined scores.

251. The method of embodiment 246, wherein a feature user interface configuration is pre-built for each feature that is selectable as a top feature.

252. The method of embodiment 246, wherein a feature user interface configuration facilitates configuring how to set bids for a campaign depending on the associated top feature's value.

253. The method of embodiment 246, wherein the overall machine learning guided user interface configuration facilitates configuring how to set bids for a campaign based on a multidimensional space comprising dimensions corresponding to the set of top features.

254. The method of embodiment 246, wherein the overall machine learning guided user interface configuration is configured to include a bid curve optimized based on top features data associated with the determined set of top features.

255. The method of embodiment 246, further, comprising:
executing processor-implemented campaign optimization component instructions to:
obtain, via at least one processor, optimization input from the user;
determine, via at least one processor, campaign optimization input parameters specified via the optimization input;
optimize, via at least one processor, a bid curve for a campaign associated with the dataset based on the campaign optimization input parameters and top features data associated with the set of top features; and
provide, via at least one processor, the overall machine learning guided user interface configuration that includes the optimized bid curve for the user.

256. The method of embodiment 255, wherein the campaign optimization input parameters include changes to the set of top features utilized for optimization.

257. The method of embodiment 255, wherein the campaign optimization input parameters include changes to data points of the bid curve.

258. The method of embodiment 255, further, comprising:
executing processor-implemented campaign optimization component instructions to:
translate, via at least one processor, the optimized bid curve into commands, wherein the translated commands define a bid value for a given set of top features values; and
provide, via at least one processor, the translated commands to a third party.

259. The method of embodiment 258, wherein the translated commands are in a Bonsai tree format.

260. The method of embodiment 258, wherein the translated commands are executable commands in JSON format.

301. A machine learning workflow decoupling apparatus, comprising:
a memory;
a component collection in the memory, including:
a machine learning workflow decoupler component;
a processor disposed in communication with the memory, and configured to issue a plurality of processing instructions from the component collection stored in the memory,
wherein the processor issues instructions from the machine learning workflow decoupler component, stored in the memory, to:
obtain, via at least one processor, a decoupled machine learning workflow generation request;
determine, via at least one processor, a set of decoupled tasks specified via the decoupled machine learning workflow generation request, wherein each decoupled task in the set of decoupled tasks is associated with a corresponding class;
determine, via at least one processor, dependencies among decoupled tasks in the set of decoupled tasks; and
generate, via at least one processor, a decoupled machine learning workflow structure comprising the set of decoupled tasks and the determined dependencies, wherein the decoupled machine learning workflow structure is executable via a decoupled machine learning workflow controller to produce machine learning results.
302. The apparatus of embodiment 301, wherein each decoupled task in the set of decoupled tasks is independent of other decoupled tasks.
303. The apparatus of embodiment 301, wherein each decoupled task in the set of decoupled tasks is configured to include a specification of a set of inputs and of a set of outputs.
304. The apparatus of embodiment 301, wherein a first user interface is provided for creation of a decoupled task by a first entity, and a second user interface is provided for creation of the corresponding class of the decoupled task by a second entity.
305. The apparatus of embodiment 301, wherein dependencies among decoupled tasks in the set of decoupled tasks specify the order of execution of the decoupled tasks.
306. The apparatus of embodiment 301, wherein dependencies among decoupled tasks in the set of decoupled tasks specify for each decoupled task which other decoupled tasks provide inputs utilized by the respective decoupled task.
307. The apparatus of embodiment 301, wherein the decoupled machine learning workflow structure employs a directed acyclic graph to organize the set of decoupled tasks and the determined dependencies.
308. The apparatus of embodiment 307, wherein the decoupled machine learning workflow controller is configured to process the directed acyclic graph and to store the produced machine learning results.
309. The apparatus of embodiment 301, wherein the produced machine learning results are stored in a Bonsai tree format.
310. The apparatus of embodiment 301, wherein the produced machine learning results are stored in JSON format.
311. A processor-readable machine learning workflow decoupling non-transient physical medium storing processor-executable components, the components, comprising:
a component collection stored in the medium, including:
a machine learning workflow decoupler component;
wherein the machine learning workflow decoupler component, stored in the medium, includes processor-issuable instructions to:
obtain, via at least one processor, a decoupled machine learning workflow generation request;
determine, via at least one processor, a set of decoupled tasks specified via the decoupled machine learning workflow generation request, wherein each decoupled task in the set of decoupled tasks is associated with a corresponding class;
determine, via at least one processor, dependencies among decoupled tasks in the set of decoupled tasks; and
generate, via at least one processor, a decoupled machine learning workflow structure comprising the set of decoupled tasks and the determined dependencies, wherein the decoupled machine learning workflow structure is executable via a decoupled machine learning workflow controller to produce machine learning results.
312. The medium of embodiment 311, wherein each decoupled task in the set of decoupled tasks is independent of other decoupled tasks.
313. The medium of embodiment 311, wherein each decoupled task in the set of decoupled tasks is configured to include a specification of a set of inputs and of a set of outputs.
314. The medium of embodiment 311, wherein a first user interface is provided for creation of a decoupled task by a first entity, and a second user interface is provided for creation of the corresponding class of the decoupled task by a second entity.
315. The medium of embodiment 311, wherein dependencies among decoupled tasks in the set of decoupled tasks specify the order of execution of the decoupled tasks.
316. The medium of embodiment 311, wherein dependencies among decoupled tasks in the set of decoupled tasks specify for each decoupled task which other decoupled tasks provide inputs utilized by the respective decoupled task.
317. The medium of embodiment 311, wherein the decoupled machine learning workflow structure employs a directed acyclic graph to organize the set of decoupled tasks and the determined dependencies.
318. The medium of embodiment 317, wherein the decoupled machine learning workflow controller is configured to process the directed acyclic graph and to store the produced machine learning results.
319. The medium of embodiment 311, wherein the produced machine learning results are stored in a Bonsai tree format.
320. The medium of embodiment 311, wherein the produced machine learning results are stored in JSON format.
321. A processor-implemented machine learning workflow decoupling system, comprising:
a machine learning workflow decoupler component means, to:
obtain, via at least one processor, a decoupled machine learning workflow generation request;
determine, via at least one processor, a set of decoupled tasks specified via the decoupled machine learning workflow generation request, wherein each decoupled task in the set of decoupled tasks is associated with a corresponding class;

determine, via at least one processor, dependencies among decoupled tasks in the set of decoupled tasks; and generate, via at least one processor, a decoupled machine learning workflow structure comprising the set of decoupled tasks and the determined dependencies, wherein the decoupled machine learning workflow structure is executable via a decoupled machine learning workflow controller to produce machine learning results.

322. The system of embodiment 321, wherein each decoupled task in the set of decoupled tasks is independent of other decoupled tasks.

323. The system of embodiment 321, wherein each decoupled task in the set of decoupled tasks is configured to include a specification of a set of inputs and of a set of outputs.

324. The system of embodiment 321, wherein a first user interface is provided for creation of a decoupled task by a first entity, and a second user interface is provided for creation of the corresponding class of the decoupled task by a second entity.

325. The system of embodiment 321, wherein dependencies among decoupled tasks in the set of decoupled tasks specify the order of execution of the decoupled tasks.

326. The system of embodiment 321, wherein dependencies among decoupled tasks in the set of decoupled tasks specify for each decoupled task which other decoupled tasks provide inputs utilized by the respective decoupled task.

327. The system of embodiment 321, wherein the decoupled machine learning workflow structure employs a directed acyclic graph to organize the set of decoupled tasks and the determined dependencies.

328. The system of embodiment 327, wherein the decoupled machine learning workflow controller is configured to process the directed acyclic graph and to store the produced machine learning results.

329. The system of embodiment 321, wherein the produced machine learning results are stored in a Bonsai tree format.

330. The system of embodiment 321, wherein the produced machine learning results are stored in JSON format.

331. A processor-implemented machine learning workflow decoupling method, comprising:

executing processor-implemented machine learning workflow decoupler component instructions to:

obtain, via at least one processor, a decoupled machine learning workflow generation request;

determine, via at least one processor, a set of decoupled tasks specified via the decoupled machine learning workflow generation request, wherein each decoupled task in the set of decoupled tasks is associated with a corresponding class;

determine, via at least one processor, dependencies among decoupled tasks in the set of decoupled tasks; and generate, via at least one processor, a decoupled machine learning workflow structure comprising the set of decoupled tasks and the determined dependencies, wherein the decoupled machine learning workflow structure is executable via a decoupled machine learning workflow controller to produce machine learning results.

332. The method of embodiment 331, wherein each decoupled task in the set of decoupled tasks is independent of other decoupled tasks.

333. The method of embodiment 331, wherein each decoupled task in the set of decoupled tasks is configured to include a specification of a set of inputs and of a set of outputs.

334. The method of embodiment 331, wherein a first user interface is provided for creation of a decoupled task by a first entity, and a second user interface is provided for creation of the corresponding class of the decoupled task by a second entity.

335. The method of embodiment 331, wherein dependencies among decoupled tasks in the set of decoupled tasks specify the order of execution of the decoupled tasks.

336. The method of embodiment 331, wherein dependencies among decoupled tasks in the set of decoupled tasks specify for each decoupled task which other decoupled tasks provide inputs utilized by the respective decoupled task.

337. The method of embodiment 331, wherein the decoupled machine learning workflow structure employs a directed acyclic graph to organize the set of decoupled tasks and the determined dependencies.

338. The method of embodiment 337, wherein the decoupled machine learning workflow controller is configured to process the directed acyclic graph and to store the produced machine learning results.

339. The method of embodiment 331, wherein the produced machine learning results are stored in a Bonsai tree format.

340. The method of embodiment 331, wherein the produced machine learning results are stored in JSON format.

In order to address various issues and advance the art, the entirety of this application for Double Blind Machine Learning Insight Interface Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DBMLII individual and/or enterprise user, database configuration and/or relational model, data type, data transmission and/or network framework, syntax structure, and/or the like, various embodiments of the DBMLII, may be implemented that enable a great deal of flexibility and customization. For example, aspects of the DBMLII may be adapted for big data mining. While various embodiments and discussions of the DBMLII have included data anonymized machine learning, however, it is to be understood that the embodiments described herein may be readily configured and/or customized for a wide variety of other applications and/or implementations.

What is claimed is:

1. A machine learning workflow decoupling apparatus, comprising:

a memory;

a component collection in the memory, including:

a machine learning workflow decoupler component;

a processor disposed in communication with the memory, and configured to issue a plurality of processing instructions from the component collection stored in the memory, wherein the processor issues instructions from the machine learning workflow decoupler component, stored in the memory, to:

obtain, via the processor, a decoupled machine learning workflow generation request, wherein the decoupled machine learning workflow generation request includes at least one directed acyclic graph;

determine, via the processor, a set of decoupled tasks specified via the decoupled machine learning workflow generation request, wherein each decoupled task in the set of decoupled tasks is associated with a corresponding class;

determine, via the processor, dependencies among decoupled tasks in the set of decoupled tasks, wherein decoupled tasks decouple machine learning structures from interfaces for machine learning structures; and generate, via the processor, a decoupled machine learning workflow structure comprising the set of decoupled tasks and the determined dependencies, wherein the decoupled machine learning workflow structure is executed via a decoupled machine learning workflow controller to produce machine learning results, wherein the decoupled machine learning workflow structure employs a directed acyclic graph to organize the set of decoupled tasks and the determined dependencies, wherein the decoupled machine learning workflow controller is configured to process the directed acyclic graph and to store the produced machine learning results; and wherein the produced machine learning results are translated, via the processor, into commands.

2. The apparatus of claim 1, wherein each decoupled task in the set of decoupled tasks is independent of other decoupled tasks.

3. The apparatus of claim 1, wherein each decoupled task in the set of decoupled tasks is configured to include a specification of a set of inputs and of a set of outputs.

4. The apparatus of claim 1, wherein a first user interface is provided for creation of a decoupled task by a first entity, and a second user interface is provided for creation of the corresponding class of the decoupled task by a second entity.

5. The apparatus of claim 1, wherein dependencies among decoupled tasks in the set of decoupled tasks specify the order of execution of the decoupled tasks.

6. The apparatus of claim 1, wherein dependencies among decoupled tasks in the set of decoupled tasks specify for each decoupled task which other decoupled tasks provide inputs utilized by the respective decoupled task.

7. The apparatus of claim 1, wherein the produced machine learning results are stored in a Bonsai tree format.

8. The apparatus of claim 1, wherein the produced machine learning results are stored in JavaScript Object Notation (JSON) format.

* * * * *